(12) United States Patent
Reitz et al.

(10) Patent No.: US 6,391,494 B2
(45) Date of Patent: *May 21, 2002

(54) METAL VANADIUM OXIDE PARTICLES

(75) Inventors: Hariklia Dris Reitz, Santa Clara; James P. Buckley, San Jose; Sujeet Kumar; Yu K. Fortunak, both of Fremont; Xiangxin Bi, San Ramon, all of CA (US)

(73) Assignee: NanoGram Corporation, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/311,506

(22) Filed: May 13, 1999

(51) Int. Cl.⁷ .......................... H01M 4/34; H01M 4/54; H01M 4/58; H01M 10/32
(52) U.S. Cl. ..................... 429/219; 429/231.5
(58) Field of Search ................ 429/231.5, 219

(56) References Cited

U.S. PATENT DOCUMENTS

| | | | |
|---|---|---|---|
| 3,406,228 A | 10/1968 | Hardy et al. | 264/0.5 |
| 3,483,110 A | 12/1969 | Rozgonyi | 204/192 |
| 4,048,290 A | 9/1977 | Lee | 423/336 |
| 4,246,327 A | 1/1981 | Skarstad et al. | 429/105 |
| 4,548,798 A | 10/1985 | Rice | 423/263 |
| 4,830,940 A | 5/1989 | Keister et al. | 429/194 |
| 4,964,877 A | 10/1990 | Keister et al. | 29/623 |
| 5,039,452 A | 8/1991 | Thompson et al. | 252/518 |
| 5,053,580 A | 10/1991 | Schramm et al. | 585/624 |
| 5,160,664 A | 11/1992 | Liu | 252/305 |
| 5,221,453 A | 6/1993 | Crespi | 204/291 |
| 5,298,349 A | 3/1994 | Takeuchi | 429/219 |
| 5,389,472 A | 2/1995 | Takeuchi et al. | 429/219 |
| 5,407,458 A | 4/1995 | König et al. | 75/255 |
| 5,427,763 A | 6/1995 | Lawton et al. | 423/593 |

(List continued on next page.)

FOREIGN PATENT DOCUMENTS

| | | |
|---|---|---|
| EP | 0 638 946 A2 | 7/1994 |
| EP | 0 689 256 A1 | 6/1995 |
| WO | WO 99/04441 | 1/1999 |

OTHER PUBLICATIONS

"Evaluation of A New Type of Vanadium Oxide from Peroxo–polyvanadate as a Cathode material for Rechargeable Lithium Batteries" by, Ugaji et al., J. Electrochem. Soc., vol. 142, No. 11, Nov. 1995, pp. 3664–3668.

"Laser Synthesis of Canadium–Titanium Oxide Catalysts" by, Musci et al., J. Mater., Res., vol. 7, No. 10. Oct. 1992, pp. 2846–2852.

"Preparation and Lithium Intercalation of a New Vanadium Oxide with a Two–Dimensional Structure", by Hibino et al., Solid State Ionics 79 (1995) pp. 239–244.

Primary Examiner—Steven P. Griffin
Assistant Examiner—Jonas N. Strickland
(74) Attorney, Agent, or Firm—Patterson, Thuente, Skaar & Christensen, P.A.; Peter S. Dardi; David Kleinsmith

(57) ABSTRACT

Laser pyrolysis can be used to produce directly metal vanadium oxide composite nanoparticles. To perform the pyrolysis a reactant stream is formed including a vanadium precursor and a second metal precursor. The pyrolysis is driven by energy absorbed from a light beam. Metal vanadium oxide nanoparticles can be incorporated into a cathode of a lithium based battery to obtain increased energy densities. Implantable defibrillators can be constructed with lithium based batteries having increased energy densities.

20 Claims, 34 Drawing Sheets

U.S. PATENT DOCUMENTS

| | | | |
|---|---|---|---|
| 5,435,874 A | 7/1995 | Takeuchi et al. | 156/242 |
| 5,453,261 A | 9/1995 | Saidi et al. | 423/592 |
| 5,458,997 A | 10/1995 | Crespi et al. | 429/219 |
| 5,498,494 A | 3/1996 | Takeuchi et al. | 429/219 |
| 5,516,340 A | 5/1996 | Takeuchi et al. | 29/623.1 |
| 5,543,249 A | 8/1996 | Takeuchi et al. | 429/217 |
| 5,545,496 A | 8/1996 | Chang et al. | 429/218 |
| 5,545,497 A | 8/1996 | Takeuchi et al. | 429/219 |
| 5,549,880 A | 8/1996 | Koksbang | 423/593 |
| 5,558,680 A | 9/1996 | Takeuchi et al. | 29/623.1 |
| 5,571,640 A | 11/1996 | Takeuchi et al. | 429/209 |
| 5,580,683 A | 12/1996 | Takeuchi et al. | 429/194 |
| 5,639,577 A | 6/1997 | Takeuchi et al. | 429/219 |
| 5,670,276 A | 9/1997 | Takeuchi et al. | 429/219 |
| 5,695,892 A | 12/1997 | Leising et al. | 429/219 |
| 5,766,797 A | 6/1998 | Crespi et al. | 429/197 |
| 5,770,126 A | 6/1998 | Singh et al. | 264/8 |

METAL VANADIUM OXIDE PARTICLES

FIELD OF THE INVENTION

The invention relates to methods for producing particles of metal vanadium oxide powders through laser pyrolysis. In particular, the invention relates to the use of laser pyrolysis for the production of nanoscale metal vanadium oxide particles. The invention further relates to batteries with improved performance that incorporate nanoscale metal vanadium oxides particles, such as silver vanadium oxide particles.

BACKGROUND OF THE INVENTION

Lithium based batteries have become commercially successful due to their relatively high energy density. Suitable positive electrode materials for lithium based batteries include materials that can intercalate lithium atoms into their lattice. The negative electrode can be lithium metal, lithium alloys or compounds that can reversibly intercalate lithium atoms into their lattice. Batteries formed from lithium metal or lithium alloy negative electrodes are referred to as lithium batteries while batteries formed with an anode (negative electrode) active material that can intercalate lithium ions are referred to as lithium ion batteries.

In order to produce improved batteries, various materials have been examined for use as cathode (positive electrode) active materials for lithium based batteries. A variety of materials, generally chalcogenides, are useful in lithium based batteries. For example, vanadium oxides in certain oxidation states are effective materials for the production of positive electrodes for lithium based batteries. Also, metal vanadium oxide compositions have been identified as having high energy densities and high power densities, when used in positive electrodes for lithium based batteries. Silver vanadium oxide has a particularly high energy density and high power densities, when used in lithium based batteries. Silver vanadium oxide batteries have found particular use in the production of implantable cardiac defibrillators where the battery must be able to recharge a capacitor to deliver large pulses of energy in rapid succession, within ten seconds or less.

SUMMARY OF THE INVENTION

In a first aspect, the invention pertains to a method for producing metal vanadium oxide particles comprising reacting a reactant stream comprising a vanadium precursor, and a second metal precursor in a reaction chamber. The reaction is driven by energy absorbed from an electromagnetic field.

In another aspect, the invention pertains to a battery comprising a cathode having active particles comprising silver vanadium oxide and a binder. The positive electrode exhibits an specific capacity of greater than about 340 milliampere hours per gram of active particles when discharged to about 1.0 V.

In addition, the invention pertains to a battery comprising a cathode having active particles comprising metal vanadium oxide and a binder, the positive electrode exhibiting an specific capacity of greater than about 400 milliampere hours per gram of active particles when discharged to about 1.0 V.

In a further aspect, the invention pertains to an implantable defibrillator comprising a battery having a cathode comprising silver vanadium oxide with an specific capacity upon discharge to about 1.0V of greater than about 340 milliampere hours per gram of cathode active material.

Moreover, the invention pertains to a method of producing a composite of elemental metal nanoparticles and vanadium oxide nanoparticles, the method comprising reacting a reactant stream comprising a vanadium precursor, and a second metal precursor in a reaction chamber, where the reaction is driven by energy absorbed from an electromagnetic field.

In another aspect, the invention pertains to a method for producing metal vanadium oxide particles comprising reacting a reactant stream comprising a vanadium precursor, and a second metal precursor in a reaction chamber, where the reaction is driven by energy absorbed from a combustion flame.

In an additional aspect, the invention pertains to a collection of particles comprising elemental metal selected from the group consisting of copper, silver, and gold, the particles, the collection of particles having an average particle size less than about 500 nm, and effectively no particles have a diameter greater than about four times the average diameter.

In addition, the invention pertains to a method of producing particles comprising a an elemental metal selected from the group consisting copper, silver and gold, the method comprising reacting a molecular stream in a reaction chamber, the molecular stream comprising a metal precursor and a radiation absorber, where the reaction is driven by electromagnetic radiation.

DETAILED DESCRIPTION OF THE PREFERRED EMBODIMENTS

Figure 1:
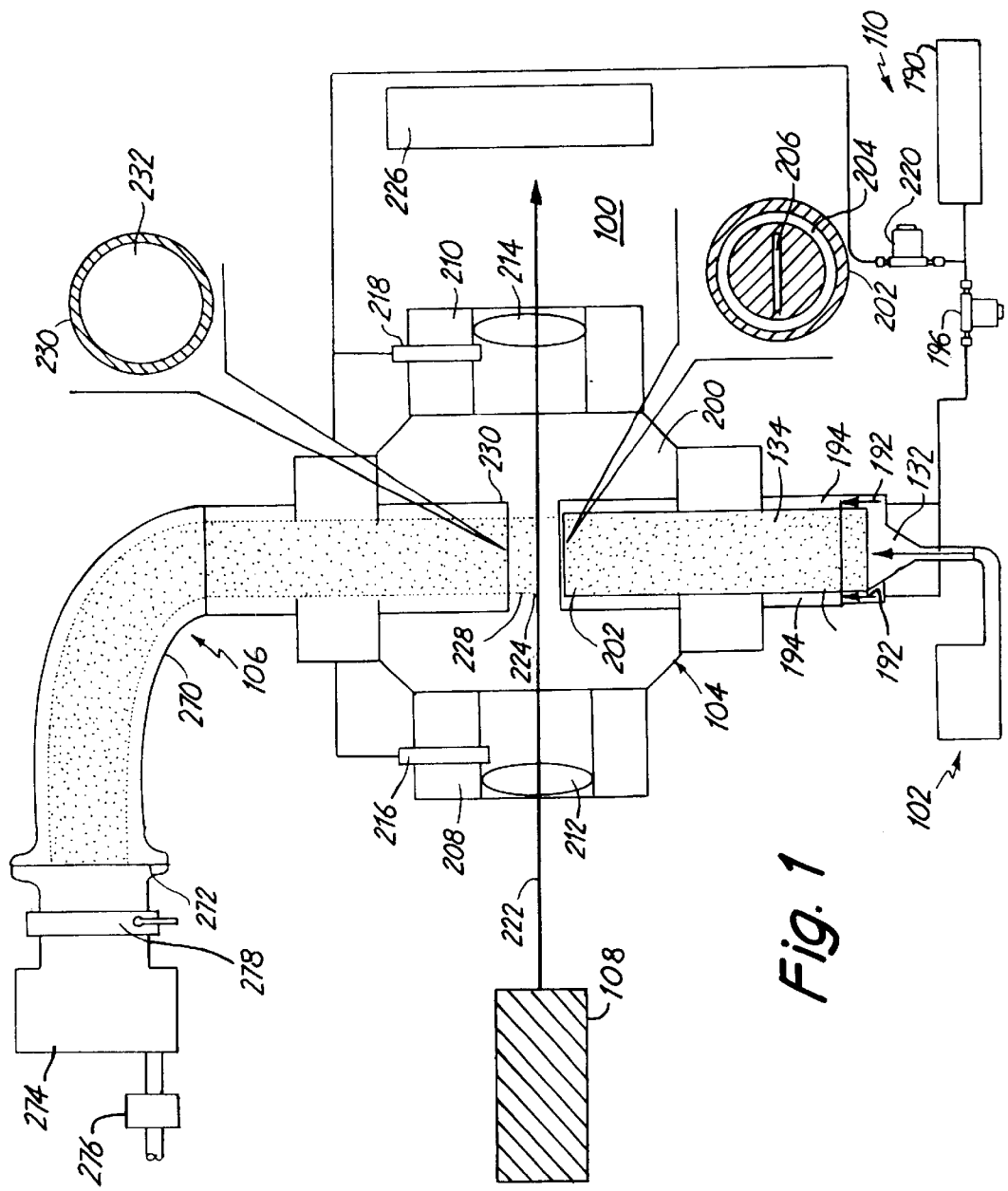
FIG. 1 is a schematic, sectional view of an embodiment of a laser pyrolysis apparatus, where the cross section is taken through the middle of the laser radiation path. The upper insert is a bottom view of the collection nozzle, and the lower insert is a top view of the delivery nozzle.

Nanoscale metal vanadium oxide particles can be produced either directly through laser pyrolysis or by the application of laser pyrolysis to synthesize nanoscale vanadium oxide particles, which are subjected subsequently to thermal/heat processing to form the metal vanadium oxide nanoparticles. Thus, metal vanadium oxides can be produced directly by laser pyrolysis, where the laser pyrolysis reactants include precursors of vanadium as well as precursors of a second metal. In addition, vanadium oxide nanoparticles can be used to form metal vanadium oxide nanoparticles, such as silver vanadium oxide nanoparticles, without losing the nanoscale size of the particles. Nanoscale metal vanadium oxide particles can be used to form batteries with improved performance.

Vanadium oxide nanoparticles with various stoichiometries and crystal structures can be produced by laser pyrolysis alone or with additional processing. These various forms of vanadium oxide nanoparticles can be used as starting materials for the formation of metal vanadium oxide nanoparticles. The multiple metal nanoparticles are formed by mixing the vanadium oxide nanoparticles with a compound of the metal to be introduced into the vanadium oxide to form a material with both metals in the lattice. By using appropriately selected processing conditions, the particles incorporating both metals can be formed without losing the nanoscale character of the initial vanadium oxide nanoparticles.

Preferred collections of metal vanadium oxide particles have an average diameter less than a micron and a very narrow distribution of particle diameters. In particular, the distribution of particle diameters preferably does not have a tail. In other words, there are effectively no particles with a diameter an order of magnitude greater than the average diameter such that the particle size distribution rapidly drops to zero.

To generate vanadium oxide nanoparticle starting materials for further processing into metal vanadium oxides, laser pyrolysis is used either alone or in combination with additional processing. Specifically, laser pyrolysis has been found to be an excellent process for efficiently producing vanadium oxide nanoparticles with a narrow distribution of average particle diameters. In addition, nanoscale vanadium oxide particles produced by laser pyrolysis can be subjected to heating under mild conditions in an oxygen environment or an inert environment to alter the crystal properties and/or the stoichiometry of the vanadium oxide particles without destroying the nanoparticle size. Thus, a variety of different types of vanadium oxide based nanoparticles can be produced.

A basic feature of successful application of laser pyrolysis for the production of vanadium oxide nanoparticles is production of a reactant stream containing a vanadium precursor, a radiation absorber and an oxygen source. The reactant stream is pyrolyzed by an intense light beam, such as a laser beam. The laser pyrolysis provides for formation of phases of materials that are difficult to form under thermodynamic equilibrium conditions. As the reactant stream leaves the light beam, the vanadium oxide particles are rapidly quenched.

Starting with nanoscale vanadium oxide particles, metal vanadium oxide particles can be formed by a thermal process. A second metal precursor comprises a non-vanadium transition metal. Preferred second metal precursors include compositions with copper, silver or gold. The second metal precursor compound is mixed with a collection of vanadium oxide nanoparticles and heated to form the particles incorporating both metals. Under suitably mild conditions, the heat processing is effective to produce the particles while not destroying the nanoscale of the initial vanadium oxide particles.

As noted above, a basic feature of the successful application of laser pyrolysis for the direct production of metal vanadium oxide nanoparticles is the production of a reactant stream containing a vanadium precursor, a precursor for a second metal, a radiation absorber and an oxygen source. The reactant stream is pyrolyzed by an intense light beam, such as a laser beam or other intense light source. As the reactant stream leaves the light beam, the metal vanadium particles are rapidly quenched to yield metal vanadium oxide nanoparticles with a highly uniform size distribution.

As noted above, lithium atoms and/or ions can intercalate into various forms of vanadium oxide and metal vanadium oxide particles. To form a positive electrode, which acts as a cathode upon discharge of the cell, the metal vanadium oxide nanoparticles can be incorporated into a electrode with a binder such as a polymer. The electrode preferably incorporates additional electrically conductive particles held by a binder along with the metal vanadium oxide particles. The electrode can be used as a positive electrode in a lithium battery or a lithium ion battery. Lithium based batteries formed with cathodes including nanoscale metal vanadium oxides have energy densities higher than theoretical maximum values estimated for corresponding bulk metal vanadium oxides. In particular, metal vanadium oxides, specifically silver vanadium oxides, have been produced with an specific capacity greater than about 340 milliampere hours per gram have been produced. Preferred metal vanadium oxide particles exhibit an energy density greater than about 350 milliampere hours per gram, and preferably greater than about 360 milliampere hours per gram, and more preferably from about 370 milliampere hours per gram to about 405 milliampere hours per gram.

While the primary focus is on the use of laser pyrolysis for the production of metal vanadium oxide nanoparticles or precursors of metal vanadium oxide nanoparticles, the approaches described herein for aerosol precursor delivery can be adapted for other synthesis approaches. In particular, the precursors can be used in a flame pyrolysis method. The precursor delivery approaches can be adapted for a variety of flame pyrolysis approaches. In one preferred approach, the reactant stream is directed into a hydrogen-oxygen flame. The flame supplies the energy to drive the pyrolysis. Such a flame pyrolysis approach should produce similar materials as the laser pyrolysis techniques herein, except that flame pyrolysis approaches generally do not produce a narrow particle size distribution.

While the focus herein is the production of ternary compounds involving two metal constituents, approaches have also been discovered to produce nanoparticles of group IB elemental metals with extremely high uniformity. In particular, an example of the production of elemental silver nanoparticles is provided below. Copper and gold, the other group IB elements, have similar chemistry, so that copper and gold nanoparticles can be produced by similar approaches.

A. Laser Pyrolysis For Nanoparticle Production

Laser pyrolysis has been discovered to be a valuable tool for the production of nanoscale vanadium oxide particles. In addition, the particles produced by laser pyrolysis are a convenient material for further processing to expand the pathways for the production of desirable vanadium oxide particles. Thus, using laser pyrolysis alone or in combination with additional processes, a wide variety of vanadium oxide particles can be produced. Furthermore, laser pyrolysis has been discovered to be a successful approach for the direct production of metal vanadium oxide particles.

The reaction conditions determine the qualities of the particles produced by laser pyrolysis. The reaction conditions for laser pyrolysis can be controlled relatively precisely in order to produce particles with desired properties. The appropriate reaction conditions to produce a certain type of particles generally depend on the design of the particular apparatus. Specific conditions used to produce vanadium oxide particles in a particular apparatus are described below in the Examples. Additional information on the production of vanadium oxide nanoparticles by laser pyrolysis is provided in copending and commonly assigned U.S. patent application Ser. No. 08/897,778 now U.S. Pat. No. 6,106,798 to Bi et al., entitled "Vanadium Oxide Nanoparticles," incorporated herein by reference. In addition, specific conditions for the direct production of silver vanadium oxide particles by laser pyrolysis in a particular apparatus also are described below in the Examples. Furthermore, some general observations on the relationship between reaction conditions and the resulting particles can be made.

Increasing the laser power results in increased reaction temperatures in the reaction region as well as a faster quenching rate. A rapid quenching rate tends to favor production of high energy phases, which may not be obtained with processes near thermal equilibrium. Similarly, increasing the chamber pressure also tends to favor the production of higher energy structures. Also, increasing the concentration of the reactant serving as the oxygen source in the reactant stream favors the production of particles with increased amounts of oxygen.

Reactant flow rate and velocity of the reactant gas stream are inversely related to particle size so that increasing the reactant gas flow rate or velocity tends to result in smaller particle size. Also, the growth dynamics of the particles have a significant influence on the size of the resulting particles. In other words, different forms of a product compound have a tendency to form different size particles from other phases under relatively similar conditions. Laser power also influences particle size with increased laser power favoring larger particle formation for lower melting materials and smaller particle formation for higher melting materials.

Laser pyrolysis has been performed generally with gas phase reactants. The use of exclusively gas phase reactants is somewhat limiting with respect to the types of precursor compounds that can be used. Thus, techniques have been developed to introduce aerosols containing reactant precursors into laser pyrolysis chambers. The aerosol atomizers can be broadly classified as ultrasonic atomizers, which use an ultrasonic transducer to form the aerosol, or as mechanical atomizers, which use energy from one or more flowing fluids (liquids, gases, or supercritical fluids) themselves to form the aerosol. Improved aerosol delivery apparatuses for reactant systems, including laser pyrolysis apparatuses, are described further in copending and commonly assigned U.S. patent application Ser. No. 09/188,670 to Gardner et al., entitled "Reactant Delivery Apparatuses," incorporated herein by reference.

Using aerosol delivery apparatuses, solid precursor compounds can be delivered by dissolving the compounds in a solvent. Alternatively, powdered precursor compounds can be dispersed in a liquid\solvent for aerosol delivery. Liquid precursor compounds can be delivered as an aerosol from a neat liquid, a liquid/gas mixture, liquid mixtures or a liquid solution, if desired. Aerosol reactants can be used to obtain significant reactant throughput. The solvent, if any, can be selected to achieve desired properties of the solution. Suitable solvents include water, methanol, ethanol and other organic solvents. The solvent should have a desired level of purity such that the resulting particles have a desired purity level.

If the aerosol precursors are formed with a solvent present, the solvent is rapidly evaporated by the laser beam in the reaction chamber such that a gas phase reaction can take place. Thus, the fundamental features of the laser pyrolysis reaction are unchanged. However, the reaction conditions are affected by the presence of the aerosol. Suitable conditions for the formation of manganese oxide nanoparticles by laser pyrolysis with aerosol precursors are described in copending and commonly assigned U.S. patent application Ser. No. 09/188,770, filed on Nov. 9, 1998, entitled "Metal Oxide Particles," incorporated herein by reference. Suitable conditions for the production of silver vanadium oxide particles by laser pyrolysis with aerosol precursors are described in the Examples below.

Suitable vanadium precursors for aerosol production include, for example, vanadium trichloride ($VCl_3$), vanadyl trichloride ($VOCl_3$), vanadyl sulfate hydrate ($VOSO_4.H_2O$), ammonium vanadate ($NH_4VO_3$), vanadium oxide compounds (e.g., $V_2O_5$ and $V_2O_3$, which are soluble in aqueous nitric acid), and vanadyl dichloride ($VOCl_2$), which is soluble in absolute alcohol. Suitable silver precursors include, for example, silver sulfate ($Ag_2SO_4$), silver carbonate ($Ag_2CO_3$), silver nitrate ($AgNO_3$), silver chlorate ($AgClO_3$) and silver perchlorate ($AgClO_4$). Suitable copper precursors include, for example, cupric nitrate ($Cu(NO_3)_2$), cupric chloride ($CuCl_2$), cuprous chloride ($CuCl$) and cupric sulfate ($CuSO_4$). Suitable gold precursors include, for example, gold trichloride ($AuCl_3$) and gold powder.

The compounds are dissolved in a solution preferably with a concentration greater than about 0.1 molar. Generally, the greater the concentration of precursor in the solution the greater the throughput of reactant through the reaction chamber. As the concentration increases, however, the solution can become more viscous such that the aerosol has droplets with larger sizes than desired. Thus, selection of solution concentration can involve a balance of factors in the selection of a preferred solution concentration.

Appropriate vanadium precursor compounds for vapor delivery generally include vanadium compounds with reasonable vapor pressures, i.e., vapor pressures sufficient to get desired amounts of precursor vapor in the reactant stream. The vessel holding a solid or liquid vanadium precursor compound can be heated to increase the vapor pressure of the vanadium precursor, if desired. Suitable vanadium precursors include, for example, $VCl_4$, $VOCl_2$, $V(CO)_6$ and $VOCl_3$. The chlorine in these representative precursor compounds can be replaced with other halogens, e.g., Br, I and F.

For the production of metal vanadium oxide particles, suitable metal precursors have sufficient vapor pressure to obtain desired amounts of metal precursor vapor in the reactant stream. Suitable copper precursors for vapor delivery include, for example, cupric chloride ($CuCl_2$). Suitable silver precursors for vapor delivery include, for example, silver chloride (AgCl). Alternatively, one of the vanadium precursor and metal precursor can be delivered as an aerosol while the other is delivered as a vapor. In particular, the metal precursor, such as a silver precursor, can be delivered as an aerosol while the vanadium precursor is delivered as a vapor.

For the production of mixed metal oxides with two or more metals, the relative amounts of the metals in the reactant stream can be altered to vary the relative amounts of metal in the resulting compositions. The phase diagram for mixed metal oxides is necessarily more complex than corresponding phase diagrams for metal oxides. Thus, the addition of a relatively larger amount of one metal relative to the other can result in production of phases with increased amounts of that metal, either as a major phase or as a larger relative quantity in a mixed phase product.

Therefore, the stoichiometry of the product particles can be altered by varying the relative amounts of metals within the solution or dispersion for aerosol delivery. Similar results can be obtained by delivering the metal precursors as two or more separate aerosols, where the relative amounts of metal precursors can be varied by changing the concentrations of the metals in the liquid and/or by the relative amounts of aerosol. Furthermore, one or more of the metal precursors can be delivered in a vapor state, and the relative amounts of metal can be appropriately adjusted to obtain a desired product.

Preferred reactants serving as oxygen source include, for example, $O_2$, CO, $CO_2$, $O_3$ and mixtures thereof. The reactant compound serving as the oxygen source should not react significantly with the vanadium precursor or other metal precursor prior to entering the reaction zone since this generally would result in the formation of large particles.

Laser pyrolysis can be performed with a variety of optical light frequencies. Preferred light sources include lasers, especially lasers that operate in the infrared portion of the electromagnetic spectrum. $CO_2$ lasers are particularly preferred sources of light. Infrared absorbers for inclusion in the molecular stream include, for example, $C_2H_4$, isopropyl alcohol ($CH_3CHOHCH_3$), $NH_3$, $SF_6$, $SiH_4$ and $O_3$. $O_3$ can act as both an infrared absorber and as an oxygen source. Alternatively, a solvent, such as isopropyl alcohol, in a liquid delivered by aerosol can absorb light from the light beam. The radiation absorber, such as the infrared absorber, absorbs energy from the radiation beam and distributes the energy to the other reactants to drive the pyrolysis.

Preferably, the energy absorbed from the radiation beam increases the temperature at a tremendous rate, many times the rate that energy generally would be produced even by strongly exothermic reactions under controlled condition. While the process generally involves nonequilibrium conditions, the temperature can be described approximately based on the heat in the absorbing region. The laser pyrolysis process is qualitatively different from the process in a combustion reactor where an energy source initiates a reaction, but the reaction is driven by energy given off by an exothermic reaction.

An inert shielding gas can be used to reduce the amount of reactant and product molecules contacting the reactant chamber components. Appropriate shielding gases include, for example, Ar, He and $N_2$. Inert gas can also be mixed with the reactant stream to moderate the reaction.

An appropriate laser pyrolysis apparatus generally includes a reaction chamber isolated from the ambient environment. A reactant inlet connected to a reactant supply system produces a reactant stream through the reaction chamber. A light beam path intersects the reactant stream at a reaction zone. The reactant/product stream continues after the reaction zone to an outlet, where the reactant/product stream exits the reaction chamber and passes into a collection system. Generally, the light source is located external to the reaction chamber, and the light beam enters the reaction chamber through an appropriate window.

Referring to FIG. 1, a particular embodiment 100 of a laser pyrolysis apparatus involves a reactant supply system 102, reaction chamber 104, collection system 106, light source 108 and shielding gas delivery system 110. Two alternative reaction supply systems can be used with the apparatus of FIG. 1. The first reaction supply system is used to deliver exclusively gaseous reactants. The second reactant supply system is used to deliver one or more reactants as an aerosol. Variations on these reaction supply systems can also be used.

Figure 2:
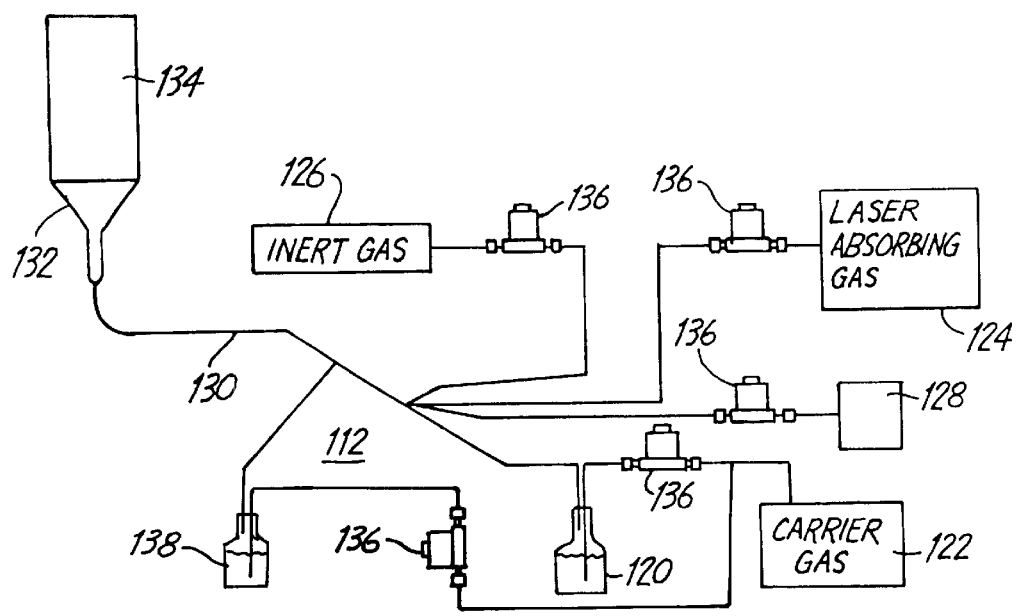
FIG. 2 is a schematic view of a reactant delivery apparatus for the delivery of vapor reactants to the laser pyrolysis apparatus of FIG. 1.

Referring to FIG. 2, a first embodiment 112 of reactant supply system 102 includes a source 120 of vanadium precursor compound. For liquid or solid vanadium precursors, a carrier gas from carrier gas source 122 can be introduced into precursor source 120 to facilitate delivery of the vanadium precursor as a vapor. The carrier gas from source 122 preferably is either an infrared absorber or an inert gas and is preferably bubbled through a liquid precursor compound or delivered into a solid precursor delivery system. Inert gas used as a carrier gas can moderate the reaction conditions. The quantity of precursor vapor in the reaction zone is roughly proportional to the flow rate of the carrier gas.

Alternatively, carrier gas can be supplied directly from infrared absorber source 124 or inert gas source 126, as appropriate. An additional reactant, such as an oxygen source, is supplied from reactant source 128, which can be a gas cylinder or other suitable container. The gases from the precursor source 120 are mixed with gases from reactant source 128, infrared absorber source 124 and inert gas source 126 by combining the gases in a single portion of tubing 130. The gases are combined a sufficient distance from reaction chamber 104 such that the gases become well mixed prior to their entrance into reaction chamber 104.

The combined gas in tube 130 passes through a duct 132 into rectangular channel 134, which forms part of an injection nozzle for directing reactants into the reaction chamber. Portions of reactant supply system 112 can be heated to inhibit the deposition of precursor compound on the walls of the delivery system.

A metal precursor can be supplied from metal precursor source 138, which can be a liquid reactant delivery apparatus, a solid reactant delivery apparatus, a gas cylinder or other suitable container or containers. If metal precursor source 138 delivers a liquid or solid reactant, carrier gas from carrier gas source 122 or an alternative carrier gas source can be used to facilitate delivery of the reactant. As shown in FIG. 2, metal precursor source 138 delivers a metal precursor to duct 132 by way of tubing 130.

Flow from sources 122, 124, 126 and 128 are preferably independently controlled by mass flow controllers 136. Mass flow controllers 136 preferably provide a controlled flow rate from each respective source. Suitable mass flow controllers include, for example, Edwards Mass Flow Controller, Model 825 series, from Edwards High Vacuum International, Wilmington, Mass.

Figure 3A:
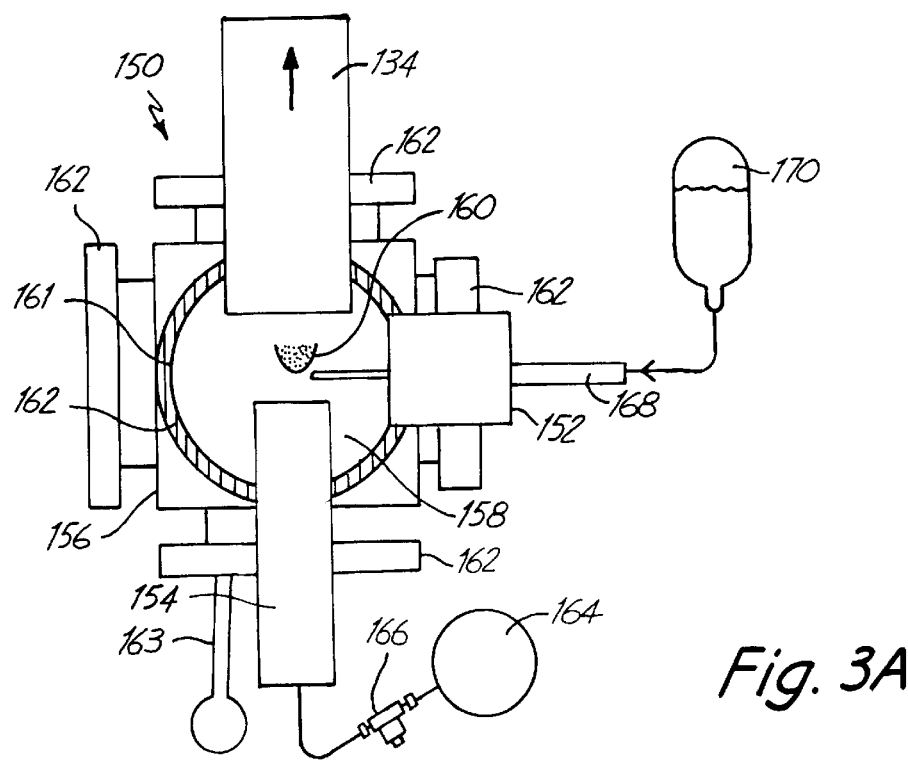
FIG. 3A is schematic, side view of a reactant delivery apparatus for the delivery of an aerosol reactant to the laser pyrolysis apparatus of FIG. 1.

Referring to FIG. 3A, an alternative embodiment 150 of the reactant supply system 102 is used to supply an aerosol to channel 134. As described above, channel 134 forms part of an injection nozzle for directing reactants into the reaction chamber through the reactant inlet. Reactant supply system 150 includes an aerosol generator 152, carrier gas/vapor supply tube 154 and junction 156. Channel 134, aerosol generator 152 and supply tube 154 meet within interior volume 158 of junction 156. Supply tube 154 is oriented to direct carrier gas along channel 134. Aerosol generator 152 is mounted such that an aerosol 160 is generated in the volume of chamber 158 between the opening into channel 134 and the outlet from supply tube 154.

Aerosol generator 152 can operate based on a variety of principles. For example, the aerosol can be produced with an ultrasonic nozzle, with an electrostatic spray system, with a pressure-flow or simplex atomizer, with an effervescent atomizer or with a gas atomizer where liquid is forced under significant pressure through a small orifice and sheared into droplets by a colliding gas stream. Suitable ultrasonic nozzles can include piezoelectric transducers. Ultrasonic nozzles with piezoelectric transducers and suitable broadband ultrasonic generators are available from Sono-Tek Corporation, Milton, N.Y., such as model 8700-120. Suitable aerosol generators are described further in copending and commonly assigned, U.S. patent application Ser. No. 09/188,670 to Gardner et al., entitled "REACTANT DELIVERY APPARATUSES," incorporated herein by reference. Additional aerosol generators can be attached to junction 156 through other ports 162 such that additional aerosols can be generated in interior 158 for delivery into the reaction chamber.

Junction 156 includes ports 162 to provide access from outside junction 156 to interior 158. Thus, channel 134, aerosol generator 152 and supply tube 154 can be mounted appropriately. In one embodiment, junction 156 is cubic with six cylindrical ports 162, with one port 162 extending from each face of junction 156. Junction 156 can be made from stainless steel or other durable, noncorrosive material. A window 161 preferably is sealed at one port 162 to provide for visual observation into interior 158. The port 162 extending from the bottom of junction 156 preferably includes a drain 163, such that condensed aerosol that is not delivered through channel 134 can be removed from junction 156.

Carrier gas/vapor supply tube 154 is connected to gas source 164. Gas source 164 can include a plurality of gas containers, liquid reactant delivery apparatuses, and/or a solid reactant delivery apparatuses, which are connected to deliver a selected gas or gas mixture to supply tube 154. Thus, carrier gas/vapor supply tube 154 can be used to deliver a variety of desired gases and/or vapors within the reactant stream including, for example, laser absorbing gases, reactants, and/or inert gases. The flow of gas from gas source 164 to supply tube 154 preferably is controlled by one or more mass flow controllers 166. Liquid supply tube 168 is connected to aerosol generator 152. Liquid supply tube 168 is connected to liquid supply 170.

For the production of vanadium oxide particles, liquid supply 170 can hold a liquid comprising a vanadium precursor. For the production of metal vanadium oxide particles, liquid supply 170 preferably holds a liquid comprising both a vanadium precursor and a metal precursor. Alternatively, for the production of metal vanadium oxide particles, liquid supply 170 can hold a liquid comprising metal precursor while vanadium precursor is delivered by way of vapor supply tube 154 and gas source(s) 164. Similarly, if desired, liquid supply 170 can hold a liquid comprising vanadium precursor, while metal precursor is delivered by way of vapor supply tube 154 and gas source(s) 164. Also, two separate aerosol generators 152 can be used to generate aerosol within junction 156, with one producing an aerosol with vanadium precursor and the second producing aerosol with the metal precursor.

In the embodiment shown in FIG. 3, aerosol generator 152 generates an aerosol with momentum roughly orthogonal to the carrier gas flow from tube 154 to channel 134. Thus, carrier gas/vapor from supply tube 154 directs aerosol precursor generated by aerosol generator 152 into channel 134. In operation, carrier gas flow directs the aerosol delivered within chamber 158 into channel 134. In this way, the delivery velocity of the aerosol is determined effectively by the flow rate of the carrier gas.

In alternative preferred embodiments, the aerosol generator is placed at an upward angle relative to the horizontal, such that a component of the forward momentum of the aerosol is directed along channel 134. In a preferred embodiment, the output directed from the aerosol generator is placed at about a 45° angle relative to the normal direction defined by the opening into channel 134, i.e. the direction of the flow into channel 134 from supply tube 154.

Figure 3B:
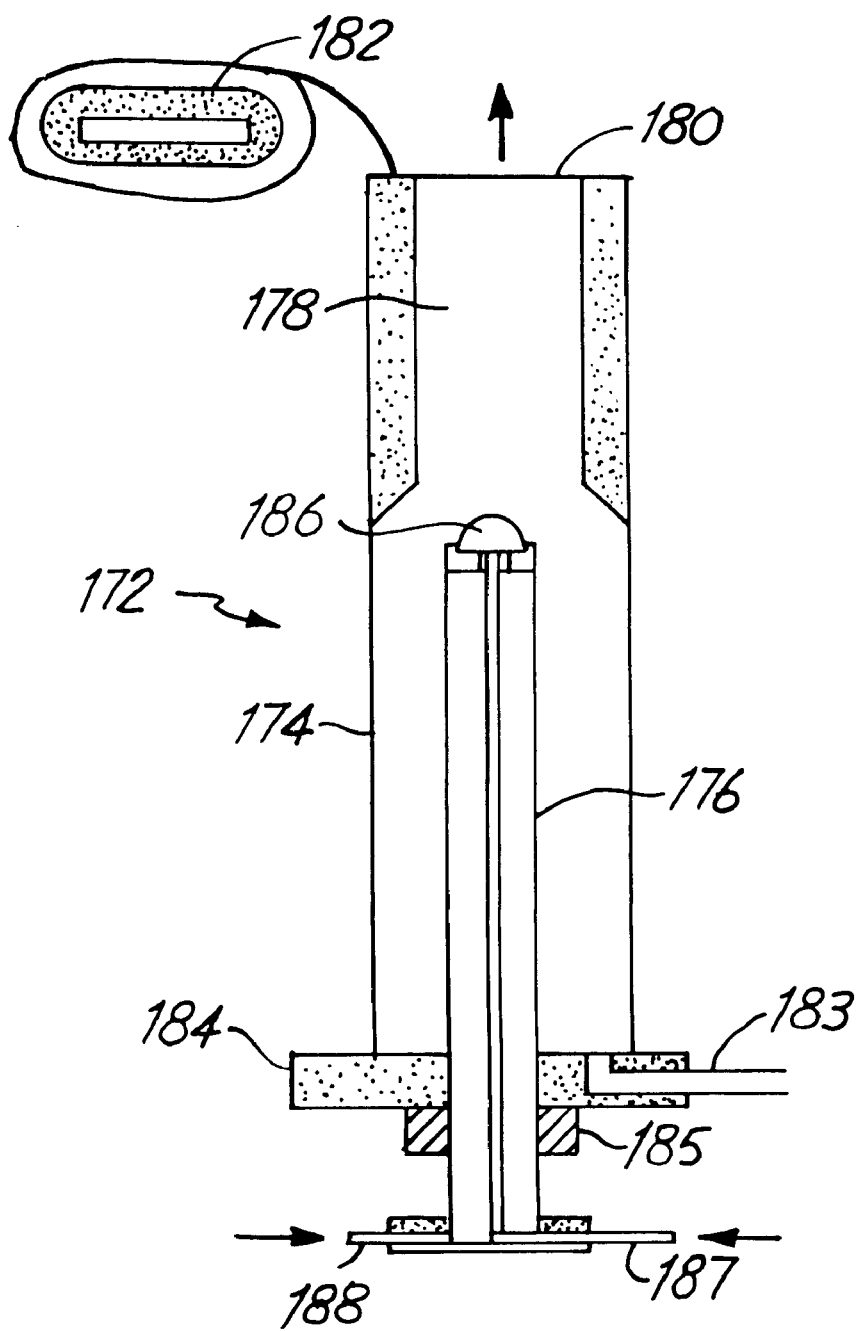
FIG. 3B is a schematic, side view of an alternative embodiment of a reactant delivery apparatus for the delivery of an aerosol reactant to the laser pyrolysis apparatus of FIG. 1.

Referring to FIG. 3B, another embodiment 172 of the reactant supply system 102 can be used to supply an aerosol to channel 134. Reactant supply system 172 includes an outer nozzle 174 and an inner nozzle 176. Outer nozzle 174 has an upper channel 178 that leads to a ⅝ in. by ¼ in. rectangular outlet 180 at the top of outer nozzle 174, as shown in the insert in FIG. 3B. Outer nozzle 174 includes a drain tube 183 in base plate 184. Drain tube 183 is used to remove condensed aerosol from outer nozzle 174. Inner nozzle 176 is secured to outer nozzle 174 at fitting 185.

Inner nozzle 176 is a gas atomizer from Spraying Systems (Wheaton, Ill.). The inner nozzle has about a 0.5 inch diameter and a 12.0 inch length. The top of the nozzle is a twin orifice internal mix atomizer 186 (0.055 in. gas oriface and 0.005 in. liquid oriface). Liquid is fed to the atomizer through tube 187, and gases for introduction into the reaction chamber are fed to the atomizer through tube 188. Interaction of the gas with the liquid assists with droplet formation.

Outer nozzle 174 and inner nozzle 176 are assembled concentrically. Outer nozzle 174 shapes the aerosol generated by inner nozzle 176 such that it has a flat rectangular cross section. In addition, outer nozzle 174 helps to achieve a uniform aerosol velocity and a uniform aerosol distribution along the cross section. Outer nozzle 174 can be reconfigured for different reaction chambers.

Referring to FIG. 1, shielding gas delivery system 110 includes inert gas source 190 connected to an inert gas duct 192. Inert gas duct 192 flows into annular channel 194. A mass flow controller 196 regulates the flow of inert gas into inert gas duct 192. If reactant delivery system 112 is used, inert gas source 126 can also function as the inert gas source for duct 192, if desired.

The reaction chamber 104 includes a main chamber 200. Reactant supply system 102 connects to the main chamber 200 at injection nozzle 202. Reaction chamber 104 can be heated to keep the precursor compound in the vapor state. Similarly, the argon shielding gas preferably can be heated. The chamber can be examined for condensation to ensure that precursor is not deposited in the chamber.

The end of injection nozzle 202 has an annular opening 204 for the passage of inert shielding gas, and a reactant inlet 206 for the passage of reactants to form a reactant stream in the reaction chamber. Reactant inlet 206 preferably is a slit, as shown in FIG. 1. Annular opening 204 has, for example, a diameter of about 1.5 inches and a width along the radial direction from about ⅛ in to about 1/16 in. The flow of shielding gas through annular opening 204 helps to prevent the spread of the reactant gases and product particles throughout reaction chamber 104.

Tubular sections 208, 210 are located on either side of injection nozzle 202. Tubular sections 208, 210 include ZnSe windows 212, 214, respectively. Windows 212, 214 are about 1 inch in diameter. Windows 212, 214 are preferably cylindrical lenses with a focal length equal to the distance between the center of the chamber to the surface of the lens to focus the beam to a point just below the center of the nozzle opening. Windows 212, 214 preferably have an antireflective coating. Appropriate ZnSe lenses are available from Janos Technology, Townshend, Vt. Tubular sections 208, 210 provide for the displacement of windows 212, 214 away from main chamber 200 such that windows 212, 214 are less likely to be contaminated by reactants and/or products. Window 212, 214 are displaced, for example, about 3 cm from the edge of the main chamber 200.

Windows 212, 214 are sealed with a rubber o-ring to tubular sections 208, 210 to prevent the flow of ambient air into reaction chamber 104. Tubular inlets 216, 218 provide for the flow of shielding gas into tubular sections 208, 210 to reduce the contamination of windows 212, 214. Tubular inlets 216, 218 are connected to inert gas source 138 or to a separate inert gas source. In either case, flow to inlets 216, 218 preferably is controlled by a mass flow controller 220.

Light source 108 is aligned to generate a light beam 222 that enters window 212 and exits window 214. Windows 212, 214 define a light path through main chamber 200 intersecting the flow of reactants at reaction zone 224. After exiting window 214, light beam 222 strikes power meter 226, which also acts as a beam dump. An appropriate power meter is available from Coherent Inc., Santa Clara, Calif. Light source 108 preferably is a laser, although it can be an intense conventional light source such as an arc lamp. Preferably, light source 108 is an infrared laser, especially a CW $CO_2$ laser such as an 1800 watt maximum power output laser available from PRC Corp., Landing, N.J. In alternative embodiments, light source 108 is replaced by another type of electromagnetic energy source such as a microwave generator. In this embodiment, the reactant stream includes a radiation absorbing compound, such as a microwave absorber.

Reactants passing through reactant inlet 206 in injection nozzle 202 initiate a reactant stream. The reactant stream passes through reaction zone 224, where reaction involving the precursor and additional reactant compound(s) takes place. Heating of the gases in reaction zone 224 generally is extremely rapid, roughly on the order of $10^5$ degree C./sec depending on the specific conditions. The reaction is rapidly quenched upon leaving reaction zone 224, and particles 228 are formed in the reactant stream. The nonequilibrium nature of the process allows for the production of nanoparticles with a highly uniform size distribution and structural homogeneity.

The path of the reactant/product stream continues to collection nozzle 230. Collection nozzle 230 is spaced about 2 cm from injection nozzle 202. The small spacing between injection nozzle 202 and collection nozzle 230 helps reduce the contamination of reaction chamber 104 with reactants and products. Collection nozzle 230 has a circular opening 232. Circular opening 232 feeds into collection system 106.

The chamber pressure is monitored with a pressure gauge attached to the main chamber. The preferred chamber pressure for the production of the desired oxides generally ranges from about 80 Torr to about 500 Torr.

Reaction chamber 104 has two additional tubular sections not shown. One of the additional tubular sections projects into the plane of the sectional view in FIG. 1, and the second additional tubular section projects out of the plane of the sectional view in FIG. 1. When viewed from above, the four tubular sections are distributed roughly, symmetrically around the center of the chamber. These additional tubular sections have windows for observing the inside of the chamber. In this configuration of the apparatus, the two additional tubular sections are not used to facilitate production of particles.

Collection system 106 preferably includes a curved channel 270 leading from collection nozzle 230. Because of the small size of the particles, the product particles follow the flow of the gas around curves. Collection system 106 includes a filter 272 within the gas flow to collect the product particles. Due to curved section 270, the filter is not supported directly above the chamber. A variety of materials such as Teflon, glass fibers and the like can be used for the filter as long as the material is inert and has a fine enough mesh to trap the particles. Preferred materials for the filter include, for example, a glass fiber filter from ACE Glass Inc., Vineland, N.J. and cylindrical Nomex® fiber filters from AF Equipment Co., Sunnyvale, Calif.

Pump 274 is used to maintain collection system 106 at a selected pressure. A variety of different pumps can be used. Appropriate pumps for use as pump 274 include, for example, Busch Model B0024 pump from Busch, Inc., Virginia Beach, Va. with a pumping capacity of about 25 cubic feet per minute (cfm) and Leybold Model SV300 pump from Leybold Vacuum Products, Export, Pa. with a pumping capacity of about 195 cfm. It may be desirable to flow the exhaust of the pump through a scrubber 276 to remove any remaining reactive chemicals before venting into the atmosphere. The entire apparatus 100 can be placed in a fume hood for ventilation purposes and for safety considerations. Generally, the laser remains outside of the fume hood because of its large size.

The apparatus is controlled by a computer. Generally, the computer controls the laser and monitors the pressure in the reaction chamber. The computer can be used to control the flow of reactants and/or the shielding gas. The pumping rate is controlled by either a manual needle valve or an automatic throttle valve inserted between pump 274 and filter 272. As the chamber pressure increases due to the accumulation of particles on filter 272, the manual valve or the throttle valve can be adjusted to maintain the pumping rate and the corresponding chamber pressure.

The reaction can be continued until sufficient particles are collected on filter 272 such that the pump can no longer maintain the desired pressure in the reaction chamber 104 against the resistance through filter 272. When the pressure in reaction chamber 104 can no longer be maintained at the desired value, the reaction is stopped, and filter 272 is removed. With this embodiment, about 1–300 grams of particles can be collected in a single run before the chamber pressure can no longer be maintained. A single run generally can last up to about 10 hours depending on the reactant delivery system, the type of particle being produced and the type of filter being used.

The reaction conditions can be controlled relatively precisely. In particular, the mass flow controllers are quite accurate. The laser generally has about 0.5 percent power stability. With either a manual control or a throttle valve, the chamber pressure can be controlled to within about 1 percent.

The configuration of the reactant supply system 102 and the collection system 106 can be reversed. In this alternative configuration, the reactants are supplied from the top of the reaction chamber, and the product particles are collected from the bottom of the chamber. In this configuration, the collection system may not include a curved section so that the collection filter is mounted directly below the reaction chamber.

An alternative design of a laser pyrolysis apparatus has been described in copending and commonly assigned U.S. patent application No. 08/808,850, now U.S. Pat. No. 5,958, 348 entitled "Efficient Production of Particles by Chemical Reaction," incorporated herein by reference. This alternative design is intended to facilitate production of commercial quantities of particles by laser pyrolysis. The reaction chamber is elongated along the laser beam in a dimension perpendicular to the reactant stream to provide for an increase in the throughput of reactants and products. The original design of the apparatus was based on the introduction of purely gaseous reactants. Alternative embodiments for the introduction of an aerosol into an elongated reaction chamber is described in copending and commonly assigned U.S. patent application Ser. No. 09/188,670 to Gardner et al., filed on Nov. 9, 1998, entitled "Reactant Delivery Apparatuses," incorporated herein by reference.

In general, the alternative pyrolysis apparatus includes a reaction chamber designed to reduce contamination of the chamber walls, to increase the production capacity and to make efficient use of resources. To accomplish these objectives, an elongated reaction chamber is used that provides for an increased throughput of reactants and products without a corresponding increase in the dead volume of the chamber. The dead volume of the chamber can become contaminated with unreacted compounds and/or reaction products.

Figure 4:
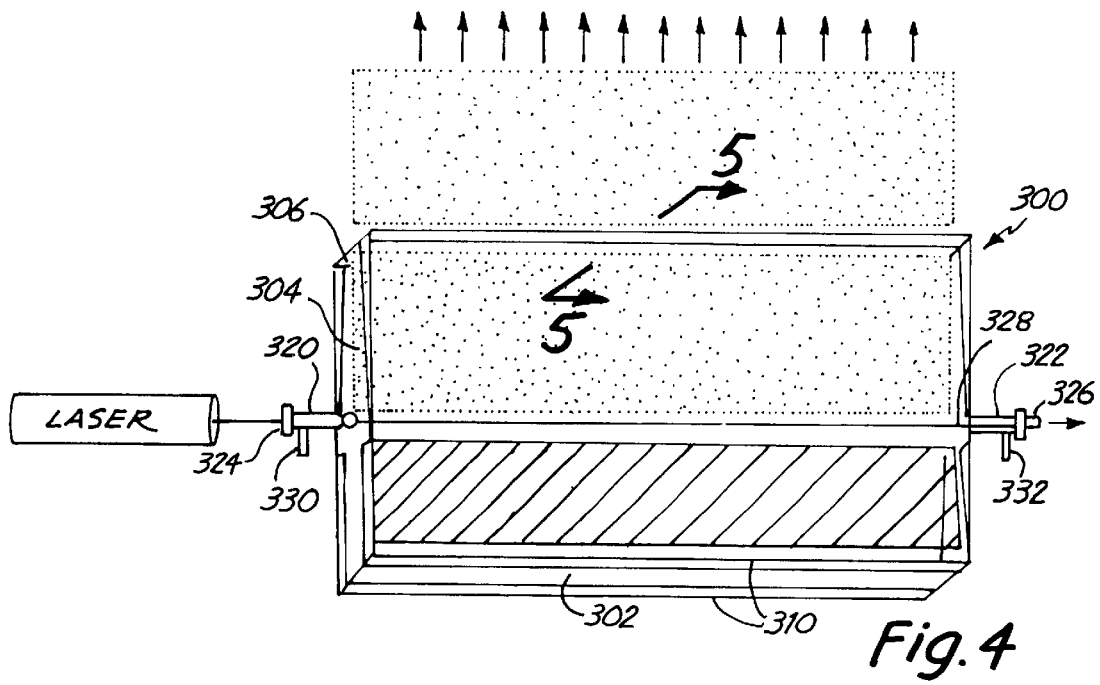
FIG. 4 is a schematic, perspective view of an elongated reaction chamber for the performance of laser pyrolysis, where components of the reaction chamber are shown as transparent to reveal internal structure.
Figure 5:
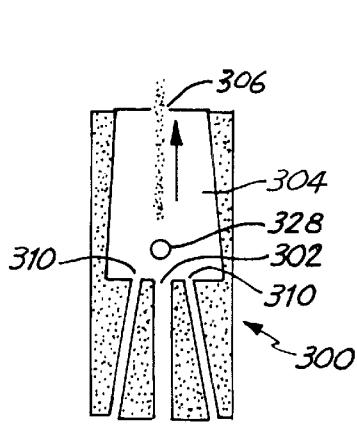
FIG. 5 is a sectional view of the reaction chamber of FIG. 4 taken along line 5—5.

The design of the improved reaction chamber 300 is shown schematically in FIGS. 4 and 5. A reactant inlet 302 enters the main chamber 304. Reactant inlet 302 provides for the introduction of gaseous and/or aerosol reactants into main chamber 304. Reactant inlet 302 conforms generally to the shape of main chamber 304. The introduction of reactants through reactant inlet 302 for the production of vanadium oxide particles or metal vanadium oxide particles can be performed by following the discussion above regarding the introduction of aerosol and/or vapor precursors with the laser pyrolysis apparatus of FIG. 1, appropriately adapted for the alternative structure of the reactant inlet.

Main chamber 304 includes an outlet 306 along the reactant/product stream for removal of particulate products, any unreacted gases and inert gases. Shielding gas inlets 310 are located on both sides of reactant inlet 302. Shielding gas inlets are used to form a blanket of inert gases on the sides of the reactant stream to inhibit contact between the chamber walls and the reactants and products.

Tubular sections 320, 322 extend from the main chamber 304. Tubular sections 320, 322 hold windows 324, 326 to define a laser beam path 328 through the reaction chamber 300. Tubular sections 320, 322 can include inert gas inlets 330, 332 for the introduction of inert gas into tubular sections 320, 322.

The dimensions of elongated reactant inlet 316 preferably are designed for high efficiency particle production. Reasonable dimensions for the reactant inlet for the production of vanadium oxide nanoparticles and metal vanadium oxide nanoparticles, when used with a 1800 watt $CO_2$ laser, are from about 5 mm to about 1 meter.

The improved apparatus includes a collection system to remove the nanoparticles from the molecular stream. The collection system can be designed to collect a large quantity of particles without terminating production or, preferably, to run in continuous production by switching between different particle collectors within the collection system. The collection system can include curved components within the flow path similar to curved portion of the collection system shown in FIG. 1.

A preferred embodiment of a collection system for particle production systems operating in a continuous collection mode is described in copending and commonly assigned U.S. patent application Ser. No. 09/107,729 to Gardner et al., entitled "Particle Collection Apparatus And Associated Methods," incorporated herein by reference. A batch collection system for use with the improved reaction system is described in copending and commonly assigned U.S. patent application Ser. No. 09/188,770, filed on Nov. 9, 1998, entitled "Metal Oxide Particles," incorporated herein by reference. The configuration of the reactant injection components and the collection system can be reversed such that the particles are collected at the top of the apparatus.

As noted above, properties of the vanadium oxide particles and metal vanadium oxide particles can be modified by further processing. Suitable starting material for the heat treatment include vanadium oxide particles and metal vanadium oxide particles produced by laser pyrolysis. Suitable vanadium oxide materials include, for example, $VO$, $VO_{1.27}$, $VO_2$, $V_2O_3$, $V_3O_5$, $V_4O_9$, $V_6O_{13}$, and amorphous $V_2O_5$. Similarly, the starting materials can be metal vanadium oxide particles, such as silver vanadium oxide particles and/or copper vanadium oxide particles produced by laser pyrolysis. Suitable metal vanadium oxide materials include $Ag_2V_4O_{11}$ and a new crystalline form of silver vanadium oxide described in the Examples below. In addition, particles used as starting material can have been subjected to one or more prior heating steps under different conditions.

The starting materials generally can be particles of any size and shape, although nanoscale particles are preferred starting materials. The nanoscale particles have an average diameter of less than about 1000 nm and preferably from about 5 nm to about 500 nm, and more preferably from about 5 nm to about 150 nm. Suitable nanoscale starting materials have been produced by laser pyrolysis.

The vanadium oxide particles or metal vanadium oxide particles are preferably heated in an oven or the like to provide generally uniform heating. The processing conditions generally are mild, such that significant amounts of particle sintering does not occur. The temperature of heating preferably is low relative to the melting point of both the starting material and the product material.

For certain target product particles, additional heating does not lead to further variation in the particle composition once equilibrium has been reached. The atmosphere for the heating process can be an oxidizing atmosphere or an inert atmosphere. In particular, for conversion of amorphous particles to crystalline particles or from one crystalline structure to a different crystalline structure of essentially the same stoichiometry, the atmosphere generally can be inert. The atmosphere over the particles can be static, or gases can be flowed through the system.

Appropriate oxidizing gases include, for example, $O_2$, $O_3$, $CO$, $CO_2$, and combinations thereof. The $O_2$ can be supplied as air. Oxidizing gases optionally can be mixed with inert gases such as Ar, He and $N_2$. When inert gas is mixed with the oxidizing gas, the gas mixture can include from about 1 percent oxidizing gas to about 99 percent oxidizing gas, and more preferably from about 5 percent oxidizing gas to about 99 percent oxidizing gas. Alternatively, either essentially pure oxidizing gas or pure inert gas can be used, as desired.

The precise conditions can be altered to vary the type of vanadium oxide product or metal vanadium oxide produce that is produced. For example, the temperature, time of heating, heating and cooling rates, the gases and the exposure conditions with respect to the gases can all be changed, as desired. Generally, while heating under an oxidizing atmosphere, the longer the heating period the more oxygen that is incorporated into the material, prior to reaching equilibrium. Once equilibrium conditions are reached, the overall conditions determine the crystalline phase of the powders.

A variety of ovens or the like can be used to perform the heating. An example of an apparatus 400 to perform this processing is displayed in FIG. 6. Apparatus 400 includes a jar 402, which can be made from glass or other inert material, into which the particles are placed. Suitable glass reactor jars are available from Ace Glass (Vineland, N.J.). The top of glass jar 402 is sealed to a glass cap 404, with a Teflon® gasket 405 between jar 402 and cap 404. Cap 404 can be held in place with one or more clamps. Cap 404 includes a plurality of ports 406, each with a Teflon® bushing. A multiblade stainless steel stirrer 408 preferably is inserted through a central port 406 in cap 404. Stirrer 408 is connected to a suitable motor.

One or more tubes 410 are inserted through ports 406 for the delivery of gases into jar 402. Tubes 410 can be made from stainless steel or other inert material. Diffusers 412 can be included at the tips of tubes 410 to disburse the gas within jar 402. A heater/furnace 414 generally is placed around jar 402. Suitable resistance heaters are available from Glas-col (Terre Haute, Ind.). One port preferably includes a T-connection 416. The temperature within jar 402 can be measured with a thermocouple 416 inserted through T-connection 416. T-connection 416 can be further connected to a vent 418. Vent 418 provides for the venting of gas circulated through jar 402. Preferably vent 418 is vented to a fume hood or alternative ventilation equipment.

Preferably, desired gases are flowed through jar 402. Tubes 410 generally are connected to an oxidizing gas source and/or an inert gas source. Oxidizing gas, inert gas or a combination thereof to produce the desired atmosphere are placed within jar 402 from the appropriate gas source(s). Various flow rates can be used. The flow rate preferably is between about 1 standard cubic centimeters per minute (sccm) to about 1000 sccm and more preferably from about 10 sccm to about 500 scam. The flow rate generally is constant through the processing step, although the flow rate and the composition of the gas can be varied systematically over time during processing, if desired. Alternatively, a static gas atmosphere can be used.

$VO_2$, a material with a high melting point, is relatively easy to form in the laser pyrolysis apparatuses described above. $VO_2$ is a suitable starting product for oxidation to other forms of vanadium oxide. Some empirical adjustment may be required to produce the conditions appropriate to generate a desired material. In addition, the heat processing can result in an alteration of the crystal lattice and/or removal of adsorbed compounds on the particles to improve the quality of the particles.

For the processing of vanadium oxide nanoparticles or metal vanadium oxide nanoparticles, for example, the temperatures preferably range from about 50° C. to about 500° C. and more preferably from about 60° C. to about 400° C. The heating preferably is continued for greater than about 5 minutes, and generally is continued for from about 2 hours to about 100 hours, preferably from about 2 hours to about 50 hours. Some empirical adjustment may be required to produce the conditions appropriate for yielding a desired material. The use of mild conditions avoids interparticle sintering resulting in larger particle sizes. Some controlled sintering of the particles can be performed at somewhat higher temperatures to produce slightly larger, average particle diameters.

The conditions to convert crystalline $VO_2$ to orthorhombic $V_2O_5$ and 2-D crystalline $V_2O_5$, and amorphous $V_2O_5$ to orthorhombic $V_2O_5$ and 2-D crystalline $V_2O_5$ are describe in copending and commonly assigned U.S. patent application Ser. No. 08/897,903, now U.S. Pat. No. 5,989,514 to Bi et al., entitled "Processing of Vanadium Oxide Particles With Heat," incorporated herein by reference.

B. Thermal Processing for the Formation of Metal Vanadium Oxide Particles

While metal vanadium oxide particles can be produced directly through laser pyrolysis, as described above, it has been discovered that heat processing also can be used to form nanoscale metal vanadium oxide particles. In a preferred approach to the thermal formation of metal vanadium oxide particles, vanadium oxide nanoscale particles first are mixed with a non-vanadium metal compound. The resulting mixture is heated in an oven to form a metal vanadium oxide composition. The heat processing to incorporate metal into the vanadium oxide lattice can be performed in an oxidizing environment or an inert environment. In either type of environment, the heating step generally results in alteration of the oxygen to vanadium ratio. In addition, the heat processing can result in an alteration of the crystal lattice and/or removal of adsorbed compounds on the particles to improve the quality of the particles.

The use of sufficiently mild conditions, i.e., temperatures well below the melting point of the vanadium oxide particles, results in metal incorporation into the vanadium oxide particles without significantly sintering the particles into larger particles. The vanadium oxide particles used for the process preferably are nanoscale vanadium oxide particles. It has been discovered that metal vanadium oxide compositions can be formed from vanadium oxides with an oxidation state of +5 or less than +5. In particular, vanadium oxides with an oxidation states from +2 (VO) to +5 ($V_2O_5$) can be used to form metal vanadium oxide particles.

Generally, the metal incorporated into the metal vanadium oxide particle is any non-vanadium transition metal. Preferred metals for incorporation into the vanadium oxide include, for example, copper, silver, gold, and combinations thereof. Suitable silver compounds include, for example, silver nitrate ($AgNO_3$). Suitable copper compounds include, for example, cupric nitrate ($Cu(NO_3)_2$). Alternatively, silver metal powder, copper metal powder or gold metal powder can be used as sources of the respective metals.

Appropriate oxidizing gases include, for example, $O_2$ (supplied as air, if desired), $O_3$, CO, $CO_2$ and combinations thereof. The reactant gas can be diluted with inert gases such as Ar, He and $N_2$. Alternatively, the gas atmosphere can be exclusively inert gas. Silver vanadium oxide particles have been produced with either an inert atmosphere or an oxidizing atmosphere, as described in the Examples below.

A variety of apparatuses can be used to perform the heat processing for lithiation and/or annealing of a sample. An embodiment of a suitable apparatus 400 is described above with respect to FIG. 6 for the heat processing of vanadium oxides produced by laser pyrolysis. An alternative apparatus 430 for the incorporation of a metal into the vanadium oxide lattice is shown in FIG. 7. The particles are placed within a small vial 432, boat or the like within tube 434. Preferably, the desired gases are flowed through tube 434. Gases can be supplied for example from inert gas source 436 or oxidizing gas source 438.

Tube 434 is located within oven or furnace 440. Oven 440 can be adapted from a commercial furnace, such as Mini-Mite™ 1100° C. Tube Furnace from Lindberg/Blue M, Asheville, N.C. Oven 440 maintains the relevant portions of the tube at a relatively constant temperature, although the temperature can be varied systematically through the processing step, if desired. The temperature can be monitored with a thermocouple 442.

To form metal vanadium oxide particles in the heating step, a mixture of vanadium oxide particles and the metal compound can be placed in tube 434 within a vial 432, boat or the like. Preferably, a solution of the metal compound is mixed with the vanadium oxide nanoparticles and evaporated to dryness prior to further heating in the oven. The evaporation can be performed simultaneously with the heating to form the metal vanadium oxide composition, if desired. For example, silver nitrate and copper nitrate can be applied to the vanadium oxide particles as an aqueous solution. Alternatively, vanadium oxide nanoparticles can be mixed with a dry powder of the metal compound or elemental metal powder, thereby avoiding the evaporation step. A sufficient amount of the metal compound or elemental metal powder is added to yield the desired amount of incorporation of the metal into the vanadium oxide lattice. This incorporation into the vanadium oxide lattice can be checked, for example, through the use of x-ray diffractometry, as described below.

The precise conditions including type of oxidizing gas (if any), concentration of oxidizing gas, pressure or flow rate of gas, temperature and processing time can be selected to produce the desired type of product material. The temperatures generally are mild, i.e., significantly below the melting point of the materials. The use of mild conditions avoids interparticle sintering resulting in larger particle sizes. Some controlled sintering of the particles can be performed in the oven at somewhat higher temperatures to produce slightly larger, average particle diameters.

For the metal incorporation into vanadium oxide, the temperature generally ranges from about 50° C. to about 500° C., preferably from about 80° C. to about 400° C., and more preferably from about 80° C. to about 325° C. The processing temperature can range from about 80° C. to about 250° C. The particles preferably are heated for about 5 minutes to about 100 hours. Some empirical adjustment may be required to produce the conditions appropriate for yielding a desired material.

C. Particle Properties

A collection of particles of interest, comprising metal vanadium oxide compounds, generally has an average diameter for the primary particles of less than about 500 nm, preferably from about 5 nm to about 100 nm, more preferably from about 5 nm to about 50 nm, and even more preferably from about 5 nm to about 25 nm. The primary particles usually have a roughly spherical gross appearance. Upon closer examination, crystalline particles generally have facets corresponding to the underlying crystal lattice. Nevertheless, crystalline primary particles tend to exhibit growth that is roughly equal in the three physical dimensions to give a gross spherical appearance. In preferred embodiments, 95 percent of the primary particles, and preferably 99 percent, have ratios of the dimension along the major axis to the dimension along the minor axis less than about 2. Diameter measurements on particles with asymmetries are based on an average of length measurements along the principle axes of the particle.

Because of their small size, the primary particles tend to form loose agglomerates due to van der Waals and other electromagnetic forces between nearby particles. Nevertheless, the nanometer scale of the primary particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material. For example, vanadium oxide nanoparticles generally exhibit surprisingly high energy densities in lithium batteries, as described in copending and commonly assigned U.S. patent application Ser. No. 08/897,776, now U.S. Pat. No. 5,952,125 entitled "Batteries With Electroactive Nanoparticles," incorporated herein by reference.

The primary particles preferably have a high degree of uniformity in size. Laser pyrolysis, as described above, generally results in particles having a very narrow range of particle diameters. Furthermore, heat processing under mild conditions does not alter the very narrow range of particle diameters. With aerosol delivery, the distribution of particle diameters is particularly sensitive to the reaction conditions. Nevertheless, if the reaction conditions are properly controlled, a very narrow distribution of particle diameters can be obtained with an aerosol delivery system, as described above. As determined from examination of transmission electron micrographs, the primary particles generally have a distribution in sizes such that at least about 95 percent, and preferably 99 percent, of the primary particles have a diameter greater than about 40 percent of the average diameter and less than about 160 percent of the average diameter. Preferably, the primary particles have a distribution of diameters such that at least about 95 percent, and preferably 99 percent, of the primary particles have a diameter greater than about 60 percent of the average diameter and less than about 140 percent of the average diameter.

Furthermore, in preferred embodiments no primary particles have an average diameter greater than about 4 times the average diameter and preferably 3 times the average diameter, and more preferably 2 times the average diameter. In other words, the particle size distribution effectively does not have a tail indicative of a small number of particles with significantly larger sizes. This is a result of the small reaction region and corresponding rapid quench of the particles. An effective cut off in the tail of the size distribution indicates that there are less than about 1 particle in $10^6$ have a diameter greater than a specified cut off value above the average diameter. Narrow size distributions, lack of a tail in the distributions and the roughly spherical morphology can be exploited in a variety of applications.

In addition, the nanoparticles generally have a very high purity level. The crystalline metal vanadium oxide nanoparticles produced by the above described methods are expected to have a purity greater than the reactants because the crystal formation process tends to exclude contaminants from the lattice. Furthermore, crystalline vanadium oxide particles produced by laser pyrolysis have a high degree of crystallinity. Similarly, the crystalline metal vanadium oxide nanoparticles produced by heat processing have a high degree of crystallinity. Impurities on the surface of the particles may be removed by heating the particles to achieve not only high crystalline purity but high purity overall.

Vanadium oxide has an intricate phase diagram due to the many possible oxidation states of vanadium. Vanadium is known to exist in oxidation states between $V^{+2}$ and $V^{+5}$. The energy differences between the oxides of vanadium in the different oxidation states is not large. Therefore, it is possible to produce stoichiometric mixed valence compounds. Known forms of vanadium oxide include VO, $V_{1.27}$, $V_2O_3$, $V_3O_5$, $VO_2$, $V_6O_{13}$, $V_4O_9$, $V_3O_7$, and $V_2O_5$. Laser pyrolysis alone or with additional heating can successfully yield single phase vanadium oxide in many different oxidation states, as evidenced by x-ray diffraction studies. These single phase materials are generally crystalline, although some amorphous nanoparticles have been produced. The heat treatment approaches are useful for increasing the oxidation state of vanadium oxide particles or for converting vanadium oxide particles to more ordered phases.

There are also mixed phase regions of the vanadium oxide phase diagram. In the mixed phase regions, particles can be formed that have domains with different oxidation states, or different particles can be simultaneously formed with vanadium in different oxidation states. In other words, certain particles or portions of particles have one stoichiometry while other particles or portions of particles have a different stoichiometry. Mixed phase nanoparticles have been formed. Non-stoichiometric materials also can be formed.

The vanadium oxides generally form crystals with octahedral or distorted octahedral coordination. Specifically, VO, $V2O_3$, $VO_2$, $V_6O_{13}$ and $V_3O_7$ can form crystals with octahedral coordination. In addition, $V_3O_7$ can form crystals with trigonal bipyramidal coordination. $V_2O_5$ forms crystals with square pyramidal crystal structure. $V_2O_5$ recently also has been produced in a two dimensional crystal structure. See, M. Hibino, et al., Solid State Ionics 79:239–244 (1995), incorporated herein by reference. When produced under appropriate conditions, the vanadium oxide nanoparticles can be amorphous. The crystalline lattice of the vanadium oxide can be evaluated using x-ray diffraction measurements.

Metal vanadium oxide compounds can be formed with various stoichiometries. U.S. Pat. No. 4,310,609 to Liang et al., entitled "Metal Oxide Composite Cathode Material for High Energy Density Batteries," incorporated herein by reference, describes the formation of $Ag_{0.7}V_2O_{5.5}$, $AgV_2O_{5.5}$, and $Cu_{0.7}V_2O_{5.5}$. The production of oxygen deficient silver vanadium oxide, $Ag_{0.7}V_2O_5$, is described in U.S. Pat. No. 5,389,472 to Takeuchi et al., entitled "Preparation of Silver Vanadium Oxide Cathodes Using Ag(O) and $V_2O_5$ as Starting Materials," incorporated herein by reference. The phase diagram of silver vanadium oxides of the formula $Ag_xV_2O_y$, $0.3 \leq x \leq 2.0$, $4.5 \leq y \leq 6.0$, involving stoichiometric admixtures of $V_2O_5$ and $AgVO_3$, are described in published European Patent Application 0 689 256A, entitled "Cathode material for nonaqueous electrochemical cells," incorporated herein by reference.

D. Batteries

Figure 8:
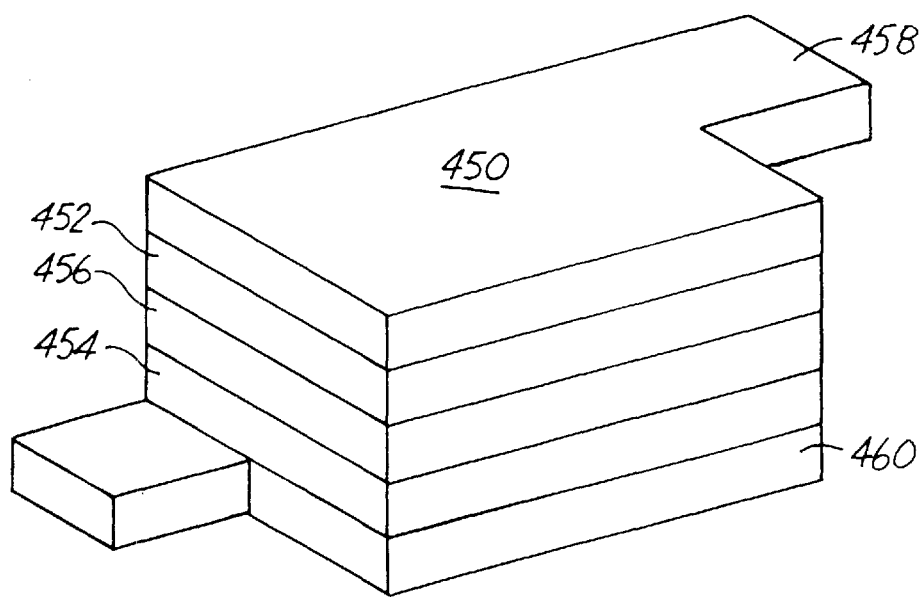
FIG. 8 is a schematic, perspective view of an embodiment of a battery of the invention.

Referring to FIG. 8, battery 450 has an negative electrode 452, a positive electrode 454 and separator 456 between negative electrode 452 and positive electrode 454. A single battery can include multiple positive electrodes and/or multiple negative electrodes. Electrolyte can be supplied in a variety of ways as described further below. Battery 450 preferably includes current collectors 458, 460 associated with negative electrode 452 and positive electrode 454, respectively. Multiple current collectors can be associated with each electrode if desired.

Lithium has been used in reduction/oxidation reactions in batteries because it is the lightest metal and because it is the most electropositive metal. Certain forms of metal oxides are known to incorporate lithium ions into its structure through intercalation or similar mechanisms such as topochemical absorption. Intercalation of lithium ions can take place also into suitable forms of a vanadium oxide lattice as well as the lattice of metal vanadium oxide compositions. Suitable metal vanadium oxide nanoparticles for incorporation into batteries can be produced by thermal processing of vanadium oxide nanoparticles with a metal compound or by direct laser pyrolysis synthesis of metal vanadium oxide nanoparticles with or without additional heat processing.

In particular, lithium intercalates into the vanadium oxide lattice or metal vanadium oxide lattice during discharge of the battery. The lithium leaves the lattice upon recharging, i.e., when a voltage is applied to the cell such that electric current flows into the positive electrode due to the application of an external EMF to the battery. Positive electrode 454 acts as a cathode during discharge, and negative electrode 452 acts as an anode during discharge of the cell. Metal vanadium oxide particles can be used directly in a positive electrode for a lithium based battery to provide a cell with a high energy density. Appropriate metal vanadium oxide particles can be an effective electroactive material for a positive electrode in either a lithium or lithium ion battery.

Positive electrode 454 includes electroactive nanoparticles such as metal vanadium oxide nanoparticles held together with a binder such as a polymeric binder. Nanoparticles for use in positive electrode 454 generally can have any shape, e.g., roughly spherical nanoparticles or elongated nanoparticles. In addition to metal vanadium oxide particles, positive electrode 454 can include other electroactive nanoparticles such as $TiO_2$ nanoparticles, vanadium oxide nanoparticles and manganese oxide nanoparticles. The production of $TiO_2$ nanoparticles has been described, see U.S. Pat. No. 4,705,762, incorporated herein by reference. Vanadium oxide nanoparticles are know to exhibit surprisingly high energy densities, as described in copending and commonly assigned U.S. patent application Ser. No. 08/897,776, now U.S. Pat. No. 5,952,125 entitled "Batteries With Electroactive Nanoparticles," incorporated herein by reference. The production of manganese oxide nanoparticles is described in copending and commonly assigned U.S. patent application Ser. No. 09/188,770 to Kumar et al. filed on Nov. 9, 1998, entitled "Metal Oxide Particles," incorporated herein by reference.

While some electroactive materials are reasonable electrical conductors, a positive electrode generally includes electrically conductive particles in addition to the electroactive nanoparticles. These supplementary, electrically conductive particles generally are also held by the binder. Suitable electrically conductive particles include conductive carbon particles such as carbon black, metal particles such as silver particles, metal fibers such as stainless steel fibers, and the like.

High loadings of particles can be achieved in the binder. Particles preferably make up greater than about 80 percent by weight of the positive electrode, and more preferably greater than about 90 percent by weight. The binder can be any of various suitable polymers such as polyvinylidene fluoride, polyethylene oxide, polyethylene, polypropylene, polytetrafluoro ethylene, polyacrylates, ethylene-(propylene-diene monomer) copolymer (EPDM) and mixtures and copolymers thereof.

Negative electrode 452 can be constructed from a variety of materials that are suitable for use with lithium ion electrolytes. In the case of lithium batteries, the negative electrode can include lithium metal or lithium alloy metal either in the form of a foil, grid or metal particles in a binder.

Lithium ion batteries use particles of a composition that can intercalate lithium. The particles are held with a binder in the negative electrode. Suitable intercalation compounds include, for example, graphite, synthetic graphite, coke, mesocarbons, doped carbons, fullerenes, niobium pentoxide, tin alloys, $SnO_2$ and mixtures and composites thereof.

Current collectors 458, 460 facilitate flow of electricity from battery 450. Current collectors 458, 460 are electrically conductive and generally made of metal such as nickel, iron, stainless steel, aluminum and copper and can be metal foil or preferably a metal grid. Current collector 458, 460 can be on the surface of their associated electrode or embedded within their associated electrode.

Separator element 456 is electrically insulating and provides for passage of at least some types of ions. Ionic transmission through the separator provides for electrical neutrality in the different sections of the cell. The separator generally prevents electroactive compounds in the positive electrode from contacting electroactive compounds in the negative electrode.

A variety of materials can be used for the separator. For example, the separator can be formed from glass fibers that form a porous matrix. Preferred separators are formed from polymers such as those suitable for use as binders. Polymer separators can be porous to provide for ionic conduction. Alternatively, polymer separators can be solid electrolytes formed from polymers such as polyethylene oxide. Solid electrolytes incorporate electrolyte into the polymer matrix to provide for ionic conduction without the need for liquid solvent.

Electrolytes for lithium batteries or lithium ion batteries can include any of a variety of lithium salts. Preferred lithium salts have inert anions and are nontoxic. Suitable lithium salts include, for example, lithium hexafluorophosphate, lithium hexafluoroarsenate, lithiumbis (trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride and lithium perfluorobutane.

If a liquid solvent is used to dissolve the electrolyte, the solvent preferably is inert and does not dissolve the electroactive materials. Generally appropriate solvents include, for example, propylene carbonate, dimethyl carbonate, diethyl carbonate, 2-methyl tetrahydrofuran, dioxolane, tetrahydrofuran, 1, 2-dimethoxyethane, ethylene carbonate, γ-butyrolactone, dimethyl sulfoxide, acetonitrile, formamide, dimethyl formamide and nitromethane.

The shape of the battery components can be adjusted to be suitable for the desired final product, for example, a coin battery, a rectangular construction or a cylindrical battery. The battery generally includes a casing with appropriate portions in electrical contact with current collectors and/or electrodes of the battery. If a liquid electrolyte is used, the casing should prevent the leakage of the electrolyte. The casing can help to maintain the battery elements in close proximity to each other to reduce resistance within the battery. A plurality of battery cells can be placed in a single case with the cells connected either in series or in parallel.

EXAMPLES

Example 1

Production of Vanadium Oxide by Laser Pyrolysis

Single phase $VO_2$ particles were produced by laser pyrolysis. The $VOCl_3$ (Strem Chemical, Inc., Newburyport, Mass.) precursor vapor was carried into the reaction chamber by bubbling Ar gas through the $VOCl_3$ liquid stored in a container at room temperature. The reactant gas mixture containing $VOCl_3$, Ar, $O_2$ and $C_2H_4$ was introduced into the reactant gas nozzle for injection into the reactant chamber. The reactant gas nozzle had dimensions ⅝ in×⅛ in. $C_2H_4$ gas was used as a laser absorbing gas. Argon was used as an inert gas.

The synthesized vanadium oxide nanoscale particles can be directly handled in the air. Representative reaction conditions for the production of this material are described in Table 1.

TABLE 1

| Phase | $VO_2$ |
|---|---|
| Crystal Structure | Monoclinic |
| Pressure (Torr) | 210 |
| Argon-Win (sccm) | 700 |
| Argon-Sld. (slm) | 7.0 |
| Ethylene (slm) | 1.61 |
| Carrier Gas - Argon (slm) | 1.4 |
| Oxygen (slm) | 0.47 |
| Precursor Temp. (° C.) | 40 |
| Production Rate (gm/hr) | 35 |
| Laser Power - Input (watts) | 780 |
| Laser Power - Output (watts) | 640 | sccm = standard cubic centimeters per minute
slm = standard liters per minute
Argon-Win. = argon flow through inlets 216, 218
Argon-Sld. = argon flow through annular channel 142

Figure 9:
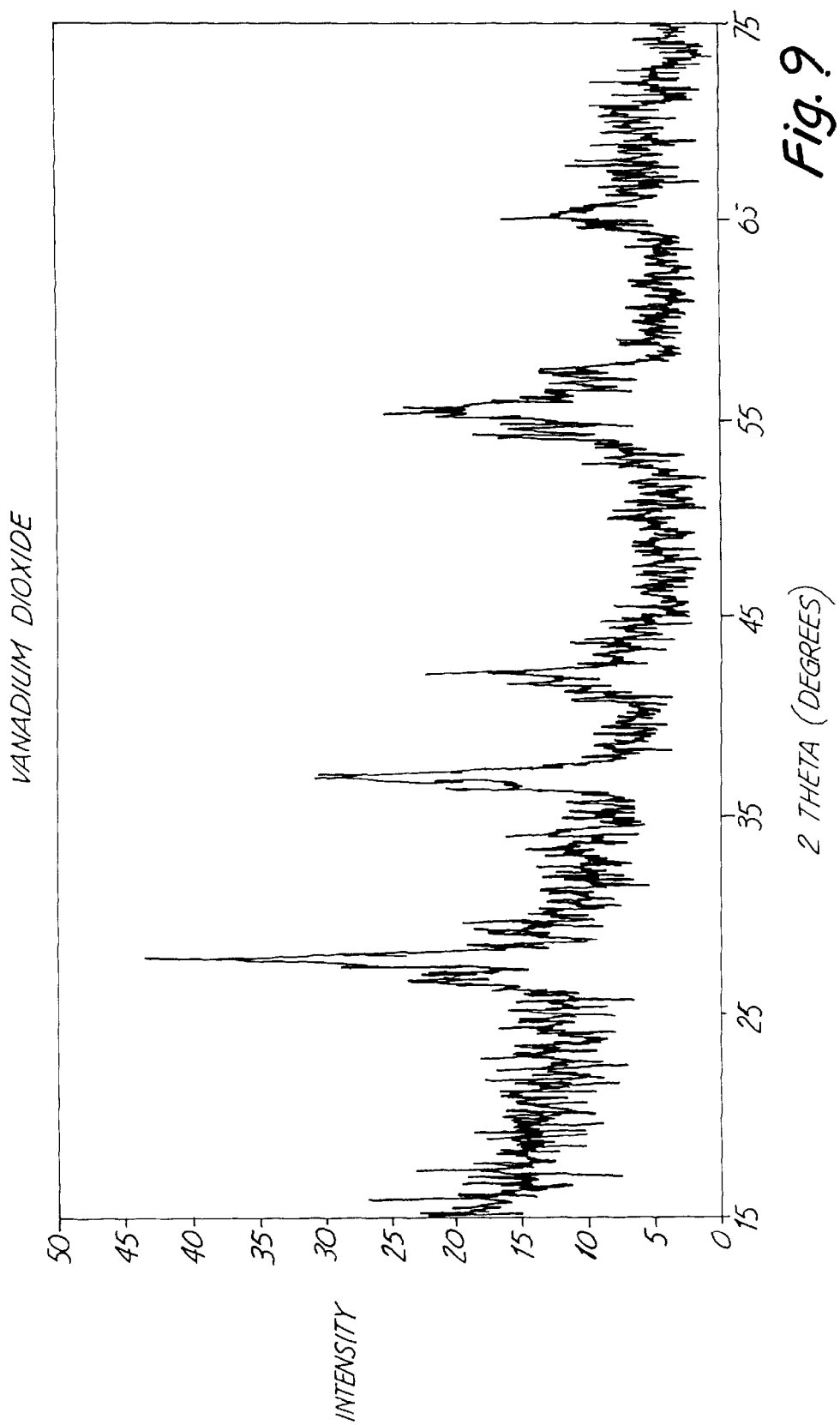
FIG. 9 is an x-ray diffractogram of crystalline $VO_2$ nanoparticles.

An x-ray diffractogram of representative product nanoparticles is shown in FIG. 9. Clear diffraction peaks corresponding to a monoclinic crystalline structure are visible. The identified structure from the diffractogram is almost identical to that of the corresponding bulk material, which has larger particle sizes.

Example 2

Heat Treatment to Form Crystalline $V_2O_5$ Nanoparticles

The starting materials for the heat treatment were $VO_2$ nanoparticles produced by laser pyrolysis according to the parameters in Table 1.

Figure 6:
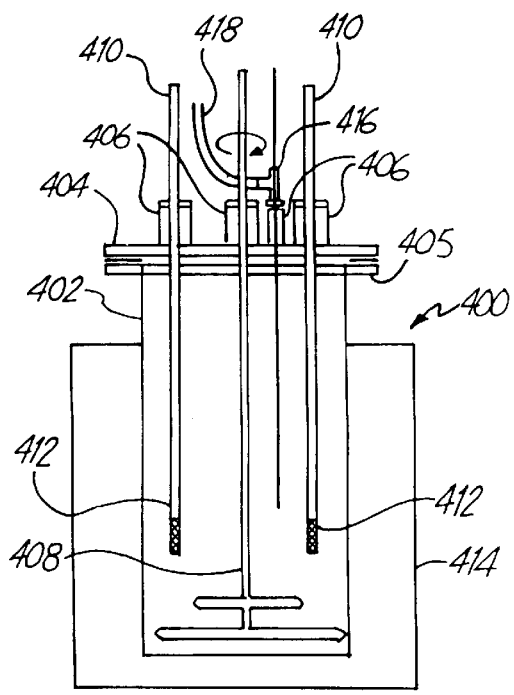
FIG. 6 is a schematic, sectional view of an apparatus for heat treating nanoparticles, in which the section is taken through the center of the apparatus.
Figure 7:
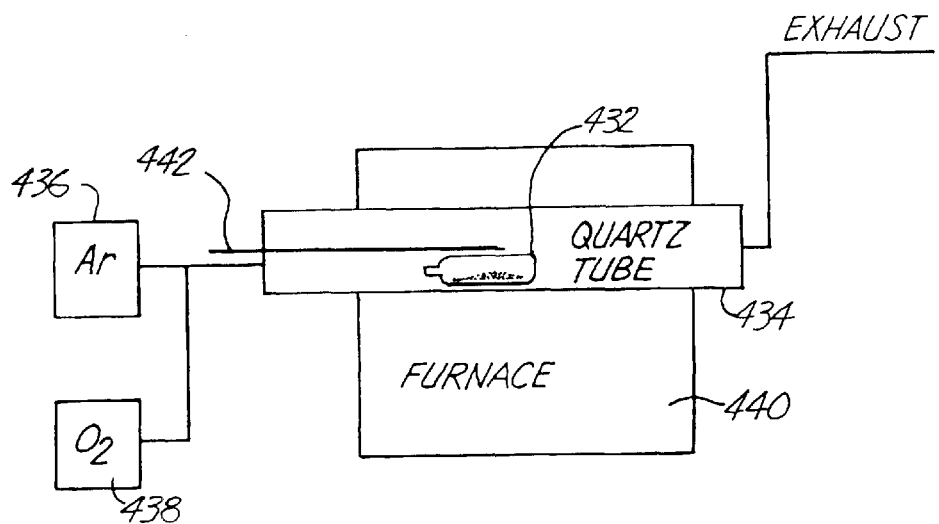
FIG. 7 is a schematic, sectional view of an oven for reacting nanoparticles under heat, in which the section is taken through the middle of the oven.
Figure 10:
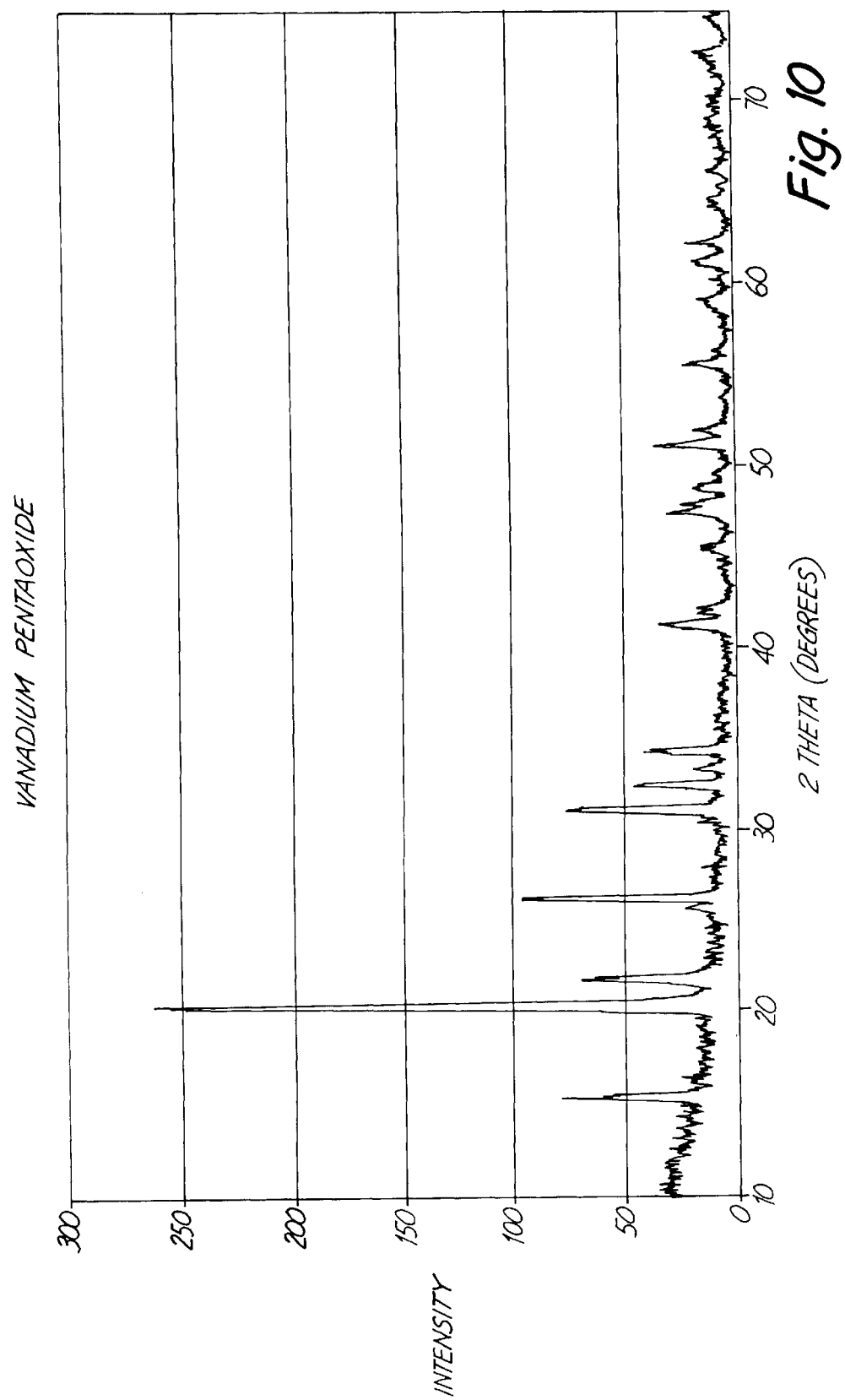
FIG. 10 is an x-ray diffractogram of crystalline $V_2O_5$ nanoparticles produced by heat treating nanoparticles of crystalline $VO_2$.

The nanoparticles were heat treated at in an oven roughly as shown in FIG. 6. The particles were fed in batches of between about 100 grams to about 150 grams into the glass jar. Oxygen is fed through a ⅛" stainless steel tube at an oxygen flow rate of 155 cc/min. A mixing speed of 5 rpm was used to constantly mix the powders during the heat treatment. The powders were heated for 30 minutes at 100° C., then for 30 minutes at 200° C. and finally at 230° C. for 16 hours. A heating rate of 4° C./minute was used to heat the samples to the target temperatures. The resulting nanoparticles were single phase crystalline $V_2O_5$ nanoparticles. The x-ray diffractogram of this material is shown in FIG. 10. From the x-ray diffractogram, it could be determined that the resulting particles were orthorhombic $V_2O_5$.

Figure 11:
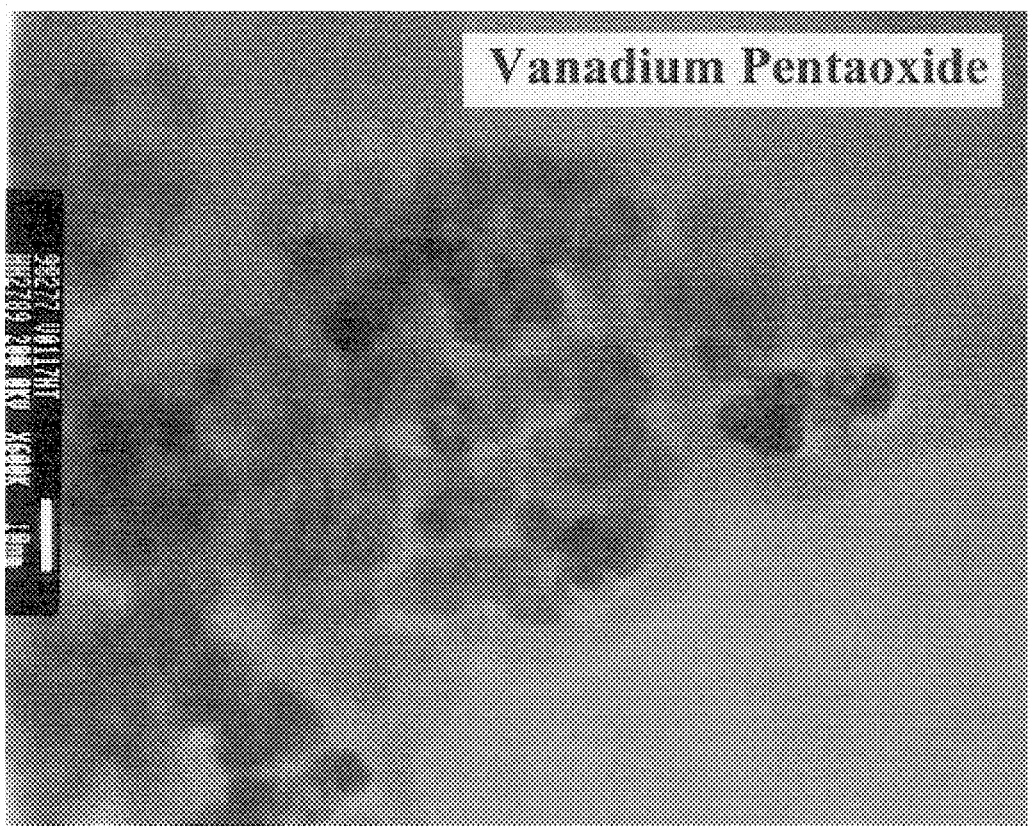
FIG. 11 is a transmission electron microscope view of crystalline $V_2O_5$ nanoparticles.
Figure 12:
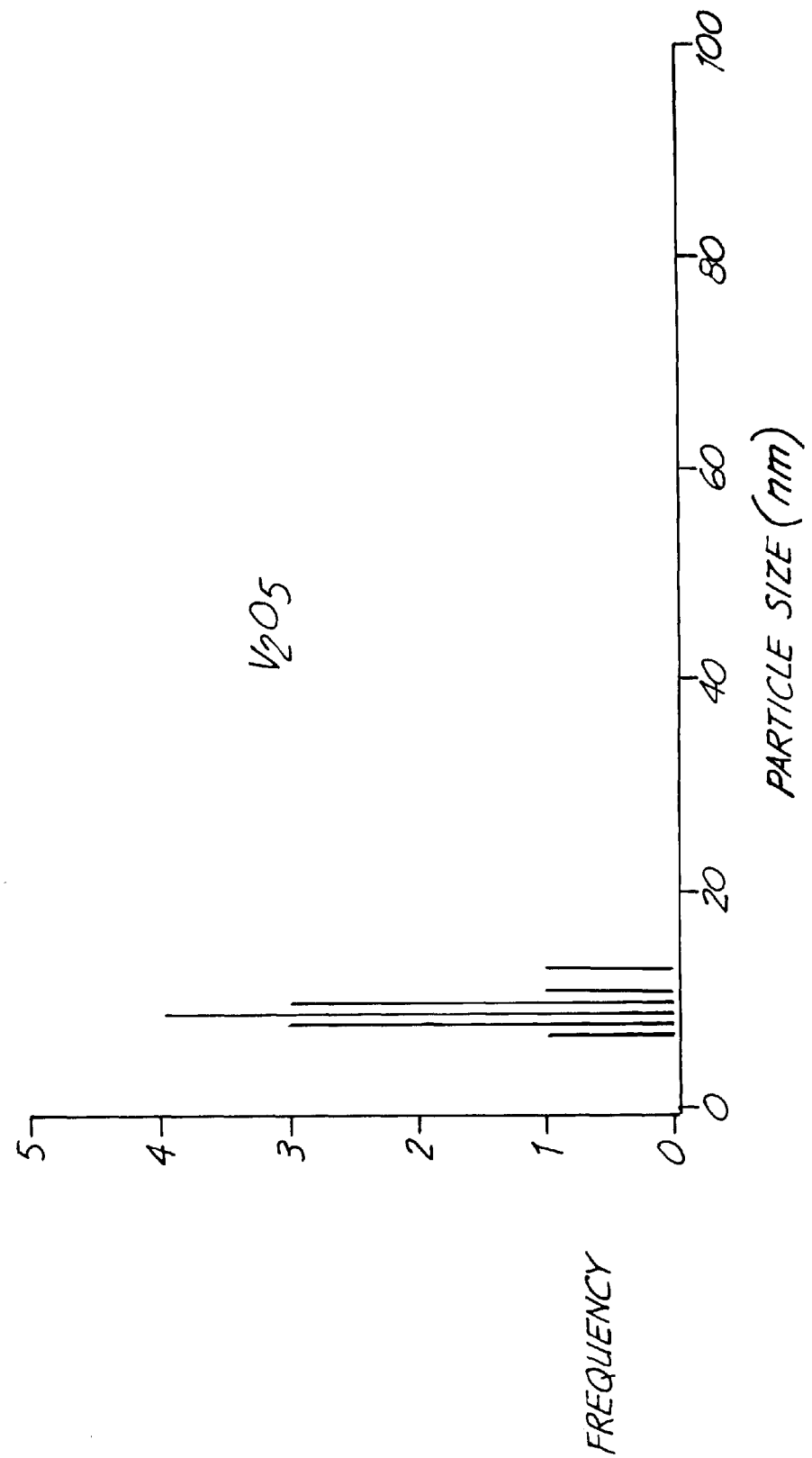
FIG. 12 is a plot depicting the distribution of particle sizes for the crystalline $V_2O_5$ nanoparticles depicted in FIG. 11.

TEM photographs were obtained of representative nanoparticles following heat treatment. The TEM photograph is shown in FIG. 11. An approximate size distribution was determined by manually measuring diameters of the particles shown in FIG. 11. The particle size distribution is shown in FIG. 12. An average particle size of about 10–11 nm was obtained. Only those particles showing clear particle boundaries were measured and recorded to avoid regions distorted in the micrograph. This should not bias the measurements obtained since the single view of the micrograph may not show a clear view of all particles because of the orientation of the crystals.

Example 3

Heat Processing to Form Silver Vanadium Oxide From $V_2O_5$ Nanoparticles

This example demonstrates the production of nanoscale silver vanadium oxide using a vanadium oxide nanoparticle starting material. The silver vanadium oxide is produced by heat processing.

About 9.5 g of silver nitrate ($AgNO_3$) (EM Industries, Hawthorne, N.Y.) was dissolved into about 15 ml of deionized water. Then, about 10 g of $V_2O_5$ nanoparticles produced as described in Examples 2 were added to the silver nitrate solution to form a mixture. The resulting mixture was stirred on a magnetic stirrer for about 30 minutes. After the stirring was completed the solution was heated to about 160° C. in an oven to drive off the water. The dried powder mixture was ground with a mortar and pestle.

Six samples from the resulting ground powder weighing between about 100 and about 300 mg of nanoparticles were placed separately into an open 1 cc boat. The boat was placed within the quartz tube projecting through an oven to perform the heat processing. The oven was essentially as described above with respect to FIG. 7. Oxygen gas or argon gas was flowed through a 1.0 in diameter quartz tube at a flow rate of about 20 sccm. The samples were heated in the oven under the following conditions:

1) 250° C., 60 hrs in argon
2) 250° C., 60 hrs in oxygen
3) 325° C., 4 hrs in argon
4) 325° C., 4 hrs in oxygen
5) 400° C., 4 hrs in argon
6) 400° C., 4 hrs in oxygen.

The samples were heated at approximately the rate of 2° C./min. and cooled at the rate of approximately 1° C./min. The times given above did not include the heating and cooling time.

Figure 13:
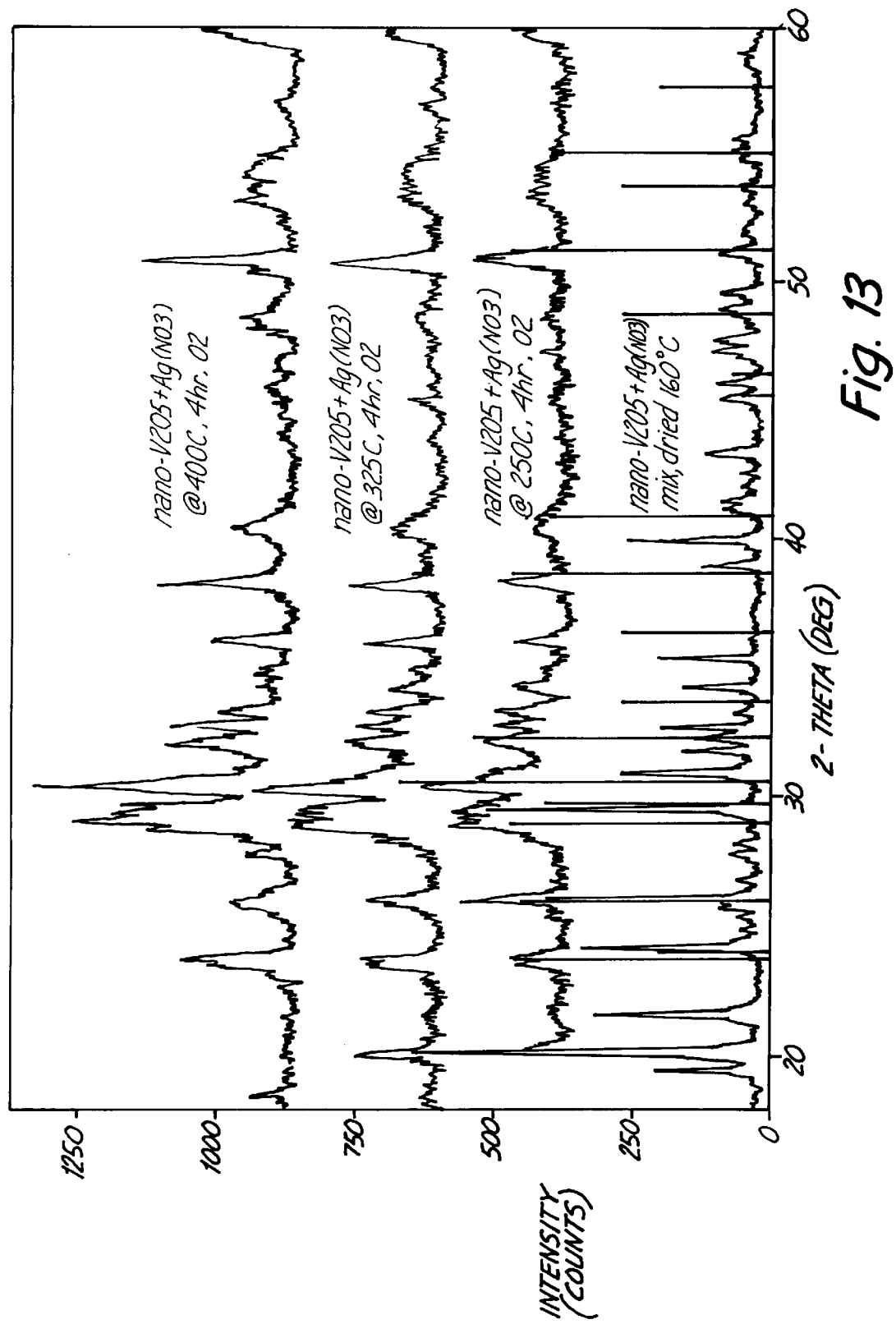
FIG. 13 is a plot of four x-ray diffractograms of silver vanadium oxide produced by heat treating nanocrystalline $V_2O_5$ with silver nitrate in an oxygen atmosphere, where each diffractogram was produced with materials formed under different conditions.
Figure 14:
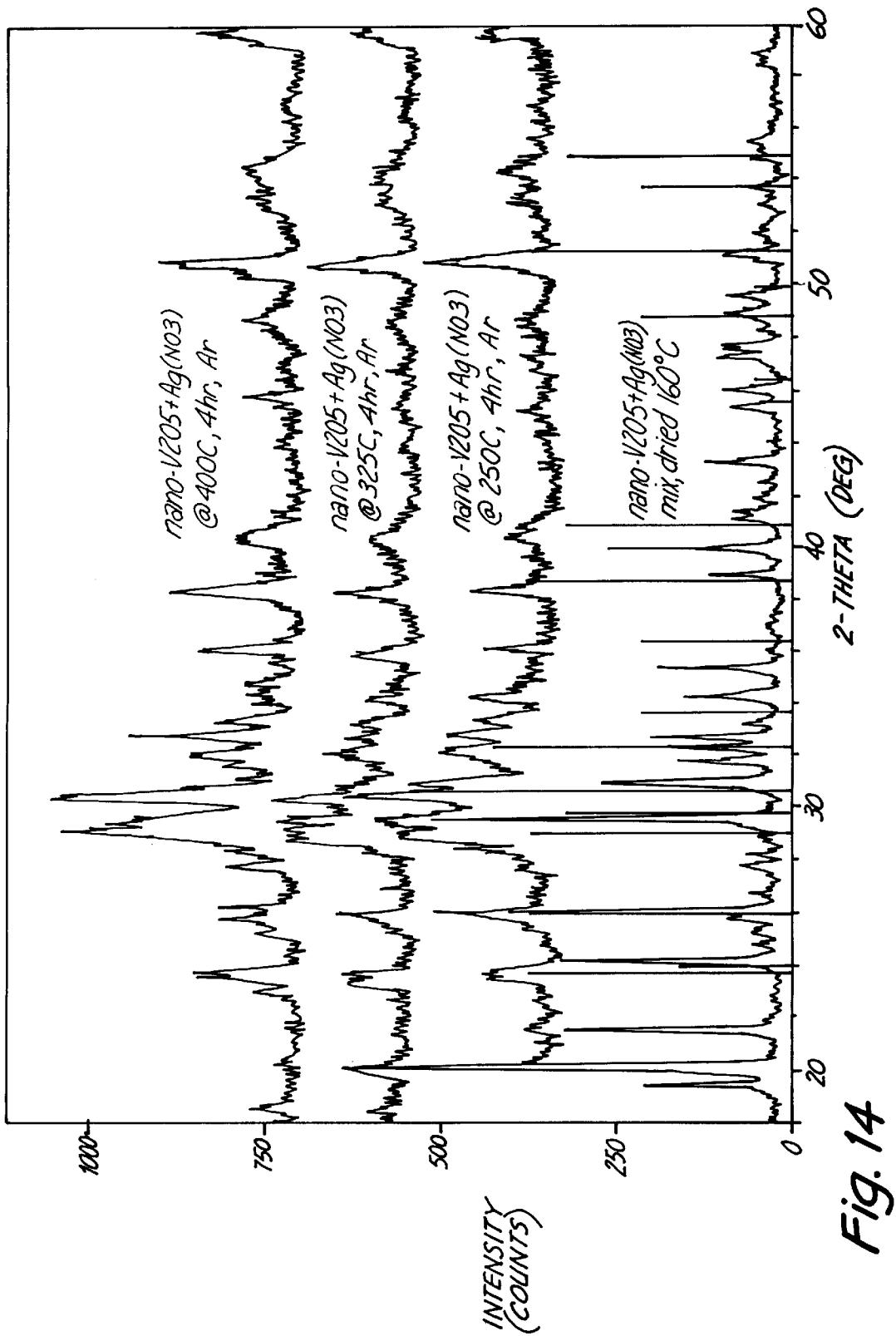
FIG. 14 is a plot of four x-ray diffractograms of silver vanadium oxide produced by heat treating nanocrystalline $V_2O_5$ with silver nitrate in an argon atmosphere, where each diffractogram was produced with materials formed under different conditions.

The structure of the particles following heating was examined by x-ray diffraction. The x-ray diffractograms for the samples heated in oxygen and in argon are shown in FIGS. 13 and 14, respectively. All of the heated samples produces diffractograms with peaks indicating the presence of $Ag_2V_4O_{11}$. The samples heated at 400° C. appear to lack significant amounts of $V_2O_5$. Heating the samples for somewhat longer times at the lower temperatures should eliminate any remaining portions of the $V_2O_5$ starting material.

Figure 15:
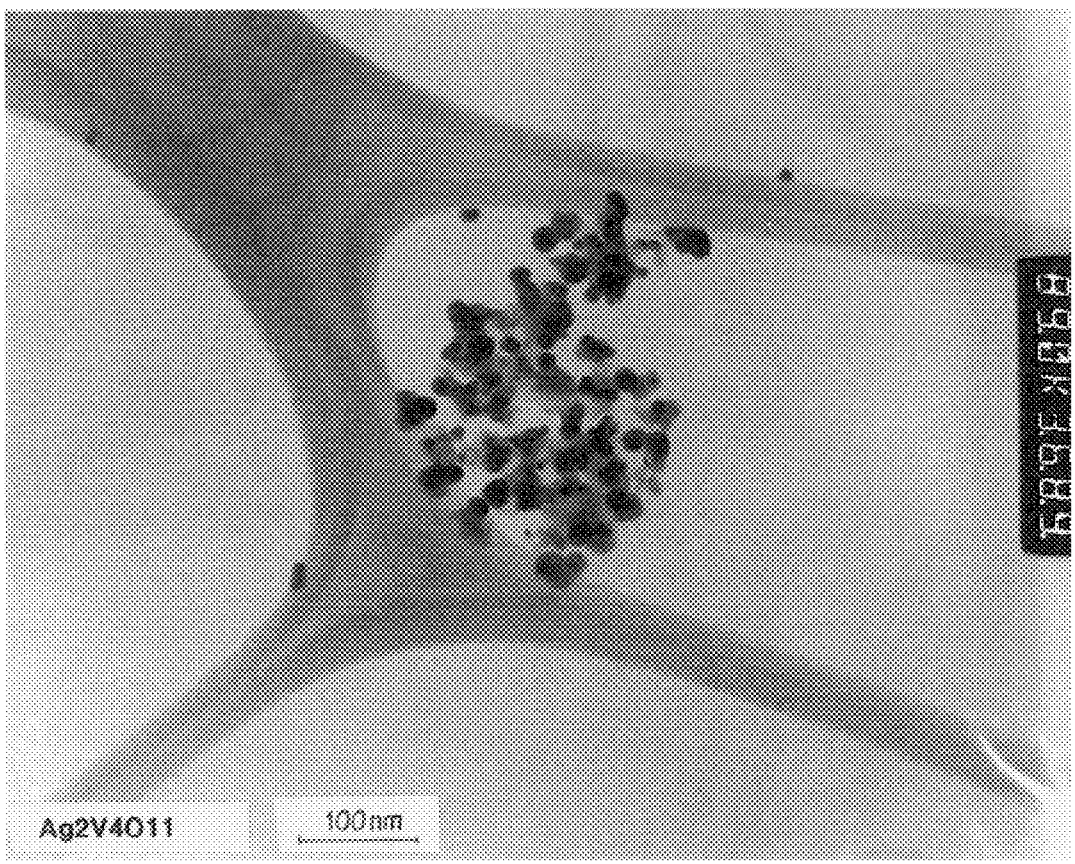
FIG. 15 is a transmission electron microscope view of silver vanadium oxide nanoparticles.
Figure 16:
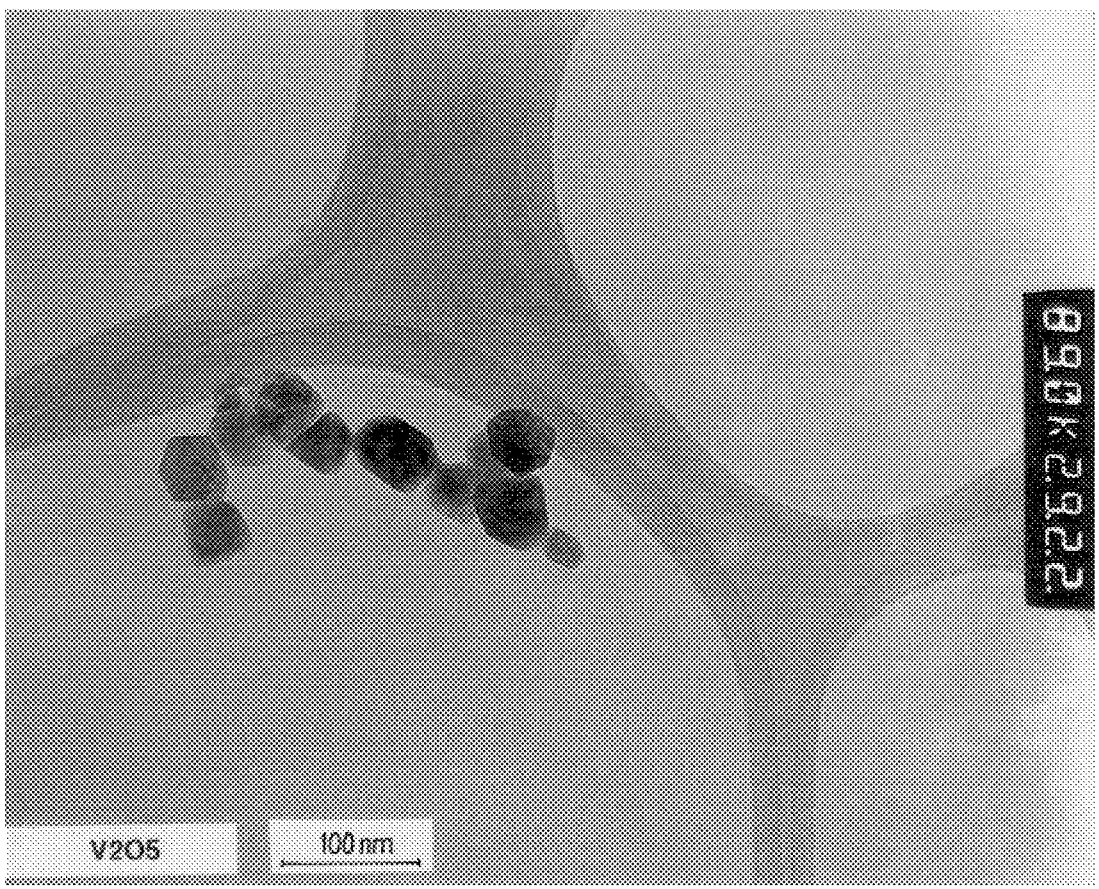
FIG. 16 is a transmission electron microscope view of the $V_2O_5$ nanoparticle samples used to produce the silver vanadium oxide particles shown in FIG. 15.

A transmission electron micrograph of the silver vanadium oxide particles is shown in FIG. 15. For comparison, a transmission electron micrograph of the $V_2O_5$ nanoparticle sample used to form the silver vanadium oxide nanoparticles is shown in FIG. 16, at the same scale as FIG. 15. The $V_2O_5$ nanoparticles in FIG. 16 were produced under conditions similar to the conditions described in Examples 1 and 2. The silver vanadium oxide particles in FIG. 15 surprisingly have a slightly smaller average diameter than the vanadium oxide nanoparticle starting material in FIG. 16.

Example 4

Heat Processing to Form Silver Vanadium Oxide From $VO_2$ Nanoparticles

This example demonstrates the production of nanoscale silver vanadium oxide using a $VO_2$ vanadium oxide nanoparticle starting material. The silver vanadium oxide is produced by heat processing.

$VO_2$ nanoparticles were produced under similar conditions as described above in Example 1. Ten grams of nanocrystalline $VO_2$ powder were washed with 500 ml of deionized water to remove any residual chlorine. The washing was performed in a Corning® 500 ml filter system with a 0.2 μm Nylon® membrane and a side arm for vacuum filtration. The washed nanocrystalline $VO_2$ powder was dried under vacuum at a pressure less than thirty inches of mercury (750 Torr) for a minimum of 12 hours, at a temperature between 100° C. and 120° C. The washed and dried nanocrystalline $VO_2$ was shaken in a SPEX™ 8000 mixer/mill for 15 minutes to break up agglomerates.

Crystalline silver nitrate powder (99+ purity) from EM Industries (Hawthorne, N.Y.) were added quantitatively to the deagglomerated nanocrystalline $VO_2$ powder in a ratio of one mole $AgNO_3$ for 2 moles of $VO_2$. This powder mixture was ground in a Fritsch Mortar Grinder Model P-2 (Gilson Company, Inc., Worthington, Ohio) for twenty minutes. Following grinding, the mixture was heated in a tube furnace, essentially as shown in FIG. 7, in a flowing oxygen atmosphere at a flow rate of 190 milliliters of oxygen per minute.

The heat treatment consisted of heating from room temperature to 180° C. over an hour period, followed by an equilibration time of at least one hour. Then, the temperature was increased gradually to a temperature of about 400° C. The temperature was held at the final temperature for about 20 hours. After heating at the final temperature for the desired period of time, the product was cooled to room temperature over a 5 to 15 hour period.

Figure 17:
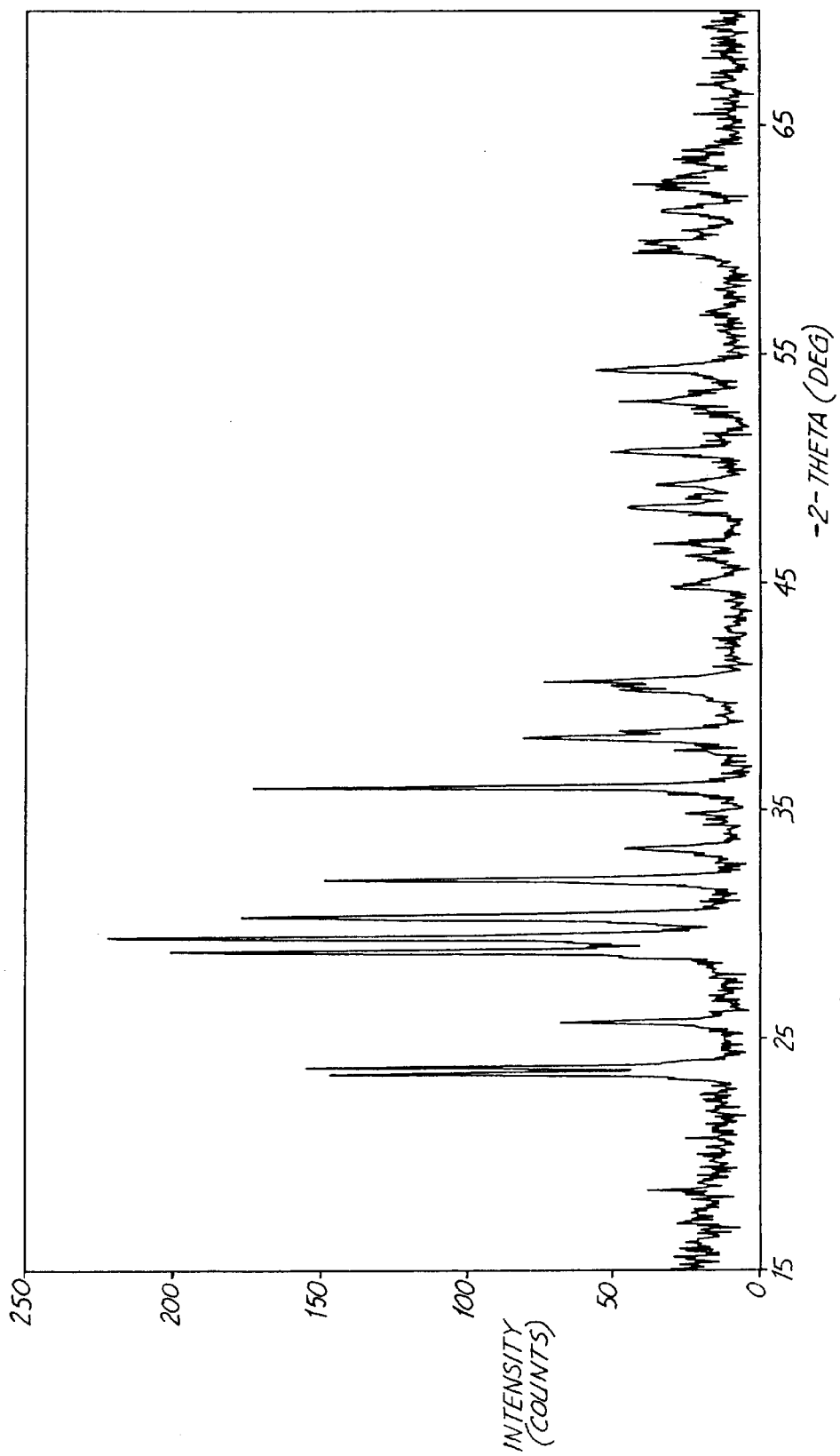
FIG. 17 is an x-ray diffractogram of silver vanadium oxide produced by heat treating a mixture of nanocrystalline $VO_2$ and silver nitrate powder in an oxygen atmosphere.

The crystal structure of the resulting powders were examined by x-ray diffraction. The x-ray diffractogram for the resulting material is shown in FIG. 17. The diffractogram has sharp peaks corresponding to silver vanadium oxide ($Ag_2V_4O_{11}$).

Figure 18:
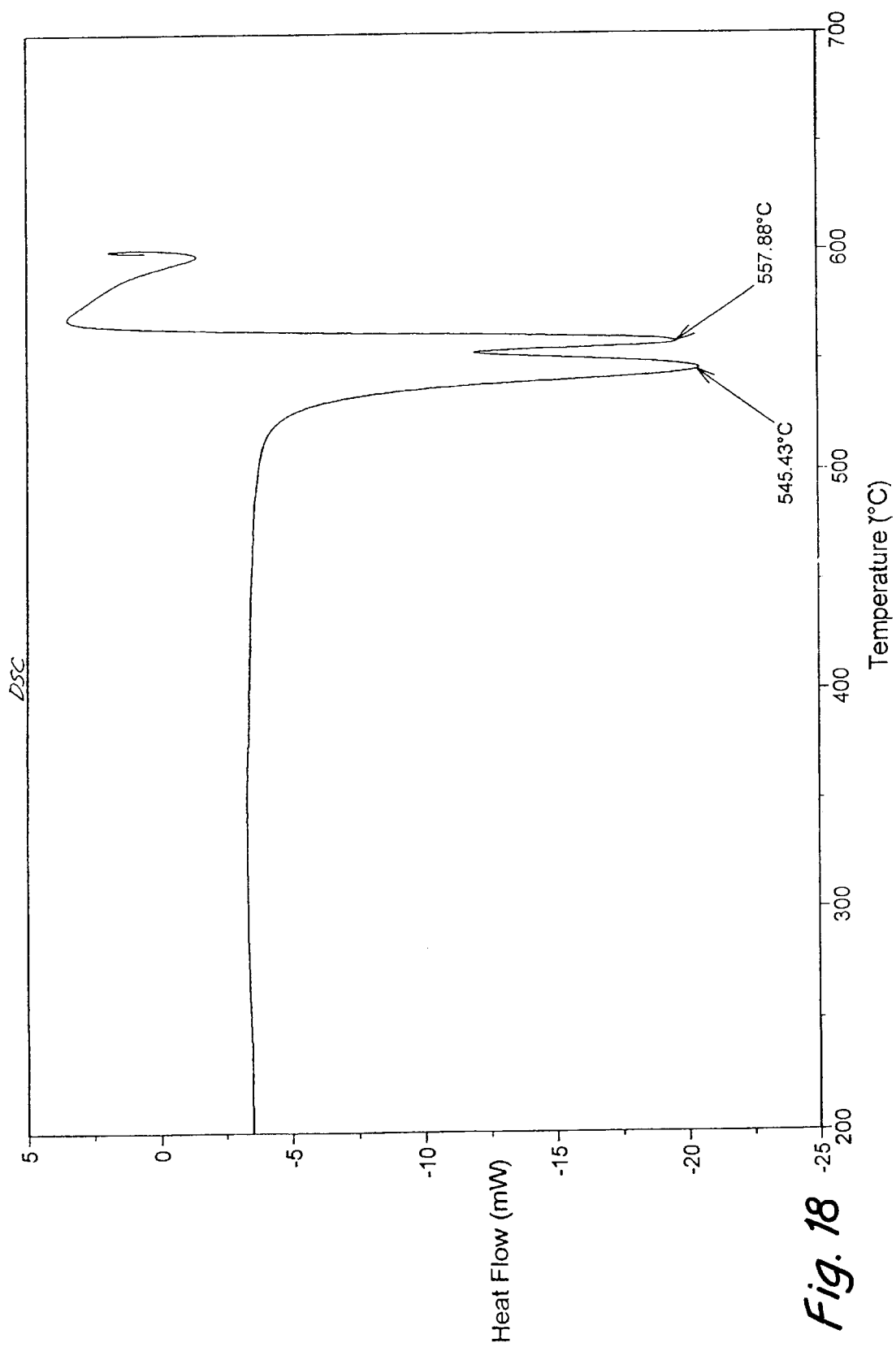
FIG. 18 is a plot of differential scanning calorimetry measurements obtained with samples with an x-ray diffractogram as shown in FIG. 17.

The resulting silver vanadium oxide nanoparticles were further characterized by differential scanning calorimetry (DSC). The DSC apparatus was a model Universal V2.3C DSC apparatus from TA Instruments, Inc., New Castle, Del. The measured heat flow as a function of temperature is plotted in FIG. 18. The curve shows only two isotherms, corresponding to a peritectic transformation at about 558° and a eutectic point at about 545°. These transitions in silver vanadium oxide are described further in P. Fleury, Rev. Chim. Miner., 6(5) 819 (1969).

No lower temperature endotherms were observed. In particular, an endotherm at approximately 463°, corresponding to the melting of $AgVO_3$, was not observed. Thus, the DSC data suggests that the nanoscale silver vanadium oxide material was compositionally pure with respect to other materials having phase transitions up to the 600° C. limit of the DSC test.

This dry powder mixing approach was also used successfully to produce silver vanadium oxide nanoparticles from a mixture of nanocrystalline $V_2O_5$ and crystalline silver nitrate powders, except that the washing step generally is unnecessary since nanocrystalline $V_2O_5$ nanoparticles produced in a heat treatment process do not contain residual chlorine. Furthermore, the molar ratios are adjusted accordingly.

Example 5

Direct Laser Pyrolysis Synthesis of Nanoscale Silver—Vanadium Oxide Materials

The synthesis of nanoscale silver—vanadium oxide materials described in this example was performed by laser pyrolysis. The particles were produced using essentially the laser pyrolysis apparatus of FIG. 1, described above, using the reactant delivery apparatus of FIG. 3A.

The solution for delivery as an aerosol in the reaction chamber was produced with a vanadium precursor solution. To produce the vanadium precursor solution, first a 20.0 g sample of vanadium (III) oxide ($V_2O_3$) from Aldrich Chemical (Milwaukee, Wis.) was suspended in 240 ml of deionized water. A 60 ml quantity of 70% by weight aqueous nitric acid ($HNO_3$) solution was added dropwise to the vanadium (III) oxide suspension with vigorous stirring. Caution was taken because the reaction with nitric acid is exothermic and liberates a brown gas suspected to be $NO_2$. The resulting vanadium precursor solution was a dark blue solution.

To produce the precursor solution for aerosol delivery, a solution of silver nitrate ($AgNO_3$) was prepared by dissolving 22.7 g of silver nitrate from Aldrich Chemical (Milwaukee, Wis.) in a 200 ml volume of deionized water. To prepare a solution of metal mixtures for aerosol delivery, the silver nitrate solution was added to the vanadium precursor solution with constant stirring. The resulting dark blue solution had a molar ratio of vanadium to silver of about 2:1. Experiments using higher relative amounts of silver yielded comparable results.

The aqueous solution with the vanadium and silver precursors was carried into the reaction chamber as an aerosol. $C_2H_4$ gas was used as a laser absorbing gas, and Argon was used as an inert gas. $O_2$, Ar and $C_2H_4$ were delivered into the gas supply tube of the reactant supply system. The reactant mixture containing vanadium oxide, silver nitrate, Ar, $O_2$ and $C_2H_4$ was introduced into the reactant nozzle for injection into the reaction chamber. The reactant nozzle had an opening with dimensions of ⅝ in.×¼ in. Additional parameters of the laser pyrolysis synthesis relating to the particles of Example 1 are specified in Table 2.

TABLE 2

Figure 19:
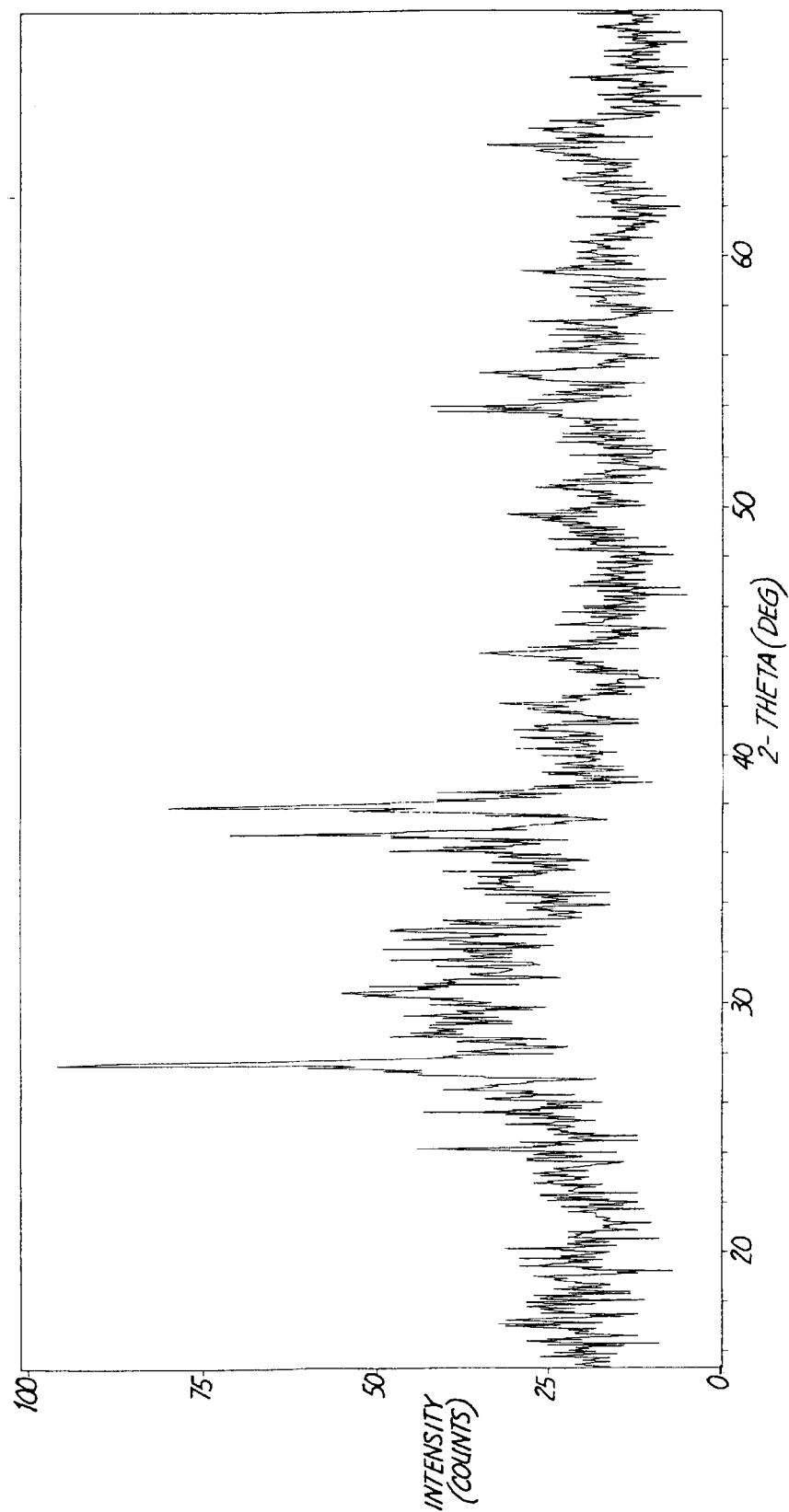
FIG. 19 is a plot of an x-ray diffractogram of mixed phase silver—vanadium oxide materials produced directly by laser pyrolysis synthesis.

| | 1 |
|---|---|
| Crystal Structure | Mixed Phase |
| Pressure (Torr) | 450 |
| Argon-Window (SLM) | 2.00 |
| Argon-Shielding (SLM) | 9.81 |
| Ethylene (SLM) | 0.73 |
| Argon (SLM) | 4.00 |
| Oxygen (SLM) | 0.96 |
| Laser Power (input) (Watts) | 490–510 |
| Laser Power (output) (Watts) | 450 |
| Vanadium/Silver Mole Ratio | 2:1 |
| Precursor Temperature ° C. | Room Temperature | slm = standard liters per minute
Argon-Win. = argon flow through inlets 216, 218
Argon-Sld. = argon flow through annular channel 142.
Argon = Argon directly mixed with the aerosol To evaluate the atomic arrangement, the samples were examined by x-ray diffraction using the Cu(Kα) radiation line on a Siemens D500 x-ray diffractometer. X-ray diffractograms for a sample produced under the conditions specified in Table 2 are shown in FIG. 19. The diffractogram has peaks that can be identified as $VO_2$, $V_2O_3$, and elemental silver. Additional peaks in the diffractograms of have not been correlated with known materials and are discussed further in Example 7.

Figure 20:
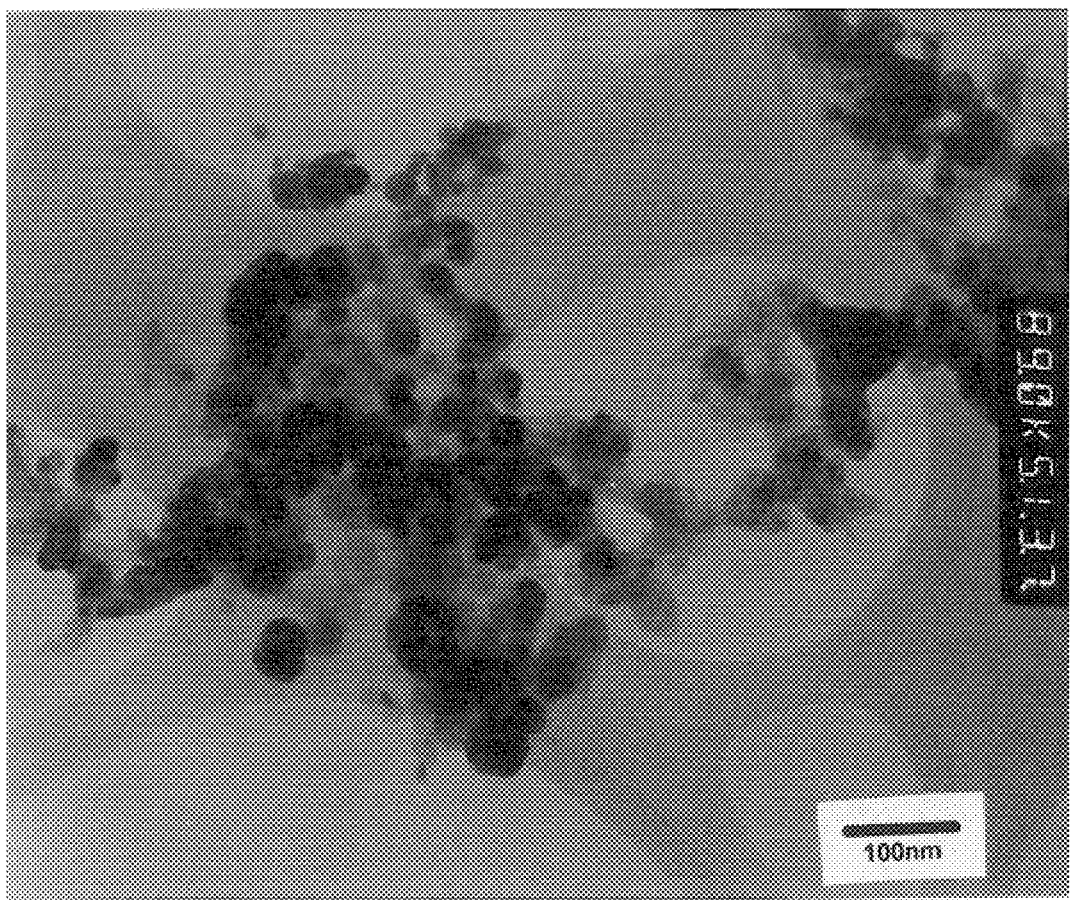
FIG. 20 is a transmission electron micrograph of silver—vanadium oxide materials produced directly by laser pyrolysis synthesis, which produce an x-ray diffractogram as shown in FIG. 19.

Powders of a sample produced under the conditions of Table 2 were further analyzed using transmission electron microscopy. The TEM micrograph is shown in FIG. 20. The TEM micrograph has a particles falling within different size distributions. This is characteristic of mixed phase materials made by laser pyrolysis, where each material generally has a very narrow particle size distribution.

Furthermore, as described in the following Example, heat treatment of these nanoscale silver—vanadium oxide materials in an oxygen environment can result in crystalline $Ag_2V_4O_{11}$ in high yields.

Example 6

Heat Treatment of Laser Pyrolysis Produced Nanoscale Silver—Vanadium Oxide Materials This example demonstrates the production of nanoscale crystalline silver vanadium oxide $Ag_2V_4O_{11}$ starting with nanoscale silver—vanadium oxide materials produced by laser pyrolysis, as described in Example 5.

A sample silver—vanadium oxide powder corresponding to a sample from Example 5 weighing between about 300 and about 700 mg of nanoparticles were placed into an open 1 cc boat. The boat was placed within the quartz tube projecting through an oven to perform the heat processing. The oven was essentially as described above with respect to FIG. 7. Oxygen gas was flowed through a 1.0 in diameter quartz tube at a flow rate of about 30 sccm.

The heat treatment consisted of heating from room temperature to 180° C. over an hour period, followed by an equilibration time of at least one hour. Then, the temperature was increased approximately at a rate of 3° C. per minute to a temperature of about 360° C. The temperature was held at the final temperature for 16.5 hours. After heating at the final temperature for the desired period of time, the product was cooled to room temperature at a rate of about 1 degree per minute. The heating time given above did not include the heating and cooling time.

Figure 21:
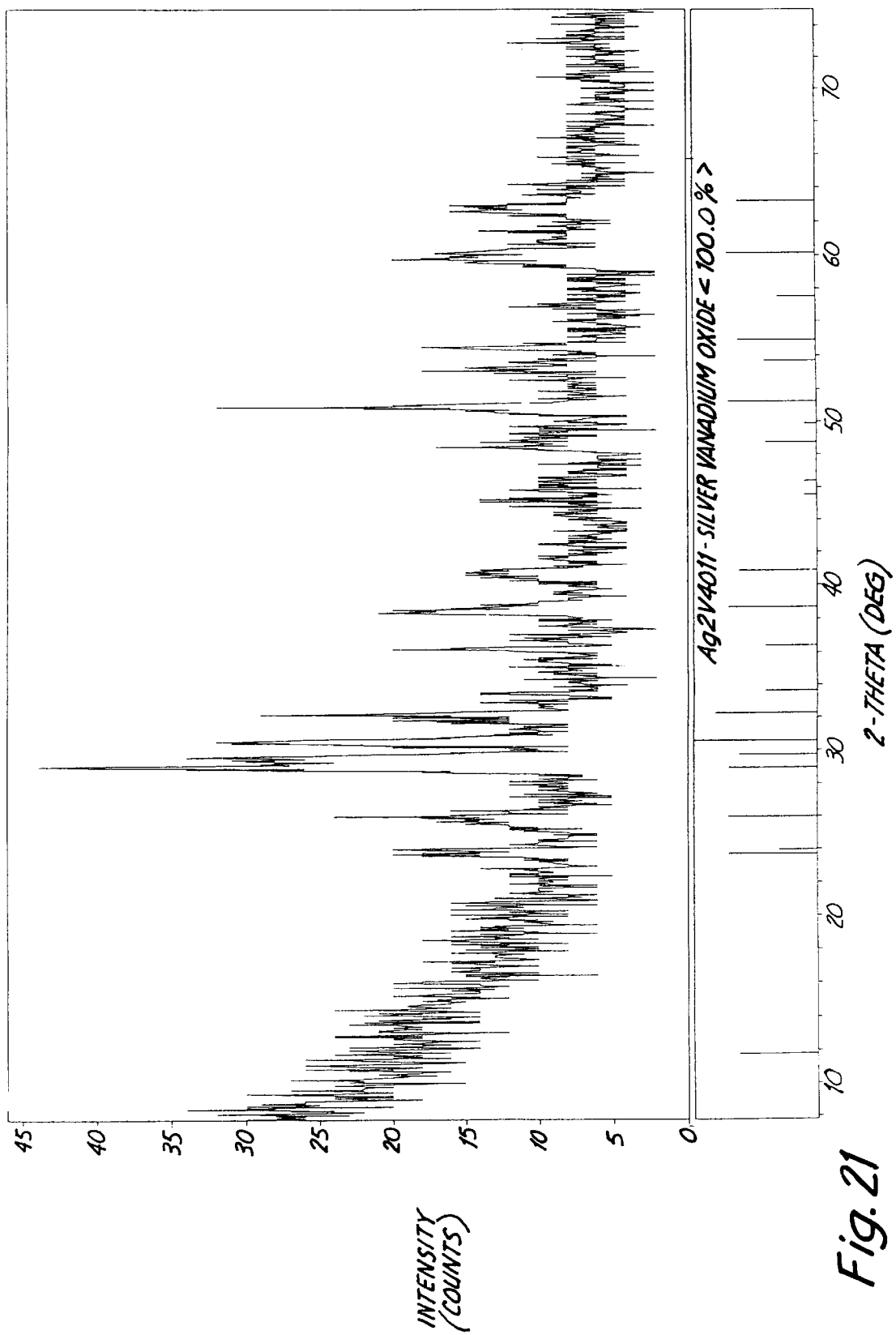
FIG. 21 is an x-ray diffractogram of silver vanadium oxide particles following a heat treatment in an oxygen atmosphere of nanoscale silver—vanadium oxide materials as synthesized by laser pyrolysis.
Figure 22:
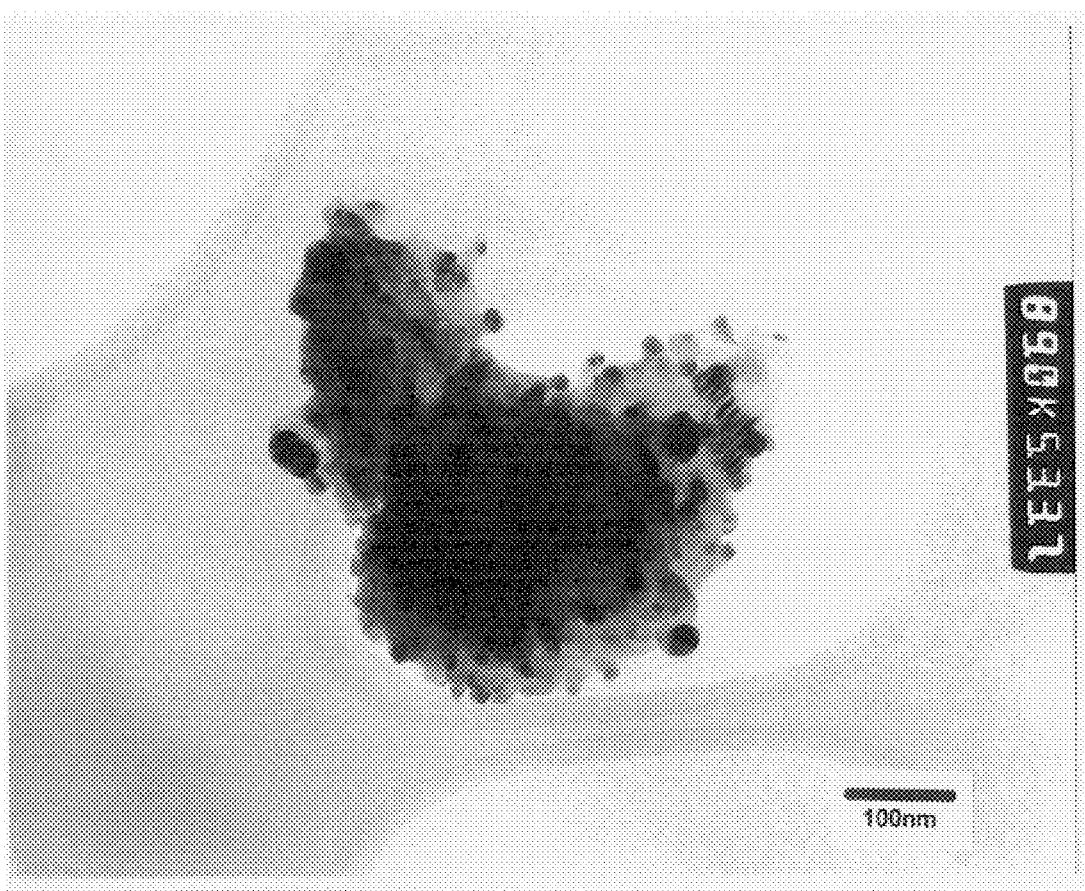
FIG. 22 is a transmission electron micrograph of silver vanadium oxide particles produced by heat treating nanoscale silver—vanadium oxide materials.

The structure of the particles following heating was examined by x-ray diffraction. The x-ray diffractograms for the sample following heating is shown in FIG. 21. The heat treated powders were also examined by transmission electron microscopy. A TEM micrograph of the samples is shown in FIG. 22.

Example 7

Direct Laser Pyrolysis Synthesis of Silver Vanadium Oxide Nanoparticles

The synthesis of silver vanadium oxide nanoparticles described in this example was performed by laser pyrolysis. The particles were produced using essentially the laser pyrolysis apparatus of FIG. 1, described above, using the reactant delivery apparatus of FIG. 3A or 3B.

Two solutions were prepared for delivery into the reaction chamber as an aerosol. Both solutions were produced with comparable vanadium precursor solutions. To produce the first vanadium precursor solution, a 10.0 g sample of vanadium (III) oxide ($V_2O_3$) from Aldrich Chemical (Milwaukee, Wis.) was suspended in 120 ml of deionized water. A 30 ml quantity of 70% by weight aqueous nitric acid ($HNO_3$) solution was added dropwise to the vanadium (III) oxide suspension with vigorous stirring. Caution was taken because the reaction with nitric acid is exothermic and liberates a brown gas suspected to be $NO_2$. The resulting vanadium precursor solution (about 150 ml) was a dark blue solution. The second vanadium precursor solution involved the scale-up of the first precursor solution by a factor of three in all ingredients.

To produce a first silver solution, a solution of silver carbonate ($Ag_2CO_3$) from Aldrich Chemical (Milwaukee, Wis.) was prepared by suspending 9.2 g of silver carbonate in a 100 ml volume of deionized water. A 10 ml quantity of 70% by weight aqueous nitric acid ($HNO_3$) was added dropwise with vigorous stirring. A clear colorless solution resulted upon completion of the addition of nitric acid. To produce a first metal mixture solution for aerosol delivery, the silver solution was added to the first vanadium precursor solution with constant stirring. The resulting dark blue first metal mixture solution had a molar ratio of vanadium to silver of about 2:1.

To produce a second silver solution, 34.0 g of silver nitrate ($AgNO_3$) from Aldrich Chemical (Milwaukee, Wis.) was dissolved in a 300 ml volume of deionized water. To prepare a second solution of metal mixtures for aerosol delivery, the silver nitrate solution was added to the second vanadium precursor solution with constant stirring. The resulting dark blue second metal mixture solution also had a molar ratio of vanadium to silver of about 2:1.

The selected aqueous solution with the vanadium and silver precursors was carried into the reaction chamber as an aerosol. $C_2H_4$ gas was used as a laser absorbing gas, and Argon was used as an inert gas. $O_2$, Ar and $C_2H_4$ were delivered into the gas supply tube of the reactant supply system. The reactant mixture containing vanadium oxide, silver nitrate, Ar, $O_2$ and $C_2H_4$ was introduced into the reactant nozzle for injection into the reaction chamber. The reactant nozzle had an opening with dimensions of 5/8 in.×1/4 in. Additional parameters of the laser pyrolysis synthesis relating to the particle synthesis are specified in Table 3. Sample 1 was prepared using the reactant delivery system essentially as shown in FIG. 3A while sample 2 was prepared using the reactant delivery system essentially as shown in FIG. 3B.

TABLE 3

Figure 23:
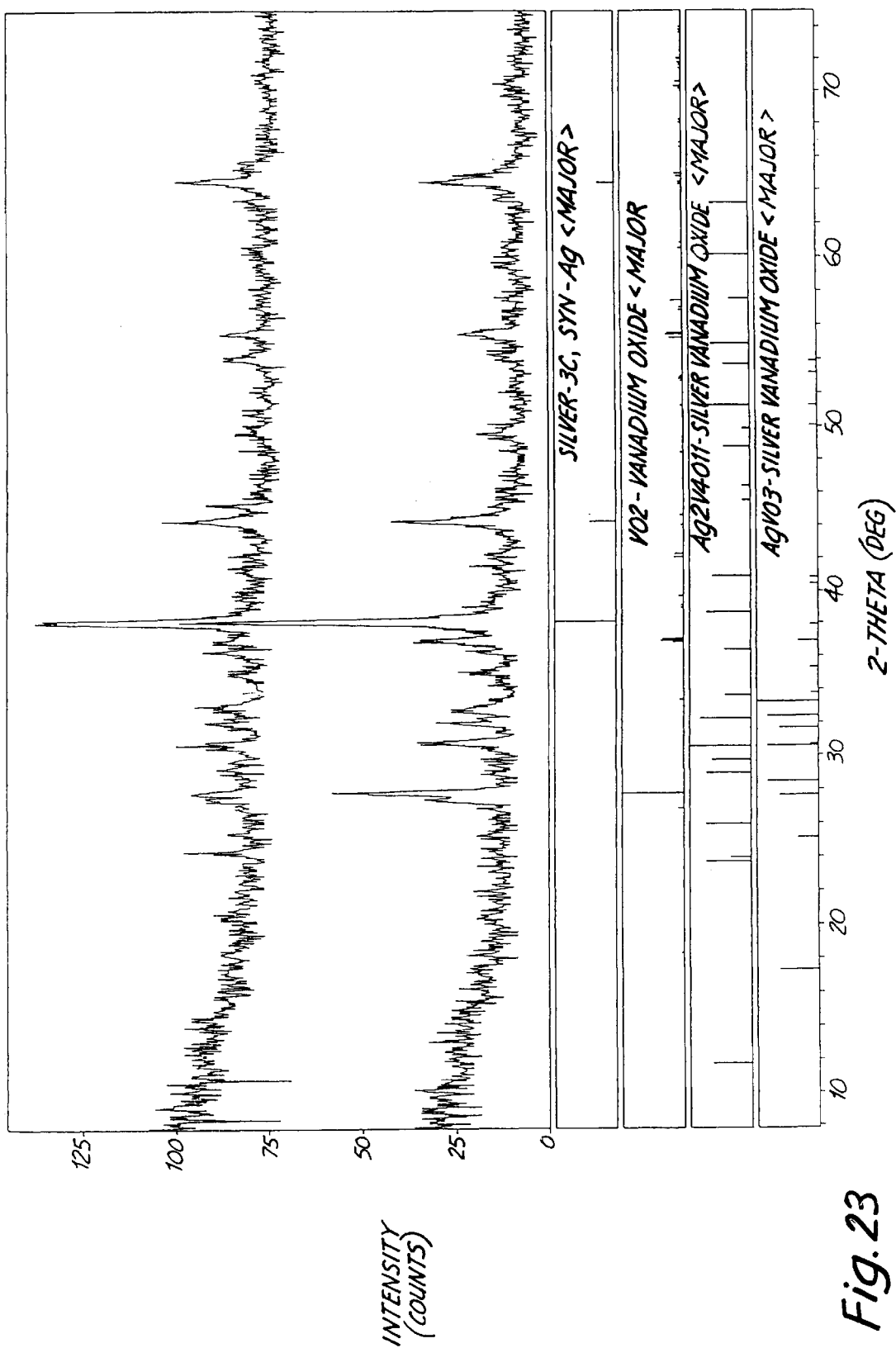
FIG. 23 is a plot of two x-ray diffractograms of mixed phase materials including silver vanadium oxide nanoparticles produced directly by laser pyrolysis, where each plot is produced with materials produced under slightly different conditions.

|  | 1 | 2 |
|---|---|---|
| Crystal Structure | Mixed Phase | Mixed Phase |
| Pressure (Torr) | 600 | 600 |
| Argon-Window (SLM) | 2.00 | 2.00 |
| Argon-Shielding (SLM) | 9.82 | 9.86 |
| Ethylene (SLM) | 0.74 | 0.81 |
| Argon (SLM) | 4.00 | 4.80 |
| Oxygen (SLM) | 0.96 | 1.30 |
| Laser Power (input) (Watts) | 490–531 | 390 |
| Laser Power (output) (Watts) | 445 | 320 |
| Precursor Solution | 1 | 2 |
| Precursor Temperature °C. | Room Temperature | Room Temperature | slm = standard liters per minute
Argon-Win. = argon flow through inlets 216, 218
Argon-Sld. = argon flow through annular channel 142.
Argon = Argon directly mixed with the aerosol To evaluate the atomic arrangement, the samples were examined by x-ray diffraction using the Cu(Kα) radiation line on a Siemens D500 x-ray diffractometer. X-ray diffractograms for samples 1 (lower curve) and 2 (upper curve) produced under the conditions specified in Table 3 are shown in FIG. 23. The samples had peaks corresponding to $VO_2$, elemental silver and peaks that did not correspond to known materials. A significant crystalline phase for these samples had peaks at 2θ equal to about 30–31°, 32, 33 and 35. This phase is thought to be a previously unidentified silver vanadium oxide phase. This phase is observed in samples prepared by mixing vanadium oxide nanoparticles and silver nitrate under conditions where the samples are heated for an insufficient time period to produce $Ag_2V_4O_{11}$. Specific capacity measurements of sample 1 in a coin cell, presented below, are consistent with this interpretation. These peaks in smaller amounts are also observed in the samples produced under the conditions described in Example 5.

Figure 24A:
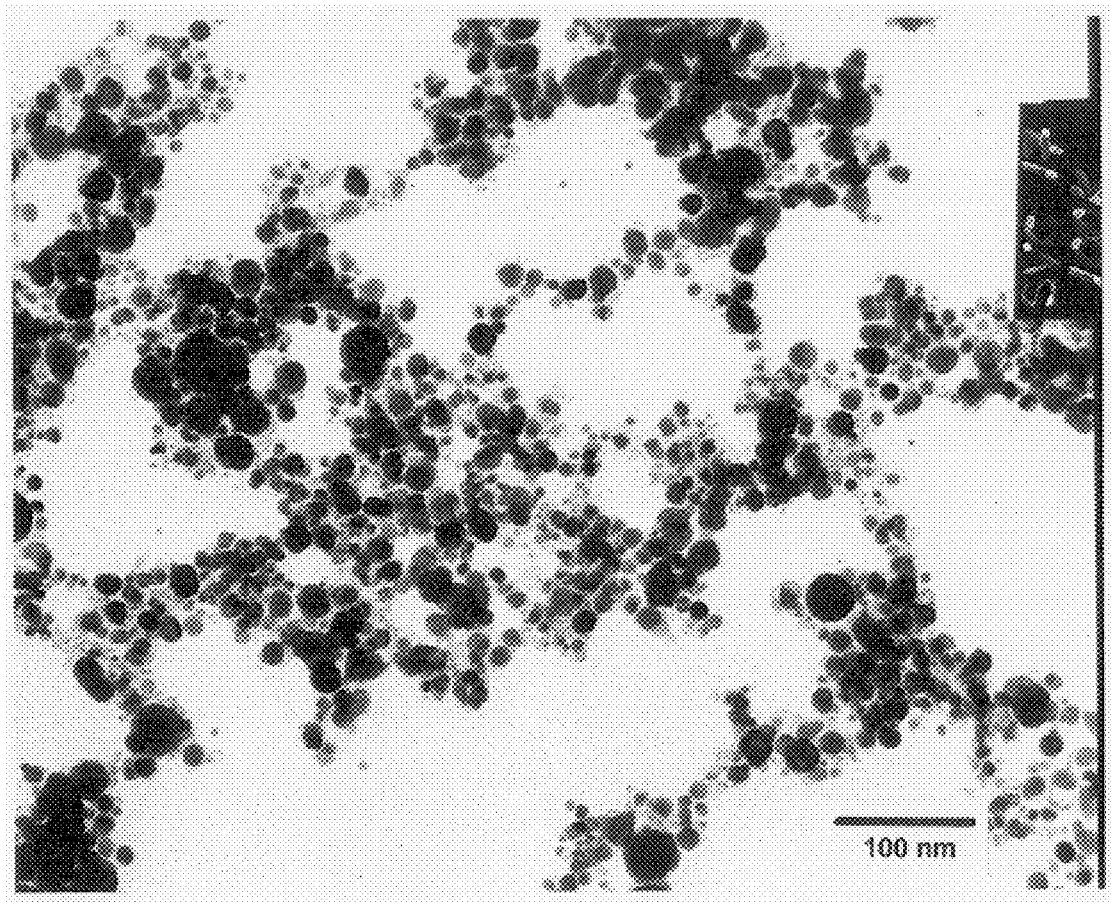
FIG. 24A is a transmission electron micrograph of the materials from the sample corresponding to the upper diffractogram in FIG. 23.
Figure 24B:
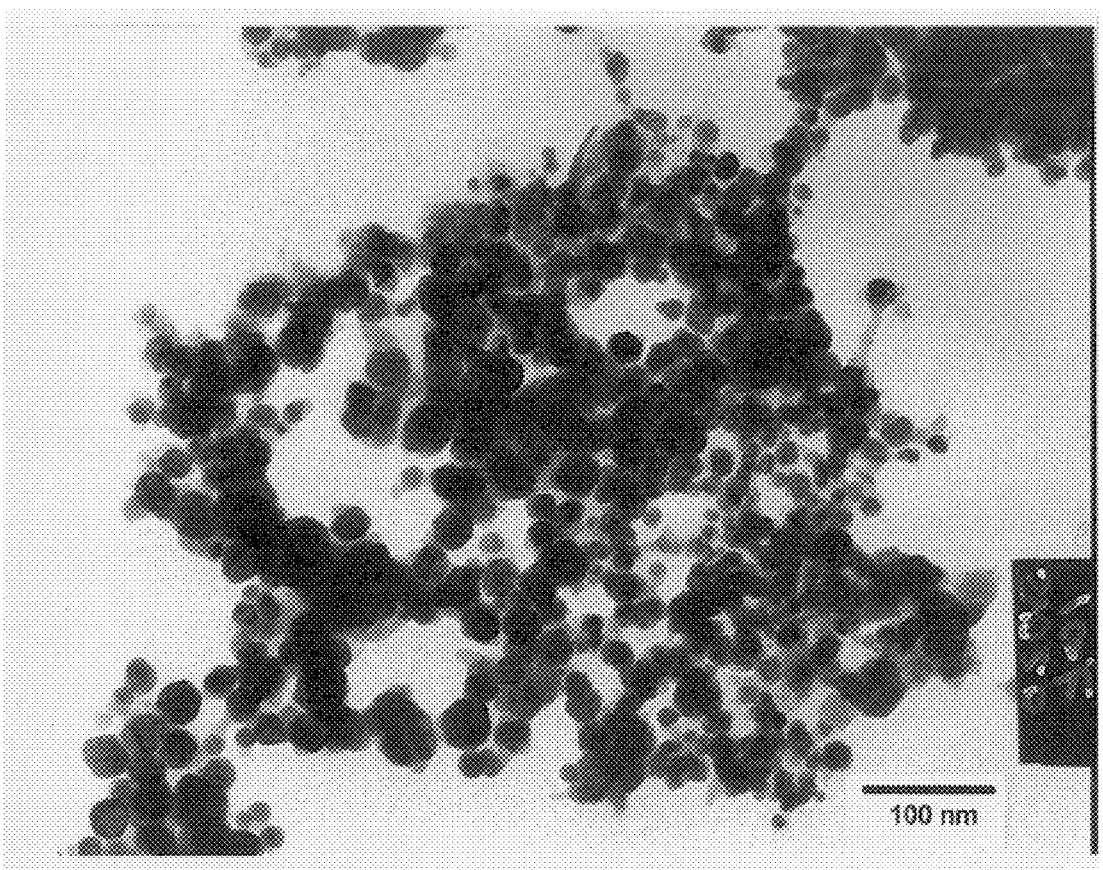
FIG. 24B is a transmission electron micrograph of the materials from the sample corresponding to the lower diffractogram in FIG. 23.

Powders of samples produced under the conditions specified in Table 3 were further analyzed using transmission electron microscopy. The TEM micrographs are shown in FIGS. 24A (first column of Table 3) and 24B (second column of Table 3). The TEM micrograph has a particles falling within different size distributions. This is characteristic of mixed phase materials made by laser pyrolysis, where each material generally has a very narrow particle size distribution. The portion of silver vanadium oxide in the mixed phase material should be increased by an increase in oxygen flow, a decrease in laser power and an increase in pressure.

Example 8

Direct Laser Pyrolysis Synthesis of Silver Vanadium Oxide Nanoparticles

The synthesis of silver vanadium oxide nanoparticles described in this example was performed by laser pyrolysis. The particles were produced using essentially the laser pyrolysis apparatus of FIG. 1, described above, using the reactant delivery apparatus of FIG. 3B.

A solution was prepared for delivery into the reaction chamber as an aerosol. To produce the first vanadium precursor solution, a 20.0 g sample of vanadium (III) oxide ($V_2O_3$) from Aldrich Chemical (Milwaukee, Wis.) was suspended in 240 ml of deionized water. A 60 ml quantity of 70% by weight aqueous nitric acid ($HNO_3$) solution was added dropwise to the vanadium (III) oxide suspension with vigorous stirring. Caution was taken because the reaction with nitric acid is exothermic and liberates a brown gas suspected to be $NO_2$. The resulting vanadium precursor solution (about 300 ml) was a dark blue solution.

Five different silver solutions were prepared to produce a solution for aerosol delivery with varying ratios of silver to vanadium. To produce the silver solutions, a quantity of silver nitrate ($AgNO_3$) from Aldrich Chemical (Milwaukee, Wis.) was dissolved in a 200 ml volume of deionized water. The five silver solutions had the following grams of silver nitrate: 1) 15.9 g, 2) 18.1 g, 3) 20.4 g, 4) 22.7 g, 5) 23.8 g. To prepare solutions of metal mixtures for aerosol delivery, the silver nitrate solution was added to a vanadium precursor solution with constant stirring. The resulting dark blue second metal mixture solution. The five solutions had the following molar ratio of silver to vanadium: 1) 0.7:2, 2) 0.8:2, 3) 0.9:2, 4) 1.0:2, 5) 1.05:2.

The selected aqueous solution with the vanadium and silver precursors was carried into the reaction chamber as an aerosol. $C_2H_4$ gas was used as a laser absorbing gas, and Argon was used as an inert gas. $O_2$, Ar and $C_2H_4$ were delivered into the gas supply tube of the reactant supply system. The reactant mixture containing vanadium oxide, silver nitrate, Ar, $O_2$ and $C_2H_4$ was introduced into the reactant nozzle for injection into the reaction chamber. The reactant nozzle had an opening with dimensions of ⅝ in.×¼ in. Additional parameters of the laser pyrolysis synthesis relating to the particle synthesis are specified in Table 4.

TABLE 4

Figure 25:
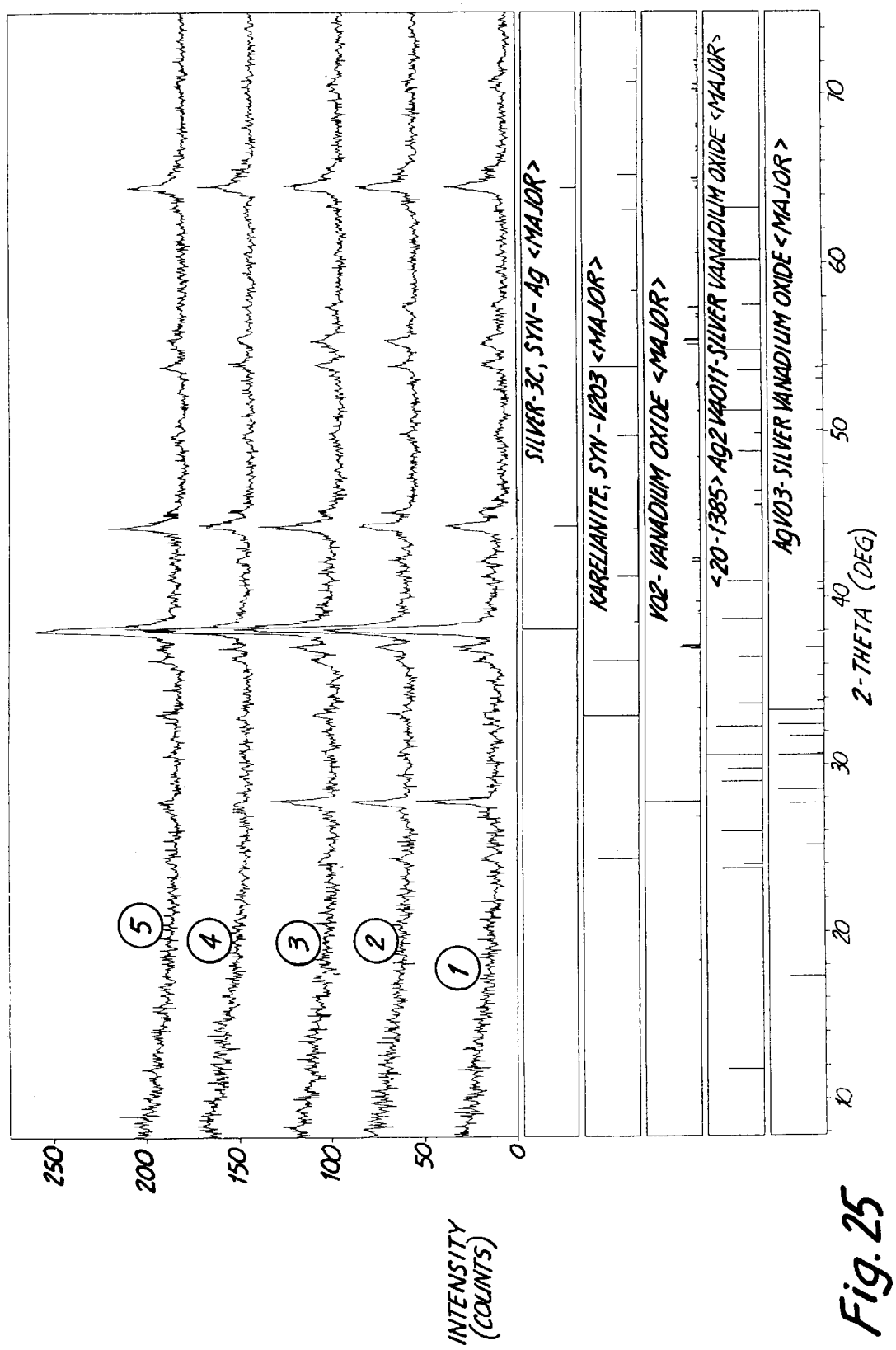
FIG. 25 is a plot of five x-ray diffractograms of mixed phase materials including silver vanadium oxide nanoparticles produced directly by laser pyrolysis, where each plot is produced with materials produced with a different silver to vanadium ratio.

| Crystal Structure | Mixed Phase |
|---|---|
| Pressure (Torr) | 600 |
| Argon-Window (SLM) | 2.00 |
| Argon-Shielding (SLM) | 9.86 |
| Ethylene (SLM) | 0.81 |
| Argon (SLM) | 4.80 |
| Oxygen (SLM) | 1.30 |
| Laser Power (input) (Watts) | 390 |
| Laser Power (output) (Watts) | 320 |
| Precursor Temperature °C. | Room Temperature | slm = standard liters per minute
Argon-Win. = argon flow through inlets 216, 218
Argon-Sld. = argon flow through annular channel 142.
Argon = Argon directly mixed with the aerosol To evaluate the atomic arrangement, the samples were examined by x-ray diffraction using the Cu(Kα) radiation line on a Siemens D500 x-ray diffractometer. X-ray diffractograms for samples 1–5 produced under the conditions specified in Table 4 are shown in FIG. 25. The samples had peaks corresponding to $VO_2$, elemental silver, possibly $V_2O_3$ and peaks that did not correspond to known materials. A significant crystalline phase for these samples had peaks at 2θ equal to about 30–31°, 32, 33 and 35. As noted above, this phase is thought to be a previously unidentified silver vanadium oxide phase. Under these conditions, as the silver to vanadium ratio increased, the peaks corresponding to vanadium oxide decreased. Evidently, additional amorphous components containing vanadium, oxygen and possibly silver were produced when the relative amount of silver was increased.

Example 9

Laser Pyrolysis Production of Elemental Silver Nanoparticles

The synthesis of elemental silver nanoparticles described in this example was performed by laser pyrolysis. The particles were produced using essentially the laser pyrolysis apparatus of FIG. 1, described above, using the reactant delivery apparatus of FIG. 3A.

A 1 molar silver nitrate solution was prepared for delivery into the reaction chamber as an aerosol by dissolving 50.96 g of silver nitrate (Aldrich Chemical, Milwaukee, Wis.) into 300 ml deionized water to produce a clear solution. $C_2H_4$ gas was used as a laser absorbing gas, and Argon was used as an inert gas. $O_2$, Ar and $C_2H_4$ were delivered into the gas supply tube of the reactant supply system. The reactant mixture containing silver nitrate, Ar, $O_2$ and $C_2H_4$ was introduced into the reactant nozzle for injection into the reaction chamber. The reactant nozzle had an opening with dimensions of ⅝ in.×¼ in. Additional parameters of the laser pyrolysis synthesis relating to the particle synthesis are specified in Table 5.

TABLE 5

Figure 26:
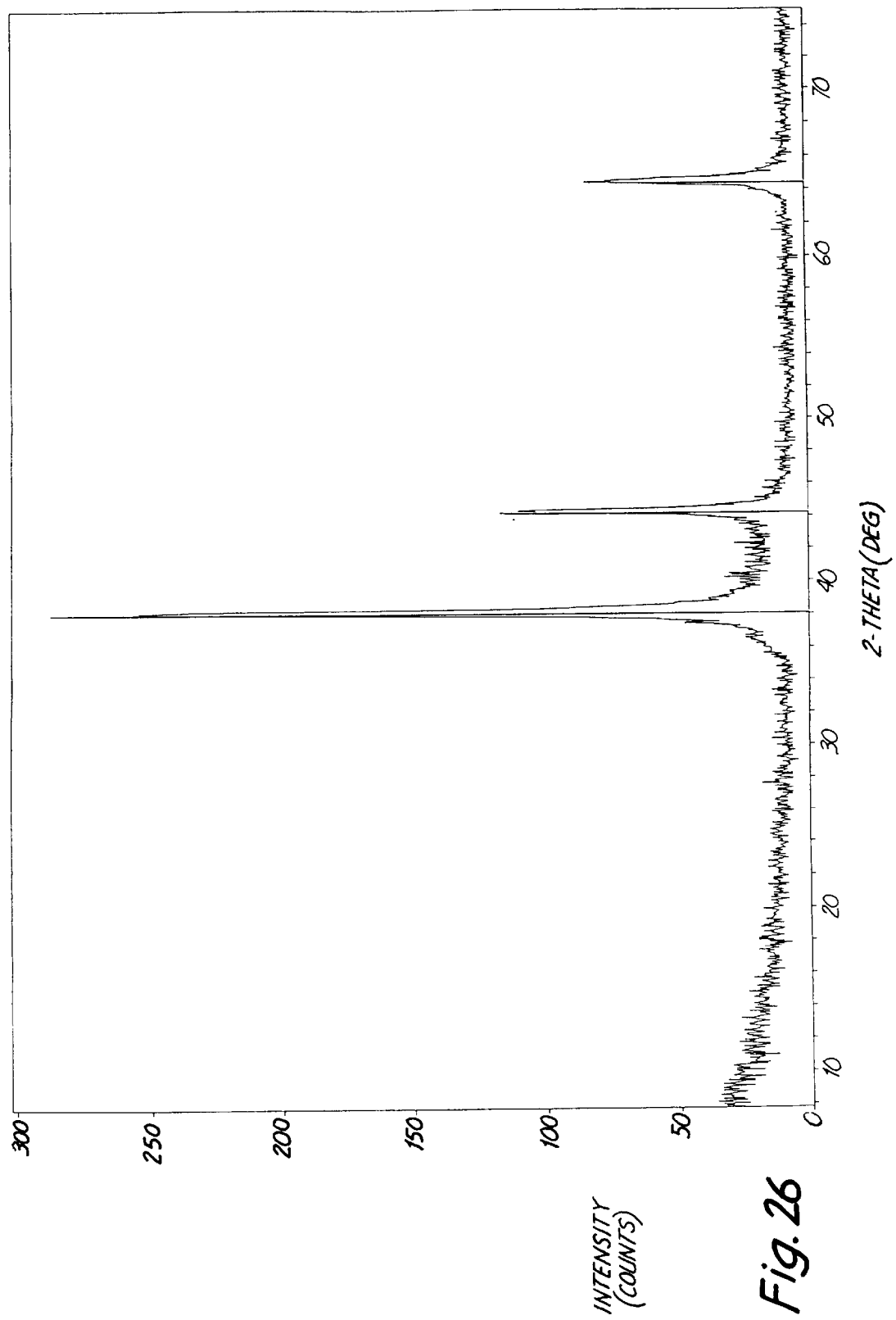
FIG. 26 is an x-ray diffractogram of elemental silver nanoparticles produced by laser pyrolysis under the conditions specified in the first column of Table 5.
Figure 27:
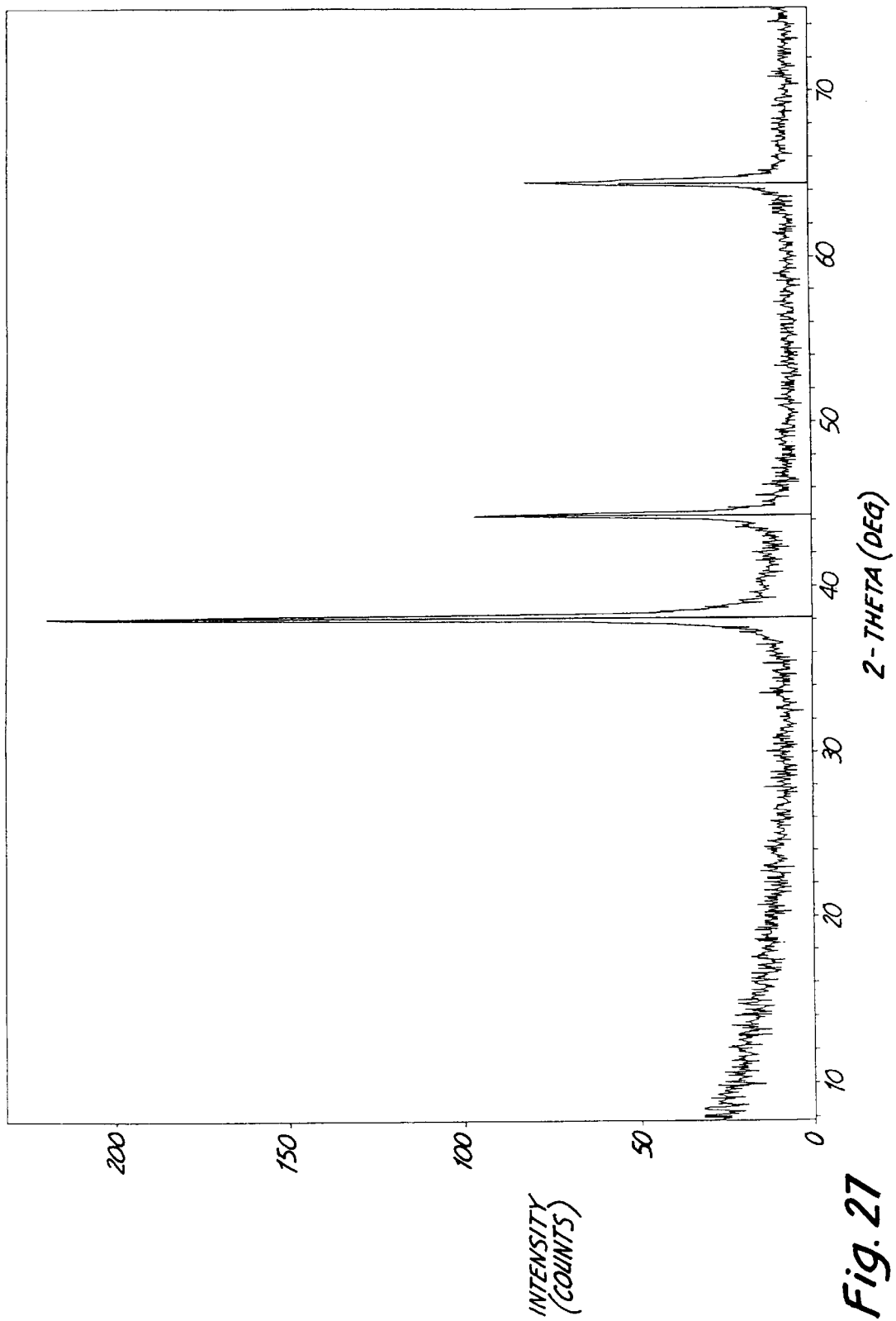
FIG. 27 is an x-ray diffractogram of elemental silver nanoparticles produced by laser pyrolysis under the conditions specified in the second column of Table 5.

|  | 1 | 2 |
| --- | --- | --- |
| Crystal Structure | face centered cubic | face centered cubic |
| Pressure (Torr) | 450 | 450 |
| Argon-Window (SLM) | 2.00 | 2.00 |
| Argon-Shielding (SLM) | 9.82 | 9.82 |
| Ethylene (SLM) | 1.342 | 0.734 |
| Argon (SLM) | 5.64 | 3.99 |
| Oxygen (SLM) | 1.41 | 0.96 |
| Laser Power (input) (Watts) | 970 | 490 |
| Laser Power (output) (Watts) | 800 | 450 |
| Production Rate (gram/hour) | 1.44 | 1.02 |
| Precursor Temperature ° C. | Room Temperature | Room Temperature | slm = standard liters per minute
Argon-Win. = argon flow through inlets 216, 218
Argon-Sld. = argon flow through annular channel 142.
Argon = Argon directly mixed with the aerosol To evaluate the atomic arrangement, the samples were examined by x-ray diffraction using the Cu(Kα) radiation line on a Siemens D500 x-ray diffractometer. X-ray diffractograms for sample 1 and sample 2 produced under the conditions specified in Table 5 are shown in FIGS. 26 and 27, respectively. The samples had strong peaks corresponding to elemental silver.

Figure 28:
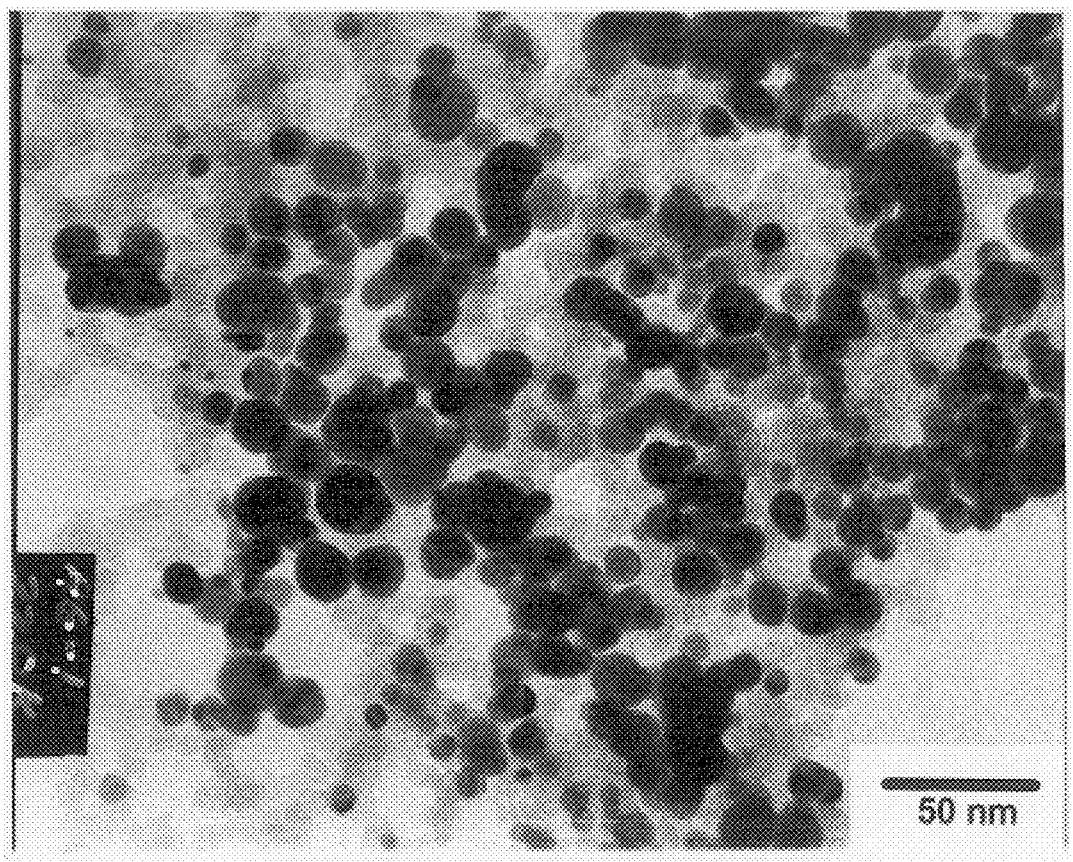
FIG. 28 is a transmission electron micrograph of the materials from the sample corresponding to the diffractogram in FIG. 26.

Powders produced under the conditions of column 1 of Table 5 were further analyzed using transmission electron microscopy. The TEM micrograph is shown in FIG. 28. The particle size distribution in the TEM micrograph is broad relative to particle size distributions involving laser pyrolysis synthesis. The particle size distribution can be narrowed significantly by either using gas phase precursors or a more uniform aerosol delivery.

Representative particles were also analyzed by elemental analysis. A typical elemental analysis of these materials yielded in weight percent about 93.09% silver, 2.40% carbon, 0.05% hydrogen, and 0.35% nitrogen. Oxygen was not directly measured and may have accounted for some of the remaining weight. The elemental analysis was performed by Desert Analytics, Tucson, Ariz.

The carbon component in the nanoparticles likely is in the form of a coating. Such carbon coatings can be formed from the carbon introduced by ethylene within the reactant stream. Generally, the carbon can be removed by heating under an oxidizing atmosphere under mild conditions. The removal of such carbon coatings is described further in copending and commonly assigned, U.S. patent application Ser. No. 09/123,255, entitled "Metal (Silicon) Oxide/Carbon Composite Particles," incorporated herein by reference.

Since other group IB elements, copper and gold, have similar chemical properties as silver, substitution of copper or gold precursors for the silver precursors under similar conditions should result in the production of elemental copper or gold nanoparticles.

Example 10

Lithium Batteries Formed With Silver Vanadium Oxide Nanoparticles

This example demonstrates the suitability of silver vanadium oxide particles for the production of lithium based batteries and the attainability of an increased capacity.

To produce a test cell incorporating silver vanadium oxide produced according to one of the Examples above, a desired quantity of silver vanadium oxide nanoparticles was weighed and combined with predetermined amounts of graphite powder (Chuetsu Graphite Works, CO., Osaka, Japan) and acetylene black powder (Catalog number 55, Chevron Corp.) as conductive diluents, and a 60% by weight dispersion of Teflon® (Catalog No. 44,509-6, Aldrich Chemical Co., Milwaukee, Wis.) in water as a binder. The mixture included 70% by weight silver vanadium oxide nanoparticles, 10% by weight graphite, 10% by weight acetylene black, and 10% by weight Teflon®. The resulting combination was mixed well, kneaded, and rolled into a one-millimeter thick sheet. An approximately two-square centimeter area disk was cut from the sheet. The disk was then dried and pressed in a 1.6 cm diameter die set at 12,000 pounds for 45–60 seconds to form a dense pellet. The pressed pellet was vacuum dried and weighed.

The pressed and dried disk was used as the active cathode in a 2025 coin cell. To form the coin cell, a 1.6 square centimeter disk of nickel expanded metal was punched and resistance welded as a current collector to the inside of the stainless steel cover of the 2025 coin cell hardware (catalog No. 10769, Alfa Aesar, Inc., Ward Hill, Mass.). Battery grade lithium foil (0.75 mm thick) from Hohsen Corp. (Osaka Japan) was punched into a two-square centimeter disk and cold welded to the nickel expanded metal. A microporous polypropylene separator disk (Celgard® 2400, Hoechst-Celanese, Charlotte, N.C.) of appropriate dimensions was placed over the lithium disk.

A predetermined amount of electrolyte was added to this separator/lithium assembly. The electrolyte solution was composed of 1M $LiPF_6$ salt. The solvent for the electrolyte solution was a 1:1 volume ratio of ethylene carbonate to dimethyl carbonate. A second 1.6 square centimeter disk of stainless steel expanded metal was punched and resistance welded to the inside of the stainless steel can of the 2025 coin cell hardware. The active cathode pellet was placed on the nickel expanded metal and mated with the above separator/lithium assembly. The stainless steel can and stainless steal cover are separated from each other by a polypropylene grommet. The mated assembly was crimped together and employed as a test coin cell.

The measurements were controlled by a Maccor Battery Test System, Series 4000, from Maccor, Inc. (Tulsa, Okla.).

The discharge profile was recorded, and the discharge capacity of the active material was obtained.

To form a first coin cell, a cathode pellet was formed from 0.143 g of nanoscale silver vanadium oxide formed by heat processing of nanoscale $VO_2$ and silver nitrate, as described above in Example 4. The open circuit voltage immediately after crimping was 3.53 volts. The cell was placed in a controlled atmosphere chamber at 37±1 degrees C. and allowed to equilibrate for 4 hours. Then, the cell was subjected to a constant current discharge of 0.1 milliamperes per square centimeters of active interfacial electrode surface area. When the voltage reached 1.0 volt, the discharge current was allowed to decay as the cell voltage was held at 1.0 volt for five hours. The 1.0 volt discharge allows for a capacity measurement independent of polarization effects that result from discharge at finite values of current. This yields a capacity measurement that more closely approximates the maximum value that would be obtained with by discharging the battery at infinitely slow discharge.

Figure 29:
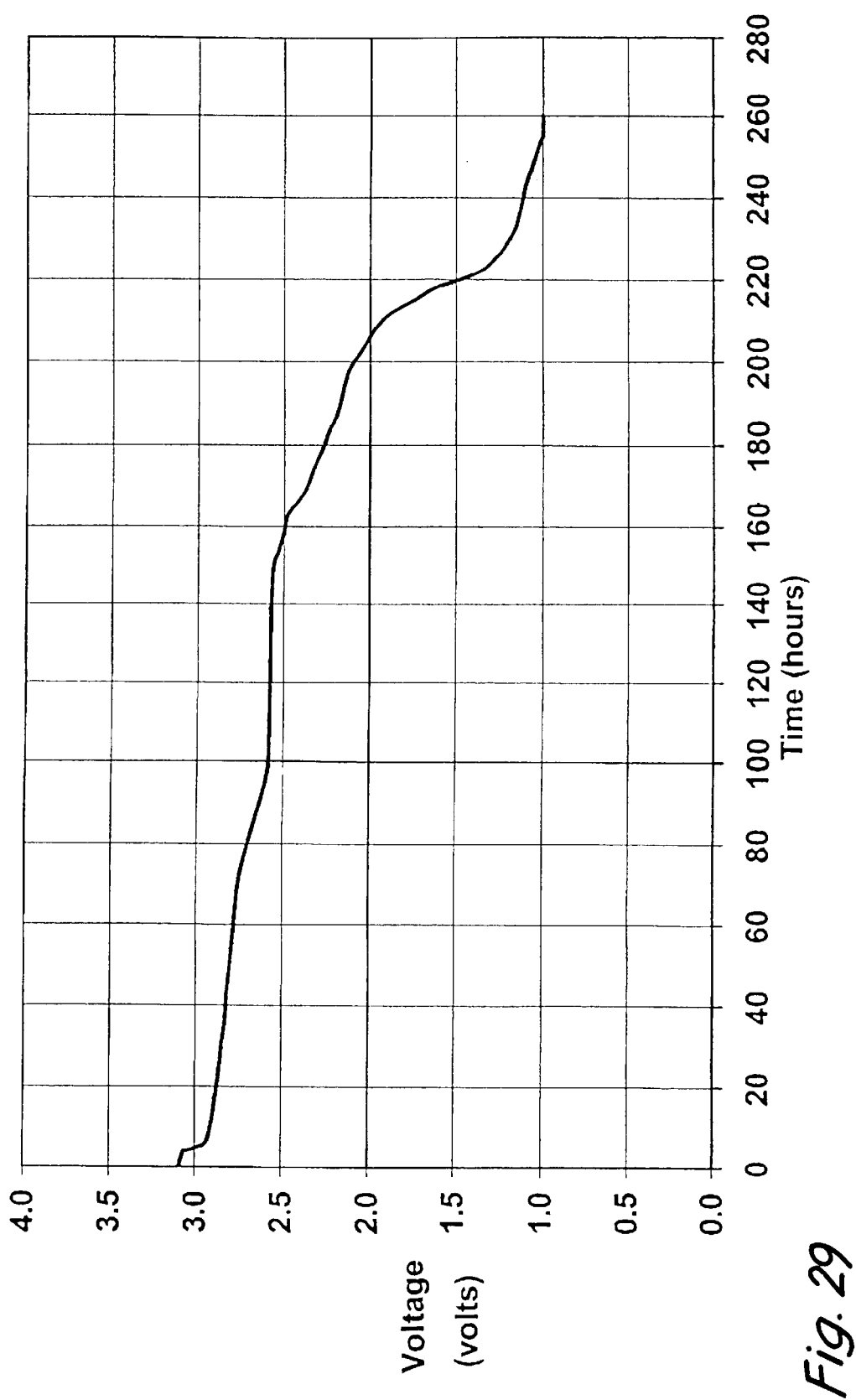
FIG. 29 is a plot of voltage as a function of time for a lithium battery produced using silver vanadium oxide nanoparticles produced in a heat processing step described in Example 4.
Figure 30:
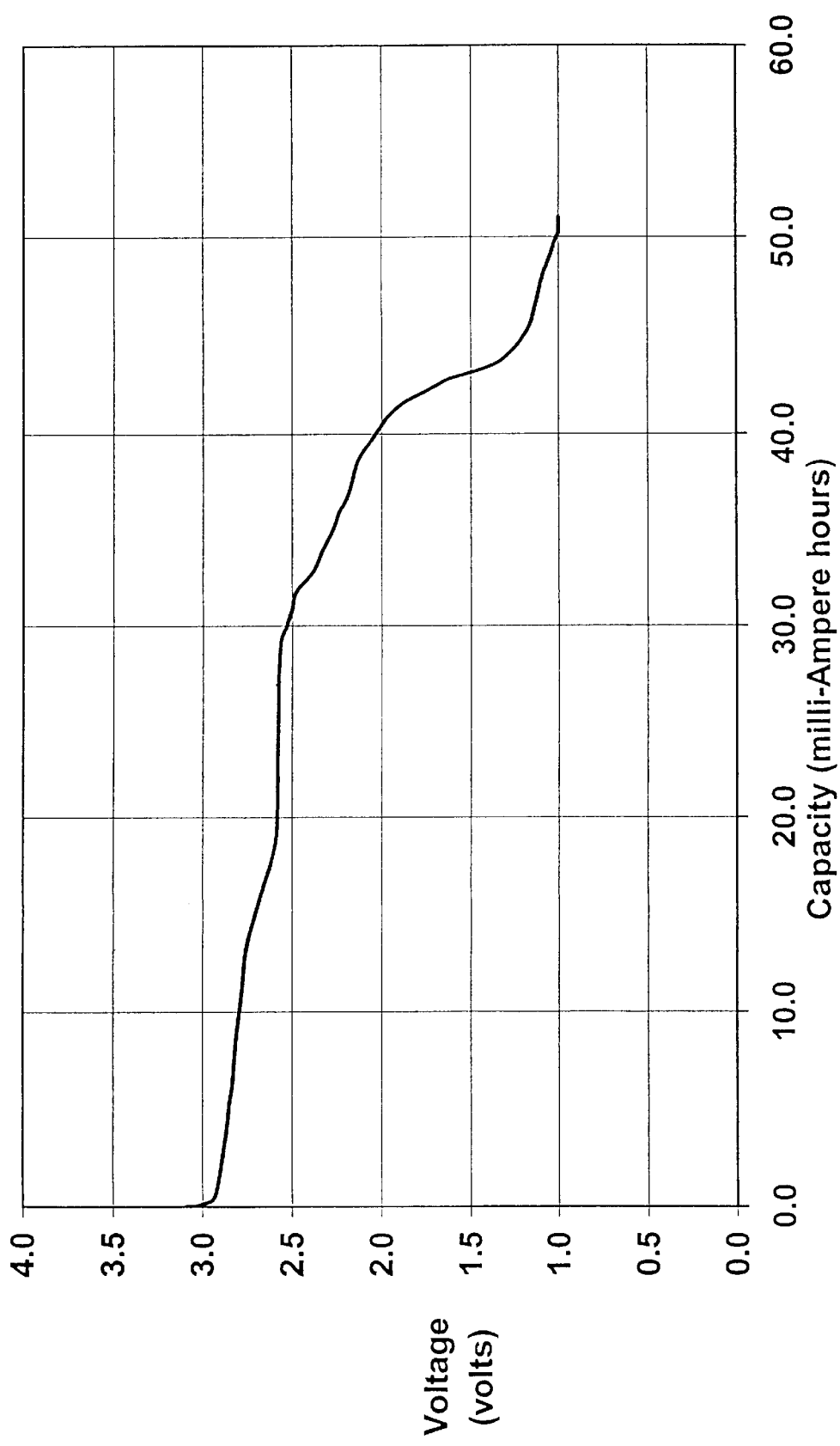
FIG. 30 is a plot of voltage as a function of capacity corresponding to the plot of voltage as a function of time shown in FIG. 29.

The voltage as a function of time is plotted in FIG. 29. The first four hours in the plot were taken during temperature equilibration and do not involve any battery discharge. A plot of voltage as a function of cumulative capacity is plotted in FIG. 30. The cumulative discharge capacity was measured as 51.0 milliampere-hours, or a specific capacity of about 357 milliampere hours per gram of active silver vanadium oxide nanoparticles. This is greater than the theoretical specific capacity.

A second cell was constructed as described above with silver vanadium oxide as directly synthesized, as described above in Example 5. The cathode contained 0.148 g of nanoscale silver vanadium oxide particles. The open circuit voltage immediately after crimping was 3.3 volts. The cell was placed in a controlled atmosphere chamber at 37±1 degrees, allowed to equilibrate for 4 hours. The cell was subjected to a constant current discharge of 0.309 milliamperes per square centimeter of active interfacial electrode surface area. When the voltage reached 1.0 volt, the discharge current was allowed to decompose as the cell voltage was held at 1.0 volt for five hours.

Figure 31:
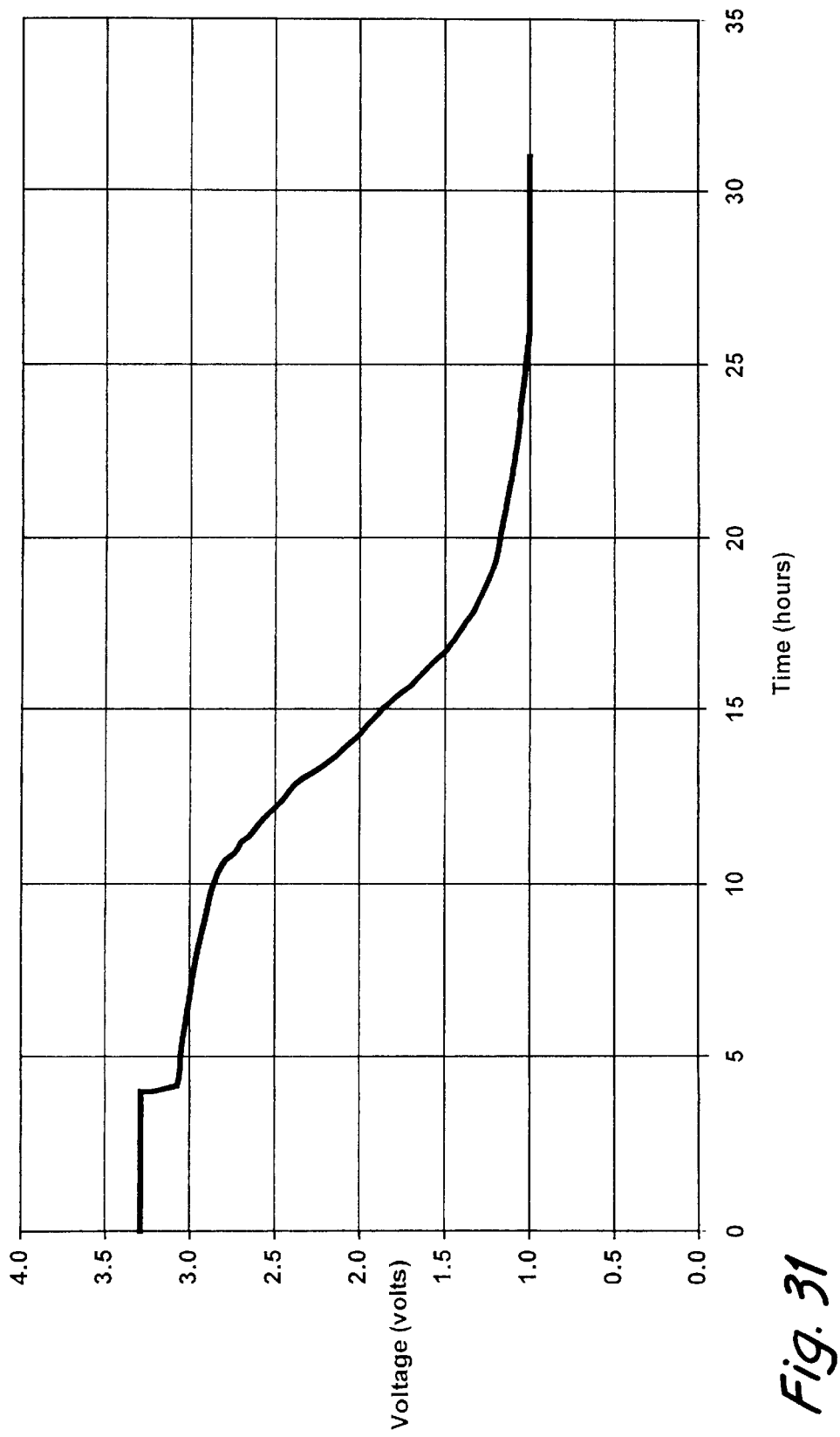
FIG. 31 is a plot of voltage as a function of time for a lithium battery produced using mixed phase silver vanadium oxide nanoparticles as produced directly by laser pyrolysis, as described in Example 5.
Figure 32:
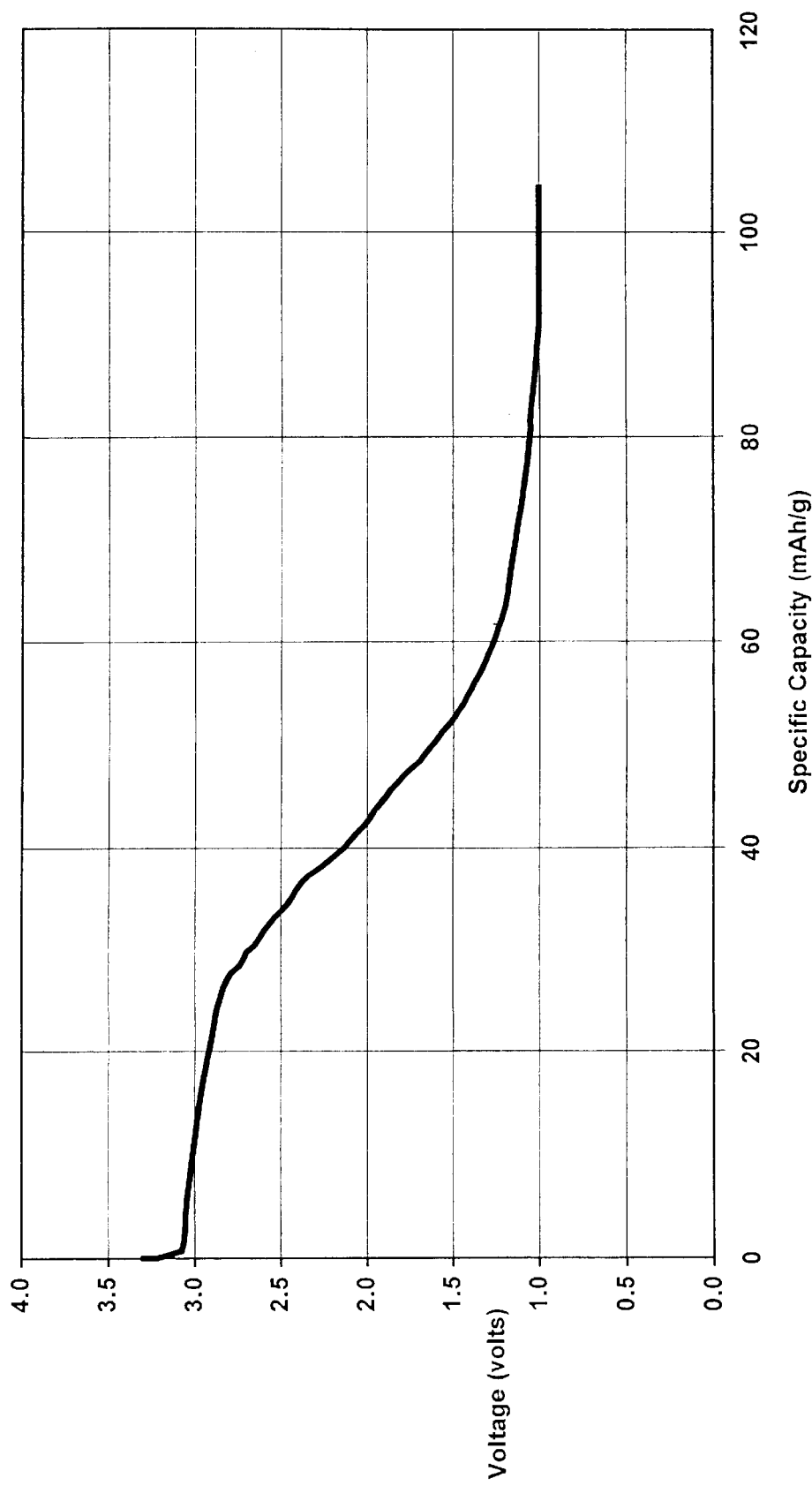
FIG. 32 is a plot of voltage as a function of capacity corresponding to the plot of voltage as a function of time shown in FIG. 31.

The voltage-time results are illustrated in FIG. 31. The first four hours in the plot were taken during temperature equilibration and do not involve any battery discharge. A plot of voltage versus cumulative capacity is given in FIG. 32. As illustrated, the cumulative discharge capacity was measured at 15.4 milliampere-hours, or specific capacity of approximately 104.3 milliampere-hours per gram of active silver vanadium oxide nanoparticles. The discharge capacity was evaluated by the integral over the discharge time of the voltage multiplied by the current divided. The specific capacity was evaluated as the discharge capacity divided by the mass of the active material.

A third cell was constructed as described above with silver vanadium oxide synthesized by laser pyrolysis with subsequent annealing in an oven, as described above in Example 6. The active cathode pellet contained 0.157 g of silver vanadium oxide nanoparticles. The open cell voltage immediately after crimping was 3.5 volts. The cell was placed in a controlled atmosphere chamber at 37±1° C. and allowed to equilibrate for 4 hours. Then, the cell was subjected to a constant current discharge of 0.100 milliamperes per square centimeter of active interfacial electrode surface area. When the voltage reached 1.0 volt, the discharge current was allowed to decompose as the cell voltage was held at 1.0 volt for five hours.

Figure 33:
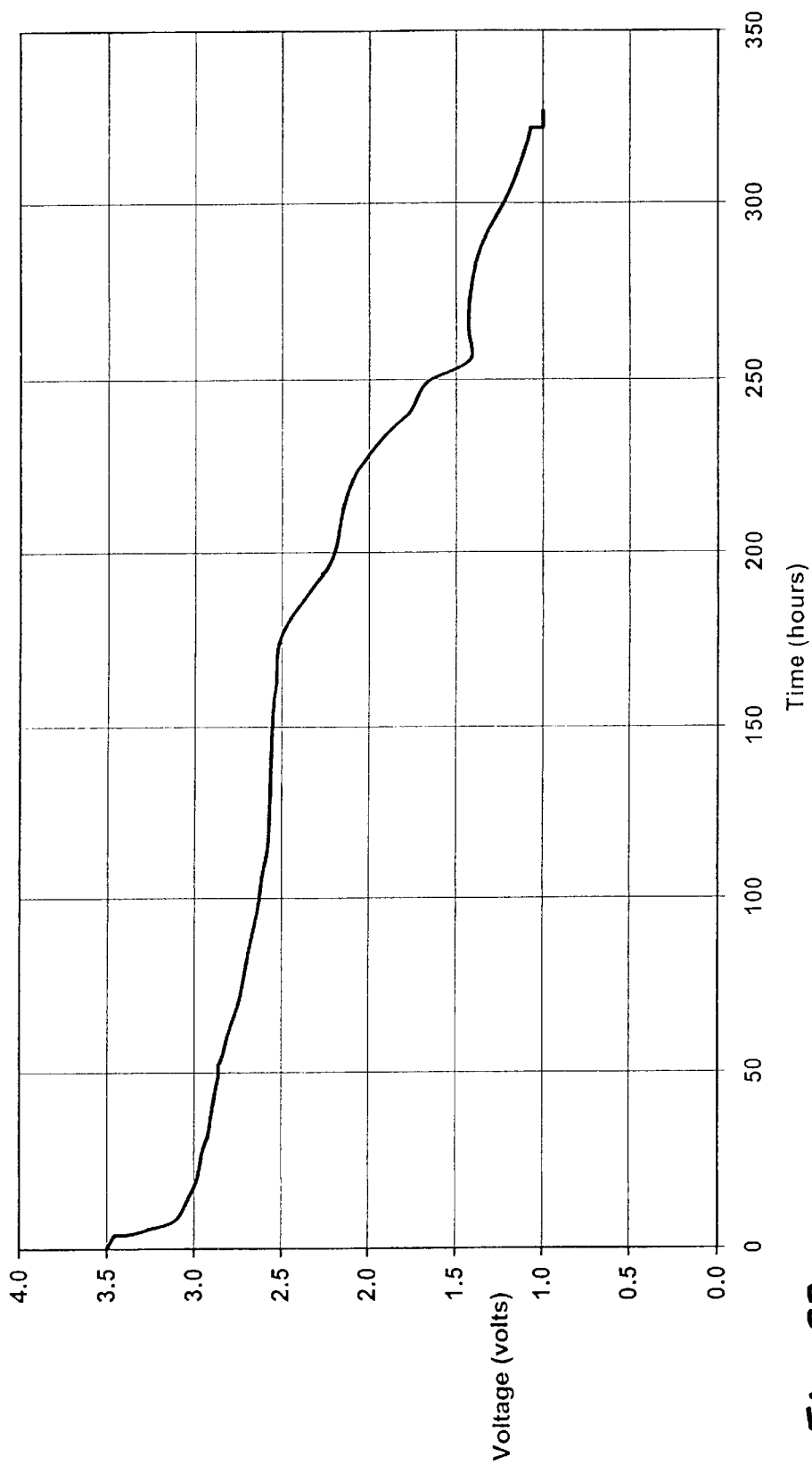
FIG. 33 is a plot of voltage as a function of time for a lithium battery produced using silver vanadium oxide nanoparticles following heat treatment, as described in Example 6.
Figure 34:
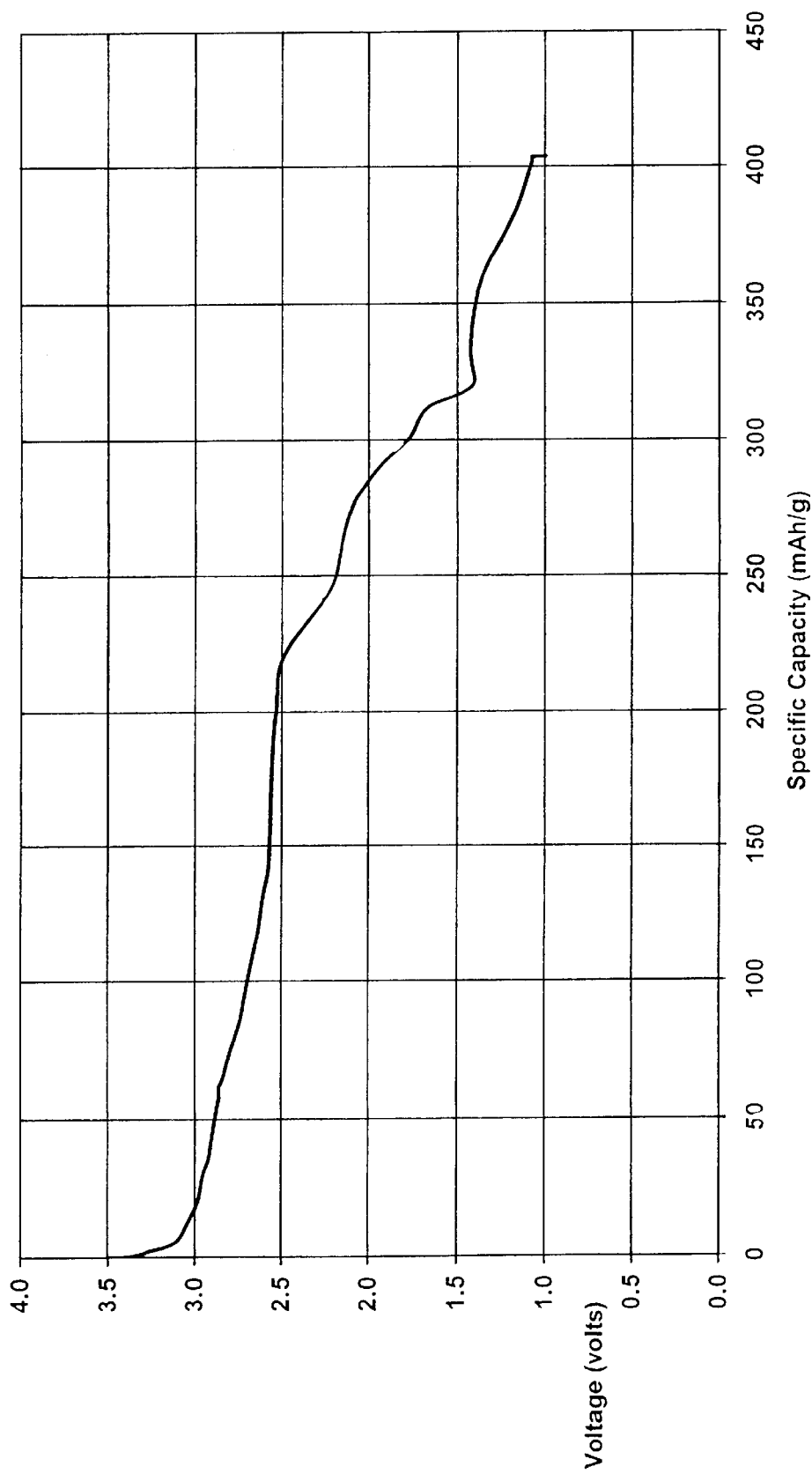
FIG. 34 is a plot of voltage as a function of capacity corresponding to the plot of voltage as a function of time shown in FIG. 33.

The voltage-time results are illustrated in FIG. 33. The first four hours in the plot were taken during temperature equilibration and do not involve any battery discharge. A plot of voltage versus cumulative capacity is given in FIG. 34. As illustrated, the cumulative discharge capacity was measured at 63.53 milliampere-hours, or a specific capacity of approximately 404 milliampere-hours per gram of active silver vanadium oxide nanoparticles.

A fourth cell was constructed as described above with silver vanadium oxide synthesized by laser pyrolysis, as described above in Example 7 under conditions specified in the first column of Table 3. The active cathode pellet contained 0.154 g of silver vanadium oxide nanoparticles. The open cell voltage immediately after crimping was 3.4 volts. The cell was placed in a controlled atmosphere chamber at 37±1° C. and allowed to equilibrate for 4 hours. Then, the cell was subjected to a constant current discharge of 0.309 milliamperes per square centimeter of active interfacial electrode surface area. When the voltage reached 1.0 volt, the discharge current was allowed to decompose as the cell voltage was held at 1.0 volt for five hours.

Figure 35:
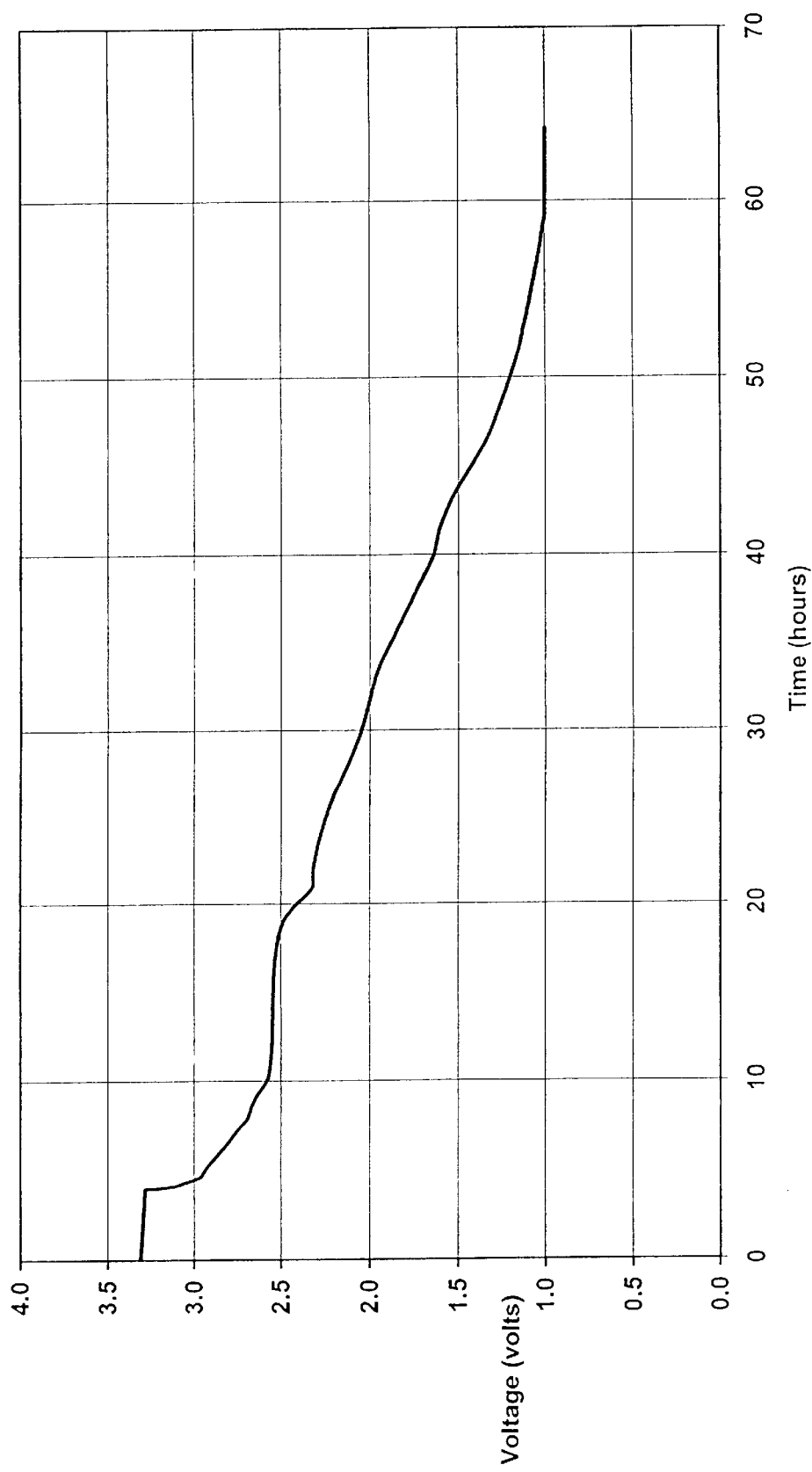
FIG. 35 is a plot of voltage as a function of time for a lithium battery produced using mixed phase silver vanadium oxide nanoparticles, as described in Example 7.
Figure 36:
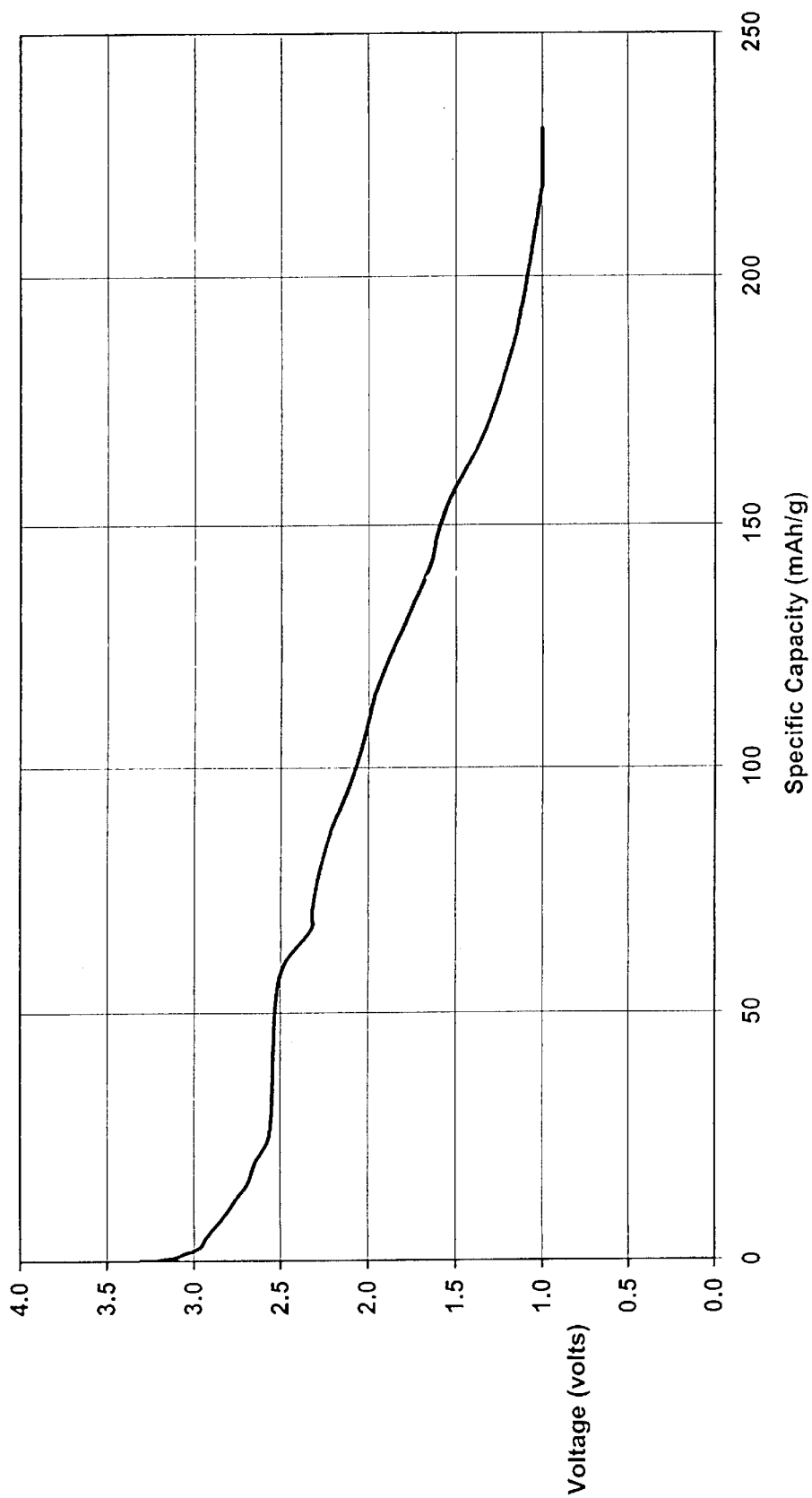
FIG. 36 is a plot of voltage as a function of capacity corresponding to the plot of voltage as a function of time shown in FIG. 35.

The voltage-time results are illustrated in FIG. 35. The first four hours in the plot were taken during temperature equilibration and do not involve any battery discharge. A plot of voltage versus cumulative capacity is given in FIG. 36. The voltage plots shown in FIGS. 35 and 36 have a shape characterized by silver vanadium oxide signatures. As illustrated, the cumulative discharge capacity was measured at 35.54 milliampere-hours, or a specific capacity of approximately 230 milliampere-hours per gram of active silver vanadium oxide nanoparticles. The low specific capacity suggests that the silver vanadium oxide particles were part of a mixed phase material.

A theoretical capacity of 315 milliampere-hours per gram (7 equivalents of lithium) for $Ag_2V_4O_{11}$ has been reported, see Takeuchi et al., "The Reduction of Silver Vanadium Oxide in Lithium/Silver Vanadium Oxide Cells, J. Electrochem. Soc. 135:2691 (November 1988) and Leising et al., Journal of Power Sources 68:730–734 (1997), both of which are incorporated herein by reference Thus, value of specific capacity obtained in the Examples described herein significantly exceed the theoretical values.

The embodiments described above are intended to be illustrative and not limiting. Additional embodiments are within the claims below. Although the present invention has been described with reference to preferred embodiments, workers skilled in the art will recognize that changes may be made in form and detail without departing from the spirit and scope of the invention.

What is claimed is:

1. A battery comprising a cathode having active particles comprising silver vanadium oxide and a binder, the cathode exhibiting a specific capacity of greater than about 370 milliampere hours per gram of active particles when discharged to about 1.0 V.

2. The battery of claim 1 wherein the active particles have an average diameter from about 5 nm to about 100 nm.

3. The battery of claim 1 wherein the silver vanadium oxide comprises silver vanadium oxide, $Ag_xV_2O_y$, $0.3 \leq x \leq 2.0$, $4.5 \leq y \leq 6.0$.

4. The battery of claim 3 wherein the silver vanadium oxide comprises $Ag_2V_4O_{11}$.

5. The battery of claim 1 wherein the cathode further comprises supplementary, electrically conductive particles.

6. The battery of claim 1 wherein the cathode exhibits a specific capacity of greater than about 400 milliampere hours per gram of active material.

7. The battery of claim 1 wherein the active particles have an average diameter less than about 1000 nanometers.

8. The battery of claim 1 wherein the active particles have an average diameter less than about 500 nanometers.

9. The battery of claim 1 comprising an anode comprising lithium metal.

10. The battery of claim 1 comprising an anode comprising lithium metal foil.

11. The battery of claim 1 wherein the battery has the form of a coin cell.

12. An implantable defibrillator comprising a lithium based battery having a cathode comprising silver vanadium oxide with a specific capacity upon discharge to 1.0 V of greater than about 370 milliampere hours per gram of cathode active material.

13. The battery of claim 12 wherein the active particles have an average diameter less than about 1000 nanometers.

14. The battery of claim 12 wherein the active particles have an average diameter less than about 500 nanometers.

15. The battery of claim 12 comprising an anode comprising lithium metal foil.

16. A battery comprising a cathode having active particles comprising metal vanadium oxide and a binder, the cathode exhibiting a specific capacity of greater than about 400 milliampere hours per gram of active particles when discharged to about 1.0 V.

17. The battery of claim 16 wherein the active particles have an average diameter less than about 1000 nanometers.

18. The battery of claim 16 wherein the active particles have an average diameter less than about 500 nanometers.

19. The battery of claim 16 comprising an anode comprising lithium metal foil.

20. The battery of claim 16 wherein the metal vanadium oxide comprises silver, gold, copper or a combination thereof.

* * * * *